(12) United States Patent
Wu et al.

(10) Patent No.: US 12,091,511 B2
(45) Date of Patent: Sep. 17, 2024

(54) SULFUR-BASED POLYMERS

(71) Applicant: THE UNIVERSITY OF LIVERPOOL, Liverpool (GB)

(72) Inventors: Xiaofeng Wu, Liverpool (GB); Douglas Parker, Liverpool (GB); Thomas Hasell, Liverpool (GB)

(73) Assignee: THE UNIVERSITY OF LIVERPOOL, Liverpool (GB)

( * ) Notice: Subject to any disclaimer, the term of this patent is extended or adjusted under 35 U.S.C. 154(b) by 764 days.

(21) Appl. No.: 17/275,343

(22) PCT Filed: Sep. 12, 2019

(86) PCT No.: PCT/GB2019/052552
§ 371 (c)(1),
(2) Date: Mar. 11, 2021

(87) PCT Pub. No.: WO2020/053587
PCT Pub. Date: Mar. 19, 2020

(65) Prior Publication Data
US 2021/0324147 A1 Oct. 21, 2021

(30) Foreign Application Priority Data
Sep. 12, 2018 (GB) ..................... 1814852

(51) Int. Cl.
| | | |
|---|---|---|
| *C08G 75/16* | (2006.01) | |
| *B01J 20/26* | (2006.01) | |
| *B01J 20/32* | (2006.01) | |
| *B01J 31/22* | (2006.01) | |
| *C08K 5/03* | (2006.01) | |
| *C08K 5/101* | (2006.01) | |
| *C02F 1/28* | (2023.01) | |

(52) U.S. Cl.
CPC ............ *C08G 75/16* (2013.01); *B01J 20/267* (2013.01); *B01J 20/3202* (2013.01); *B01J 31/226* (2013.01); *C08K 5/03* (2013.01); *C08K 5/101* (2013.01); *B01J 2531/26* (2013.01); *C02F 1/285* (2013.01)

(58) Field of Classification Search
USPC ........................................ 528/389
See application file for complete search history.

(56) References Cited

FOREIGN PATENT DOCUMENTS

| WO | WO2014/118073 | 8/2014 |
|---|---|---|
| WO | WO2019/012278 | 1/2019 |

OTHER PUBLICATIONS

Wade C. et al: "Preparation and characterization of high efficiency modified activated carbon for the capture of mercury from flue gas in coal-fired power plants", Fuel Processing Technology, vol. 97, 2012, pp. 107-117. (Year: 2012).*
PCT Search Report and Written Opinion prepared for PCT/CN2018/081483, completed Dec. 12, 2018.
Parker D.J. et. al., "Low Cost and Renewable Sulfur-Polymers by Inverse Vulcanisation, and Their Potential for Mercury Capture," 2017, Journal of Materials Chemistry A, vol. 5, pp. 11682-11692.
Hassell T. et. al., "Disclosing a Sulphur-Based Polymer Formed from Sulphur and a Crosslinking Compound (DIB) and use of the Polymer for Mercury Capture," 2016, Chemical Communications, vol. 52, pp. 5383-5386.
Nieuwenhuizen P.J. et. al., "The Mechanism of Zinc(II)-Dithiocarbamate-Accelerated Vulcanization Uncovered; Theoretical and Experimental Evidence," 1999, Journal of the American Chemical Society, vol. 121, pp. 163-168.
Salman M.K. et.al., "Elemental sulfur-based polymeric materials: Synthesis and characterization," 2016, Journal of Applied Polymer Science, vol. 133, pp. 43655 (1-10).
United Kingdom Search Report prepared for GB1814852.8, completed Mar. 12, 2019.
Wade, C., et al., "Preparation and Characterization of High Efficiency Modified Activated Carbon for the Capture of Mercury from Flue Gas in Coal-Fired Power Plants," 2012, Fuel Processing Technology, vol. 97, pp. 107-117.
Montoneri, E., et al., "Hot Alkali Stable Materials with Low Electrical Resistance : a new Composite made from Porous Asbestos and Soluble Phenylene Sulphide," 1983, Journal Materials Science, vol. 18, pp. 3311-3322.

* cited by examiner

*Primary Examiner* — Terressa Boykin
(74) *Attorney, Agent, or Firm* — Barnes & Thornburg LLP

(57) ABSTRACT

The present invention relates to sulfur based polymers and a process of making sulfur based polymers. The invention also relates to sorbents comprising the sulfur-based polymers. The invention also relates to the use of such polymers and sorbents in metal remediation or extraction. The invention also relates to methods of removing heavy metals from fluids.

20 Claims, 51 Drawing Sheets

Previously published crosslinkers that benefit from catalytic inverse vulcanisation:

Dicyclo-
pentadiene
(DCPD)

Limonene

Di-isopropenyl
benzene (DIB)

Divinyl benzene
(DVB)

e.g.

Triglyceride (vegetable oils)

Squalene

Crosslinkers newly reported in this work:

Catalysts: M = Zn, Fe, Co, Cu, Ni (all $^{2+}$) or Na$^+$ (one ligand)

Metal diethyldithiocarbamate

Thiram

Zinc stearate

2-Cyano-2-propyl benzodithioate

SULFUR-BASED POLYMERS

CROSS-REFERENCE TO RELATED APPLICATIONS

This application is the U.S. national phase of PCT/GB2019/052552, filed on Sep. 12, 2019, which claims the benefit of United Kingdom Patent Application Serial Number 1814852.8, filed on Sep. 12, 2018, the entire disclosures of both which are incorporated herein by reference.

The present invention relates to sulfur based polymers and a process of making sulfur based polymers (i.e. thiopolymers). The invention also relates to sorbents comprising the sulfur-based polymers. The invention also relates to the use of such polymers and sorbents in metal remediation or extraction. The invention also relates to methods of removing heavy metals from fluids.

BACKGROUND

Conventional vulcanisation has been known and used for over a hundred and seventy years, and has transformed the modern age—allowing greater industrialisation and mass transport. The vulcanisation of rubber is a multi-billion dollar industry worldwide, from vehicle tyres integral to modern transport to gaskets for complex machinery and even space flight.

Conventional vulcanisation involves the use of small amounts of sulfur (typically no more than 0.5 to 3 weight %) to crosslink long chain organic polymers like natural rubber. As the polymers are usually solids, this requires complex and expensive machinery with necessity for mechanical mixing (such as calendaring or screw extrusion).

In 2013 a new process of "Inverse Vulcanisation" was discovered (*Nature Chemistry*, 5, 518-524, 2013). This process uses small organic molecules to crosslink and stabilise polymeric sulfur (without this crosslinker, pure polymeric sulfur readily depolymerises to its monomer, $S_8$). This has allowed stable polymeric materials of up to 90 weight % sulfur to be produced. Unlike conventional vulcanisation, this process can be completed in the liquid phase, requiring no complex equipment.

Sulfur itself is a largely unwanted by-product of the petrochemicals industry, the supply of which outweighs demand, leading to huge surplus reserves. To be able to produce useful plastic materials from this is a boon in itself, as it can reduce society's reliance on polymers made from petroleum. Greater than this, however, is the scope for unique new polymers with unprecedented properties. Considering the host of myriad different applications carbon-based polymers are used for in every aspect of modern life, sulfur based polymers enable radically different properties. For instance, the IR transparency and high refractive index have been shown to allow optical applications that would be impossible for conventional polymers. Other reported applications have included improved LiS batteries, oil-water separation, recyclable self-healing materials, antimicrobial materials, and thermal insulation, but there are likely many more yet to be reported.

In the last five years, since inverse vulcanisation was first reported, there have been a steadily growing number of groups working on these materials, and many new papers (Reviews: *Angew. Chem. Int. Ed.*, 50, 15486-15502, 2016; *Prog. Polym. Sci.*, 58, 90-125, 2016; *Green Chem.*, 19, 2748-2761, 2017). However, further development of both the chemistry and applications has been handicapped by the restricted choice of cross-linkers, harsh reaction conditions, and the often-poor properties of the resultant polymers.

Thiopolymers have attracted attention in recent years, because of their potential to reduce reliance on ecologicaly damaging conventional synthetic polymers, and alleviating the "excess sulfur problem". Synthetic polymers are widely used on a vast scale, however the majority of them are derived from petrochemicals, which are finite resources, contrary to green chemistry principles. Therefore, alternative materials made from industrial by-product or renewable biomass are sought. In order to decrease the emission of $SO_2$ and prevent acid rain, sulfur is removed from petroleum and natural gas and eventually converted to elemental sulfur. Hence, elemental sulfur is incredibly cheap and readily available for use. It is reported that more than 70 million tonnes of elemental sulfur is produced annually, with much of it stockpiled at refining sites. Sulfur is used to prepare both commodity and specialty chemicals, such as sulfuric acid, fertilizers, and conventional vulcanization, but its supply significantly outweighs demand. Thus, thiopolymers are one of the most promising candidates to consume redundant sulfur and to be an alternative to conventional synthetic polymers.

BRIEF SUMMARY OF THE DISCLOSURE

In a first aspect, there is provided a process of making a sulfur-based polymer, the process comprising:
  reacting elemental sulfur with one or more organic cross-linking agents, in the presence of at least one catalyst, wherein the organic crosslinking agent(s) comprises two or more carbon-carbon double bonds and the catalyst is selected from one or more of the following:
  (i) a compound according to formula (I) below:

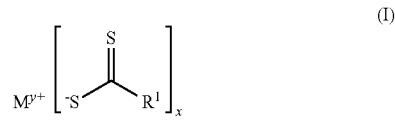

wherein
M is a metal ion,
y is the valency of M, and x is an integer that equals y; and
$R^1$ is selected from (1-20C)alkyl, $NR^2R^3$, $SR^4$ or $OR^5$;
  wherein $R^2$ and $R^3$ and are each independently selected from H, (1-8C)alkyl, (3-6C)cycloalkyl, aryl, heteroaryl or $R^2$ and $R^3$ are linked such that, together with the nitrogen atom to which they are attached, they form a 3-6 membered heterocyclic ring;
$R^4$ is selected from (1-8C)alkyl, (3-6C)cycloalkyl, (3-6C)heterocyclyl, aryl or heteroaryl; and
$R^5$ is selected from (1-8C)alkyl, (3-6C)cycloalkyl, (3-6C)heterocyclyl, aryl or heteroaryl;
  (ii) a compound according to formula (II) below:

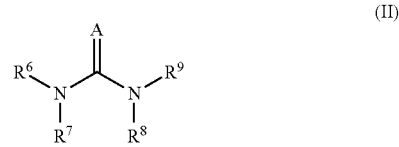

wherein
A is selected from S, O or NH; and
$R^6$, $R^7$, $R^8$, $R^9$, are each independently selected from H, (1-8C)alkyl, (3-6C)cycloalkyl, (3-6C)heterocyclyl, aryl or heteroaryl;
(iii) a compound according to formula (III) below:

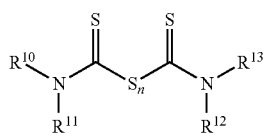

(III)

wherein $R^{10}$, $R^{11}$, $R^{12}$ and $R^{13}$ are independently selected from (1-8C)alkyl, (3-6C)cycloalkyl, aryl or heteroaryl; and n is an integer between 1 and 8;
(iv) a compound according to formula (IV) below:

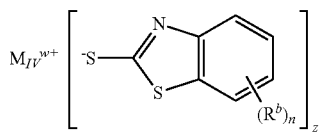

(IV)

wherein $M_{IV}$ is a metal ion, w is the valency of $M_{IV}$, and z is an integer that equals W;
n is an integer between 0 and 4; and
each occurrence of $R^b$ is individually selected from (1-8C) alkyl, aryl, halo, heteroaryl and (3-6C)cycloalkyl;
(v) a compound according to formula (V) below:

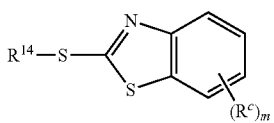

(V)

wherein $R^{14}$ is selected from H, (1-8C)alkyl, (3-6C) cycloalkyl, (3-6C)heterocyclyl, aryl, heteroaryl, $NR^{15}R^{16}$ and $SR^{17}$;
wherein $R^{15}$ and $R^{16}$ are independently selected from H, (1-8C)alkyl, (3-6C)cycloalkyl, (3-6C)heterocyclyl, aryl, heteroaryl or are linked such that they form a 3-6 membered heterocyclic ring;
$R^{17}$ is selected from H, (1-8C)alkyl, (3-6C)cycloalkyl, (3-6C)heterocyclyl, aryl, heteroaryl;
m is an integer between 0 and 4; and
each occurrence of $R^c$ is individually selected from (1-8C) alkyl, aryl, halo, heteroaryl and (3-6C)cycloalkyl;
(vi) a compound according to formula (VI) below:

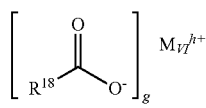

(VI)

wherein $R^{18}$ is selected from (1-20C)alkyl,
$M_{VI}$ is a metal ion, h is the valency of $M_{VI}$, and g is an integer that equals h; and each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^b$ and $R^c$ are optionally further substituted with one or more substituent groups independently selected from (1-8C)alkyl, aryl, halo, heteroaryl and (3-6C)cycloalkyl.

Metal ions M, $M_{IV}$ and $M_{VI}$ may be a metal ion selected from zinc, iron, cobalt, copper, nickel, aluminium, magnesium, calcium or sodium ions. Preferably, M, $M_{IV}$ and $M_{VI}$ are selected from sodium and zinc ions.

The catalyst may be selected from one or more compounds according to Formula (I), (III) or (VI). Preferably, the catalyst is a compound according to Formula (I).

The catalyst may be a compound according to Formula (Ia), below:

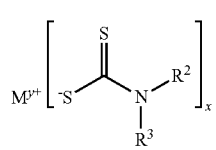

(Ia)

wherein $R^2$, $R^3$, M, y and x are as defined herein.

The catalyst may be a compound according to Formula (Ia), wherein $R^2$ and $R^3$ are each independently selected from hydrogen, (1-4C)alkyl, (3-6C)cycloalkyl and aryl, wherein $R^2$ and $R^3$ are optionally further substituted with one or more substituent groups independently selected from (1-4C)alkyl, aryl, heteroaryl and (3-6C)cycloalkyl. Preferably, $R^2$ and $R^3$ are each independently selected from (1-4C) alkyl or aryl.

Metal ion M may be a metal selected from zinc, iron, cobalt, copper, nickel, aluminium, magnesium, calcium or sodium ions. Preferably the metal ion M is a sodium or zinc ion.

The catalyst may be a stearate, thiuram or dithiocarbamate. Preferably, the catalyst is a dithiocarbamate. The catalyst may be a compound selected from one or more of zinc dithiocarbamate, zinc dimethyldiothocarbamate, zinc diethyldiothiocarbamate, zinc dipropylthiocarbamate, zinc dibutyldithiocarbamate or zinc dibenzyldithiocarbamate.

The catalyst may be a compound selected from one or more of zinc dithiocarbamate, zinc dimethyldiothocarbamate, zinc diethyldiothiocarbamate, sodium diethyldiothiocarbamate, zinc dipropylthiocarbamate, zinc dibutyldithiocarbamate or zinc dibenzyldithiocarbamate.

It will be appreciated that the process of the invention may utilise any one or more of the catalysts disclosed herein. Thus, the process of the present invention may utilise a combination of different catalysts disclosed herein.

The step of reacting may include subjecting the elemental sulfur, organic crosslinker(s) and at least one catalyst to heat and/or pressure. Preferably, the elemental sulfur, organic crosslinker(s) and at least one catalyst are heated.

The process of the invention may comprise heating a reaction mixture comprising elemental sulfur, organic crosslinker(s) and at least one catalyst.

Typically, the reaction mixture will be heated without a solvent being present. Alternatively, the reaction mixture may be dispersed or dissolved in a solvent (e.g. an aprotic solvent defined herein) for some or all of the process of the invention.

Typically, the process will involve heating elemental sulfur to the molten form. Thus, the elemental sulfur may be heated such that the sulfur is in molten form during the reaction. The elemental sulfur may be pre-heated to the molten form before the catalyst and crosslinker are added.

Catalyst may be added to the sulfur before or after the sulfur reaches the molten state. Organic crosslinker may be added to the sulfur before or after the sulfur reaches the molten state. Preferably, catalyst is added before sulfur reaches the molten state and the organic crosslinker is added after sulfur reaches the molten state.

Suitably, the organic crosslinker and catalyst will be distributed throughout molten sulfur as the reaction progresses. Thus, during the process the reaction mixture will typically be in a liquid form.

In some embodiments, the sulfur may be solid for the some or all of the duration of the reaction. The process may involve heating elemental sulfur to a temperature below its melting point, e.g. from 95° C. to 115° C. or 100° C. to 110° C., so that the sulfur remains solid. Thus, the elemental sulfur may be heated such that the sulfur is in the solid form during the reaction. Part of the reaction may be performed while the sulfur is solid and part may be performed while the sulfur is molten. The sulfur may be powdered when it is in the solid form.

Suitably, if the sulfur is in the solid form as the reaction progresses, the organic crosslinker and catalyst may also be in the solid form. The catalyst and crosslinker may be distributed throughout the solid (e.g. powdered) elemental sulfur.

Residual catalyst may be recovered from the reaction mixture following the process.

During the process, the sulfur may be present in an amount of from 30% to 95% by weight, 40% to 90% by weight, or 50 to 80% by weight of the reaction mixture.

During the process, the catalyst may be present in an amount of 0.1% to 10% by weight, 0.5 to 5% by weight, or 0.75 to 3% by weight of the reaction mixture.

During the process, the crosslinker may be present in an amount of 3% to 70%, 5% to 50% or 10% to 30% by weight of the reaction mixture. Different amounts of organic crosslinker may be added at various stages of the process. Thus, the crosslinker may be added over an extended period of time in smaller portions until the full amount of crosslinker has been added to the reaction mixture.

The reaction mixture may be heated to a temperature above room temperature (i.e. 25° C.), and preferably above the melting point of sulfur. The reaction mixture may be heated to a temperature from 120° C. to 200° C., preferably 125° C. to 175° C. or more preferably 130° C. to 150° C.

The reaction mixture may be heated for a period of 10 minutes to 24 hours, 15 minutes to 12 hours, more preferably 20 minutes to 1 hour. Such heating may be applied during a single heating step or may be applied in separate heating steps.

The reaction mixture may be cooled at various points of the process.

As the reaction progresses and crosslinks are formed between sulfur and the organic crosslinker(s), the molten reaction mixture may turn from liquid into a pre-polymer gel and then into a polymeric solid once fully crosslinked. The reaction mixture may turn from a liquid into a polymeric gel and stay in this form even when fully crosslinked.

It will be understood by those skilled in the art that the particular temperatures and duration of heating will depend on the final application and the desired properties of the sulfur-based polymer. For example, in an industrial setting, it may be advantageous to react the reaction mixture over a series of separate stages to increase efficiency or optimise the process. It may be advantageous in some cases to add organic crosslinker at different stages of the process to optimise the properties of the final polymer.

By way of example, in a reactive injection moulding setting, it may be that the reaction mixture of sulfur, catalyst and crosslinker are partially reacted in a first stage to form a partially crosslinked pre-polymer, which may still be in a liquid or gel form. The pre-polymer may then be cooled and transferred to another location, e.g. one or more moulds, where the final crosslinking step will take place by further heating. Thus, the reaction may take place over multiple stages.

The organic crosslinking agent(s) will be a compound which comprises at least two carbon-carbon double bonds. Thus, the organic crosslinking agent may be a vinyl compound. The vinyl compound may include one or more allyl groups (i.e. a substituent with the structural formula $H_2C=CH-CH_2R$, where R is the rest of the molecule). Suitable vinyl compounds also include substituted vinyl compounds, for example vinyl compounds substituted with halogens, oxygen, acetates, acrylates, phosphates, etc.

The organic crosslinking agent(s) may be a compound which is unreactive or only partially reactive in an uncatalyzed inverse vulcanisation. A particular example of groups of compounds which are generally unreactive in uncatalyzed inverse vulcanisation but reactive with the use of a catalyst are acrylate compounds. Thus, the organic crosslinking agent may be an acrylate compound e.g. ethylene glycol dimethacrylate.

The crosslinking agent(s) may be a vinyl compound comprising one or more heteroatoms e.g. oxygen, nitrogen, sulfur, silicon, halogens (e.g. chlorine, fluorine) and phosphorus. The crosslinking agent(s) may be one or more of a halide, acetate, acrylate, a siloxane or a glycol. Such compounds are also known to be generally unreactive without the use of a catalyst.

The crosslinking agent may be a small molecule crosslinker. By "small molecule crosslinker", it is meant that the crosslinking agent may be a compound with a molecular weight of less than 1000 g/mol, e.g. from 40 to 1000 g/mol.

There may be more than one organic crosslinking agents used in the process of the present invention.

It will be understood that the process may utilise further additives to aid the reaction between sulfur and the organic crosslinking agent, improve processing parameters or to improve the properties of the final sulfur-based polymer. Thus, the reaction mixture may include one or more additives as well as sulfur, organic crosslinking agent and catalyst. Such additives include but are not limited to stabilisers, surfactants, activators, monomers, antioxidants, additional catalysts and anti-scorch agents. Thus, for example, the reaction mixture may comprise sulfur, crosslinker, catalyst and an antioxidant.

Sulfur-Based Polymers

In a second aspect there is provided a sulfur based polymer obtained by, obtainable by or directly obtained by the process of the first aspect.

In a third aspect there is provided a sulfur-based polymer comprising sulfur in an amount of at least 30% by weight of the polymer, the sulfur-based polymer also comprising a catalyst as defined herein.

The sulfur-based polymer may comprise sulfur in an amount of from 30% to 95% by weight of polymer, e.g. 40% to 90% by weight of polymer, 50% to 80% by weight of polymer. The sulfur based polymer may comprise sulfur in an amount of 50% to 80% by weight of polymer, e.g. 60% to 70% by weight of polymer.

The catalyst present in the sulfur-based polymers of the invention may be any of the catalysts described herein. Thus, the disclosure related to the first aspect applies equally to the sulfur based polymers of the second and third aspects. Thus, the catalyst may be a catalyst according to any of formulas (I) to (VI), defined herein. Preferably the catalyst is a catalyst according (I), (III) or (VI). More preferably, the catalyst comprised in the sulfur-based polymer is a catalyst according to Formula (I) or Formula (Ia), defined herein.

The catalyst may be present in an amount of from 0.1% to 10% by weight, 0.5 to 5% by weight, or 0.75% to 3% by weight of the sulfur-based polymer.

The catalyst may be detectable in a reacted form when it is present in the sulfur-based polymer. The catalyst may be identifiable by the presence of a metal ion in the sulfur based polymer.

The detection of the catalyst present in the sulfur-based polymers described herein may be achieved by aqueous or solvent extraction processes known in the art. The catalyst may also be detectable after degradation of the polymer by methods including NMR spectroscopy, mass spectroscopy and ICP spectroscopy. ICP spectroscopy can be used to detect traces of metal down to low concentrations. The catalyst may also be detected using energy dispersive X-ray spectroscopy and X-ray fluorescence. X-ray spectroscopy and X-ray fluorescence methods can be used to detect the metal in certain catalysts without the breakdown or dissolution of the polymer.

The sulfur-based polymers described herein may be soluble in organic solvents and substantially insoluble in water at 25° C. The organic solvents in which the sulfur-based polymers are soluble include aprotic solvents. The solvent may be a polar aprotic solvent e.g. chloroform, acetone, DMF, acetonitrile, THF, dichloromethane, $CS_2$, ethyl acetate or dimethyl sulfoxide (DMSO). The solvent may be a non-polar aprotic solvent, e.g. ether, dioxane, toluene, benzene or xylene.

Sorbents

In a fourth aspect there is a provided a sorbent comprising a sulfur-based polymer according to the present invention. The sulfur based polymer may be supported on a porous material.

The porous material may comprise an inorganic material. The inorganic material may comprise a ceramic. The inorganic material may comprise an inorganic material selected from silica, organosilicates, alumina, zeolite, titania and mica. Preferably, the porous material comprises silica. In an embodiment, the porous material may be a silica bead.

Alternatively, the porous material may comprise an organic material. The organic material may comprise a material selected from porous carbons and polymers. The polymer may comprise a synthetic polymer, a natural polymer or a modified natural polymer. In an embodiment, the porous material comprises a polymer selected from hypercrosslinked porous polymers, polyHIPEs (poly high internal phase emulsions) and polycarbonate (e.g. track etched membranes).

Providing a sulfur-based polymer on a porous material significantly increases the surface area of the polymer, thereby increasing the effectiveness of the sulfur-polymer as a sorbent.

The porous material may contain pores in one or more of the micro (<2 nm), meso (2-50 nm), and macropore (>50 nm) range. Micropores will likely benefit the capacity of the sorbent. Meso and macropores are likely to be beneficial as transport pores.

In a fifth aspect there is provided a method of making a sorbent of the fourth aspect, the method comprising:
    a) dissolving a sulfur-based polymer as defined herein in an organic solvent;
    b) bringing the porous material into contact with the organic solvent;
    c) drying the porous material to remove the organic solvent to leave the sulfur-based polymer supported on the porous material.

The organic solvent may comprise anaprotic solvent, e.g. any of the non-polar or polar aprotic solvents disclosed herein.

The porous material may be brought into contact with the organic solvent by placing the porous material into the organic solvent. The porous material may be immersed or dipped into the organic solvent. Alternatively, the porous material may be brought into contact with the organic solvent by coating it with the organic solvent, e.g. by spray coating.

The porous material used in the method of the fifth aspect may be any of the porous materials described herein.

There is also provided the use of a sulfur-based polymer of the invention, or a sorbent of the invention, in heavy metal remediation e.g. mercury or lead remediation. Preferably, the use is in mercury remediation. The use may be in the remediation of organomercury compounds, e.g. methyl mercury chloride, and/or mercury salts, e.g. mercury chloride.

There is also provided the use of a sulfur-based polymer of the invention, or the sorbent of the invention, in the extraction of precious metals. The use may be in gold extraction.

In another aspect there is also provided a method of removing heavy metals from a fluid, the method comprising;
    (a) contacting the fluid with a sulfur-based polymer or a sorbent as defined herein;
    (b) separating the sulfur-based polymer or the sorbent from the fluid.

The concentration of heavy metals, including heavy metal salts and heavy metal compounds, in the fluid will be reduced after the sulfur based polymer or sorbent are separated from the fluid.

The method may be a method of heavy metal remediation. The method may be a method of precious metal extraction.

The fluid may comprise a heavy metal, a heavy metal salt or a heavy metal compound. The fluid may be a gas or an aqueous mixture.

The aqueous mixture may be a solution comprising a heavy metal, a heavy metal salt or a heavy metal compound.

The present invention has particular application in the removal of mercury from the environment. The aqueous mixture may comprise soil from the environment that is contaminated with mercury. Thus, the aqueous mixture may be a liquid comprising mercury, a mercury compound or a mercury salt. The aqueous mixture may be a mercury solution comprising mercury salt e.g. mercury chloride. The aqueous mixture may comprise an organomercury compound, e.g. methyl mercury chloride.

The present invention also finds application in the removal of gold from the environment i.e. in gold extraction. Thus, the aqueous mixture may be a gold solution. Thus, the aqueous mixture may be a liquid comprising a gold salt, e.g. gold halides (such as gold chloride, gold fluoride), gold thiosulfate, gold cyanide, gold thiourea or gold sulfate.

The fluid may be a gas (e.g. a vapour) comprising a heavy metal, a heavy metal salt or a heavy metal compound. The gas may be a waste gas stream, e.g. the flue gas of a power station. Thus, the sulfur-based polymer or sorbent may be located where the gas will come into contact with them through diffusion, e.g. in a waste gas flue. The sulfur-based polymer or sorbent will typically be separated from the gas through diffusion of the gas away from the polymer or sorbent.

BRIEF DESCRIPTION OF THE DRAWINGS

Embodiments of the invention are further described hereinafter with reference to the accompanying drawings, in which.

DETAILED DESCRIPTION

Figure 1A:
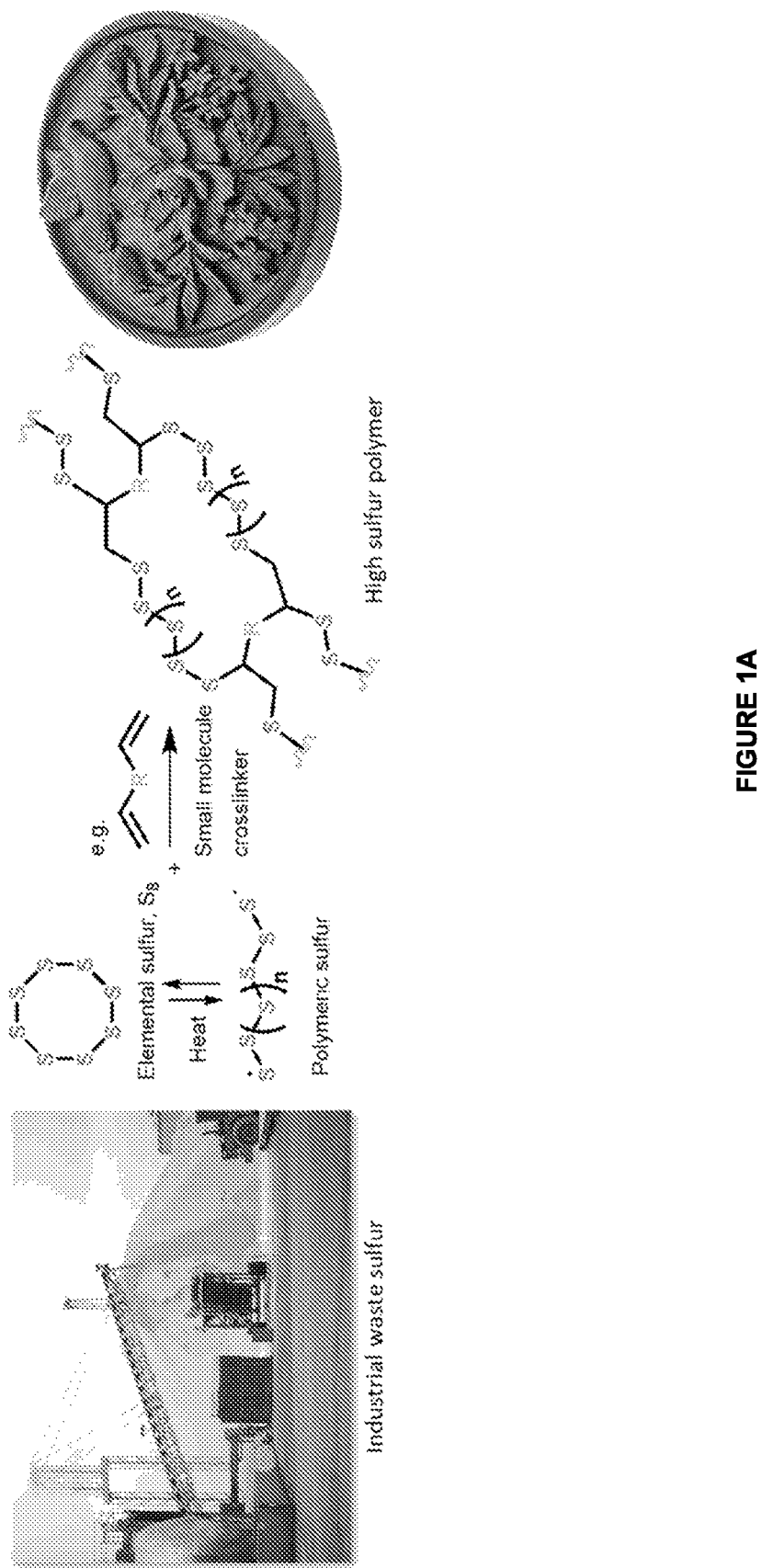
FIG. 1: a) A generalized reaction scheme for the inverse vulcanization of sulfur, where R indicates the core of an unsaturated small molecule crosslinker (i.e. a crosslinking agent). The crosslinker reacts with the polymerizing sulfur to stabilize it against depolymerisation, thus allowing industrial waste elemental sulfur (photo left) to be converted to stable polymeric objects (photo right). b) A wide range of crosslinkers can be used for inverse vulcanization, the structures shown here in inset b are a diverse range of previously published crosslinkers we chose to test their behaviour under catalysed polymerization. c) & d) Crosslinkers for inverse vulcanization that have not been previously reported and that are either reactive (inset c)) or unreactive (inset, d)) without catalysts. e) Potential catalysts for inverse vulcanization.
Figure 1B:
Figure 1B:
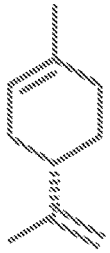
Figure 1B:
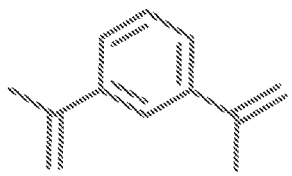
Figure 1B:
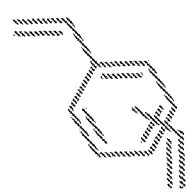
Figure 1B:
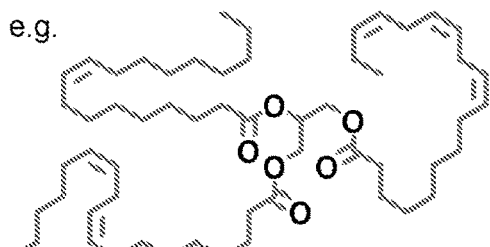
Figure 1B:
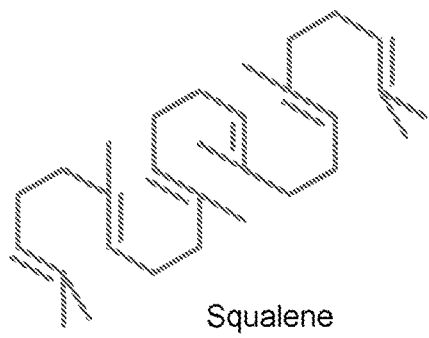
Figure 1C:
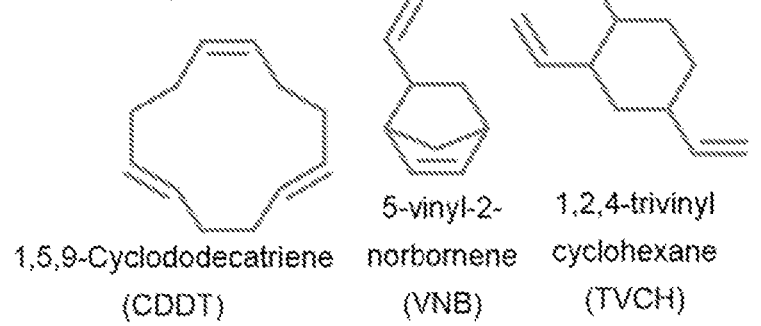
Figure 1D:
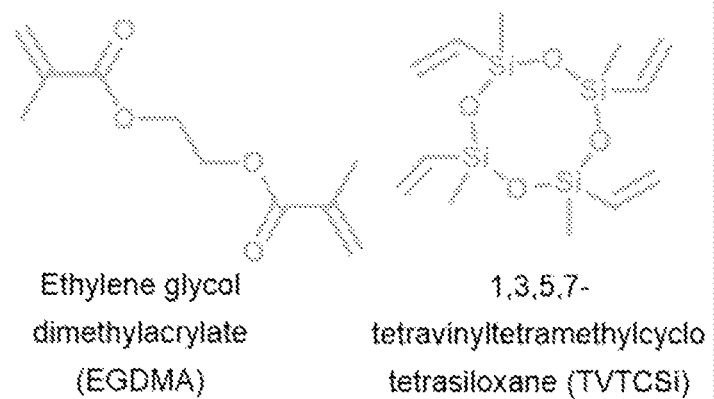
Figure 1D:
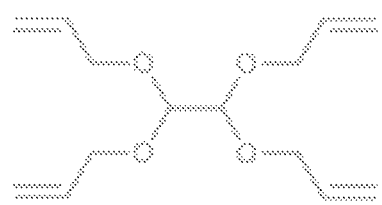

The inventors have provided an improved method of inverse vulcanization utilising catalysis. This catalysis enables a new series of crosslinkers to be used (FIG. 1c, d), resulting in novel polymers, as well as improving the reaction conditions and properties of existing sulfur-rich (i.e. sulfur-based) polymers.

Catalytic inverse vulcanization has been demonstrated for the first time by the inventors. This process is shown to work with a range of catalysts, including low cost and non-toxic metals. However, some common vulcanisation catalysts, such as ZnO have been shown by the inventors to have no effect on the inverse vulcanisation process. This suggests that not all common vulcanisation accelerators will have a catalytic effect on inverse vulcanisation process.

In comparison to un-catalysed inverse vulcanization, the use of catalysts allows the reaction temperature and time to be reduced, the properties of the polymers to be improved (e.g. glass transition temperature, resistance to creep, mercury uptake), and the production of dangerous $H_2S$ gas to be significantly inhibited. These factors are likely to greatly enable scale up and use of these fascinating and unique new materials. Several new high sulfur polymers have been reported, including from crosslinkers that are unreactive without catalysis. The unlocking of acrylate crosslinker systems significantly increases the number of viable systems.

Hydrogen sulphide is a common by-product of the uncatalyzed inverse vulcanisation process. The use of the catalysts described herein can significantly reduce highly toxic $H_2S$ generation from the inverse vulcanisation reaction. This is a critical issue affecting industrialisation of the inverse vulcanisation process.

Surprisingly, it has been found that some known accelerators for standard vulcanisation, such as zinc oxide, do not demonstrate any catalytic activity in the inverse vulcanisation process. Published papers on inverse vulcanisation show the mechanism to be the addition of sulfur across the double bond of the crosslinker (see e.g. Pyun, Nature Chemistry, 2013). Conversely, published papers investigating the mechanism of conventional vulcanisation show bonds forming between the organic species and the sulfur by hydrogen abstraction, so that the double bonds remain (see e.g. Nieuwenhuizen et al, Journal of the American Chemical Society, 1999). This suggests that inverse vulcanisation has a different mechanism of reaction to conventional vulcanisation. Thus, it would be unexpected for conventional vulcanisation accelerators to effectively catalyse the inverse vulcanisation process. However, the inventors have demonstrated that certain accelerators, such as those defined herein, can effectively catalyse the inverse vulcanisation reaction, despite the different reaction mechanisms.

Catalysts Screening

Figure 1E:
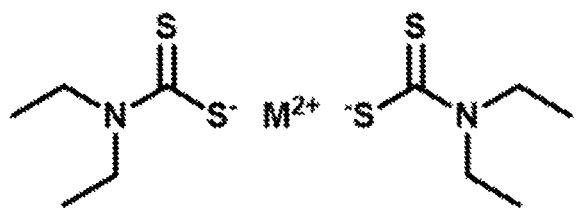
Figure 1E:
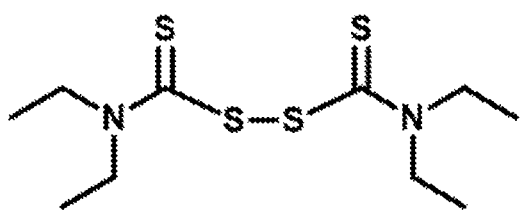
Figure 1E:
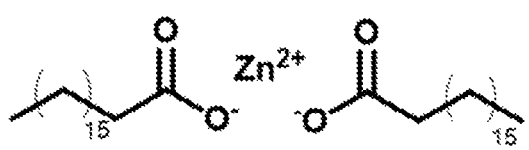
Figure 1E:
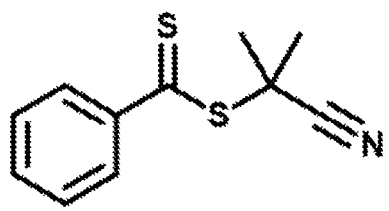

When screening potential crosslinkers, some were found to be un-reactive to sulfur even over 200° C. The introduction of catalysts into this inverse vulcanization was trialled (FIG. 1e, table 1). The reaction of cross-linker (ethylene glycol dimethacrylate) EGDMA with sulfur was used as a model reaction, as it was found to be un-reactive without catalysis.

TABLE 1

Screening of catalysts for inverse vulcanisation of sulfur with EGDMA[a]

| Catalyst: | Observation: | Results:[b] |
|---|---|---|
| ZnO | Yellow cloudy solution | No reaction |
| Zn | Yellow cloudy solution | No reaction |
| $ZnCl_2$ | Yellow cloudy solution | No reaction |
| $FeCl_2$ | Yellow-green cloudy solution | No reaction |
| CuO | Brown-yellow cloudy solution | No reaction |
| $CuCl_2$ | Brown-yellow cloudy solution | No reaction |
| Zn-stearate | Orange-brown solution | Partially reacted |
| Zn-diethyldithiocarbamate | Dark-red solid | Fully reacted |
| Fe-diethyldithiocarbamate | Black-green solid | Fully reacted |
| Co-diethyldithiocarbamate | Dark-brown solid | Fully reacted |
| Cu-diethyldithiocarbamate | Dark-red solid | Fully reacted |
| Ni-diethyldithiocarbamate | Dark-brown solid | Fully reacted |
| Na-diethyldithiocarbamate | Dark-red solid | Fully reacted |
| Thiram | Yellow-orange-red inhomogeneous solid | Partially reacted |
| 2-Cyano-2-propyl benzodithioate | Yellow cloudy solution | No reaction |

[a]The reaction was heated at 135° C. for 10 hours, with stirring. Weight ratio of cross-linker (EGDMA, 5 g) and sulfur (5 g) of 1:1 and 1 wt.% catalyst loading.
[b]partly reacted = some polymer formed, but unreacted $S_8$ remains; fully reacted = no remaining $S_8$ detected by DSC or PXRD.

Figure 7:
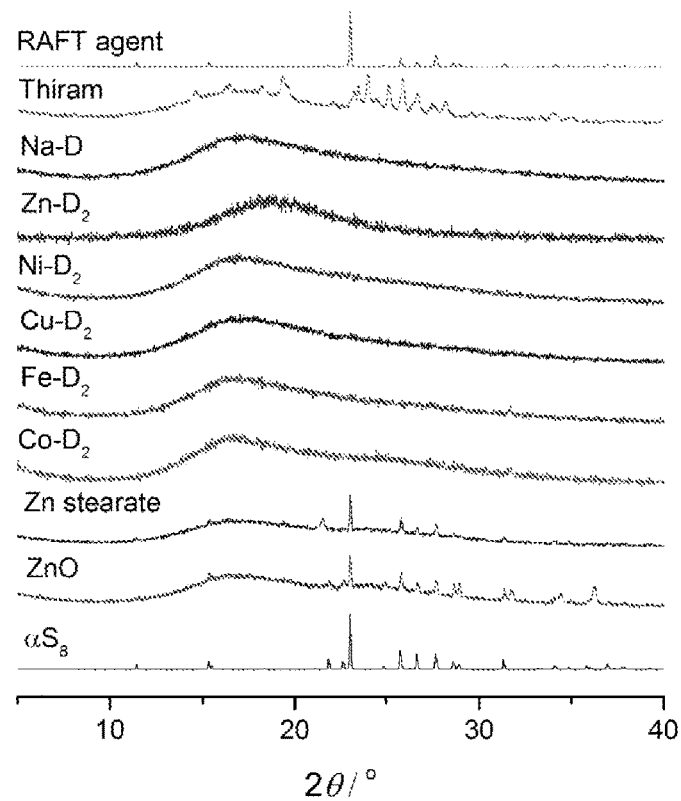
FIG. 7. PXRD diffraction of the products of sulfur reacted with EGDMA (1:1 mass ratio, 135° C., 10 hours with stirring, followed by a 10 hour cure at 140° C. Catalyst loading was 1 wt. %. Zinc oxide and Zn stearate catalysts show residual S& crystals still present. All diethyldithiocarbamate catalysts (-D) were amorphous, indicating the absence of depolymerized $S_8$ crystals. Polymerisation of EGDMA occurred with thiram, but poor mixing and incomplete incorporation of the sulfur, with $γS_8$ crystals evident. The RAFT agent used was 2-Cyano-2-propyl benzodithioate, but showed no inclusion of the sulfur.

Sulfur, by itself, is a slow vulcanising agent, requiring high temperatures and long heating periods.[38] Metal salts, oxides and complexes have been successfully applied as accelerators for conventional vulcanisation,[38] ZnO being one of the most commonly used. However, ZnO did not show catalytic activity for this inverse vulcanisation reaction, nor did inorganic complexes from copper, zinc, or iron chloride (Entries 1-6, Table 1, FIG. 7). However, zinc stearate[39] did show some catalytic activity, although even after curing there was unreacted or depolymerised sulfur.

Figure 8:
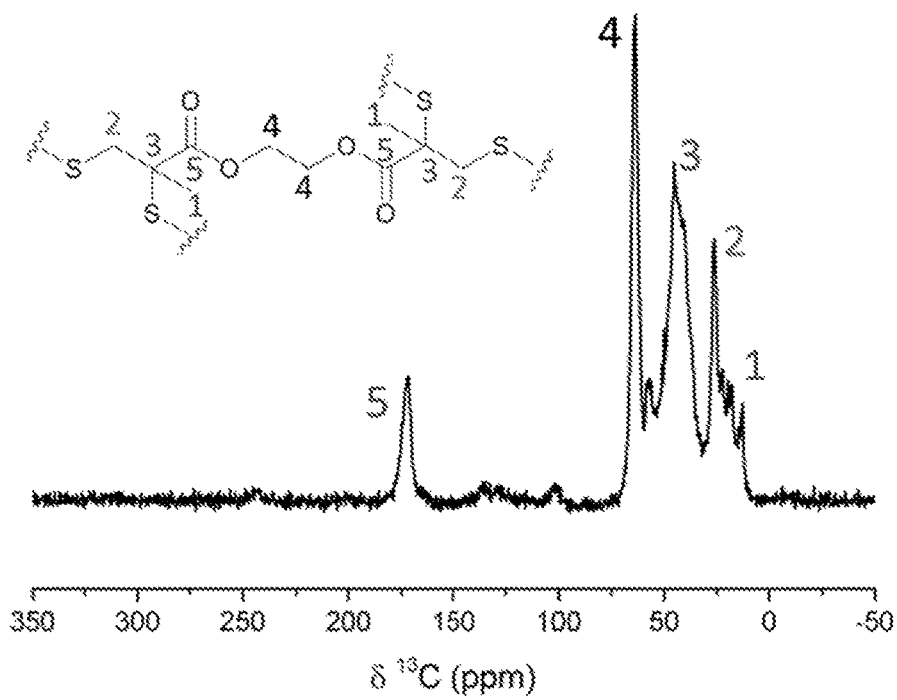
FIG. 8. Solid state $^{13}$C NMR spectra of ethylene glycol dimethylacrylate (EGDMA) after polymerisation with sulfur. Conditions: equal mass of sulfur and crosslinker, 1 wt. % $ZnD_2$ catalyst, 135° C. The spectrum shows the formation of C—S bonds, and near complete loss of C═C signal.
Figure 9:
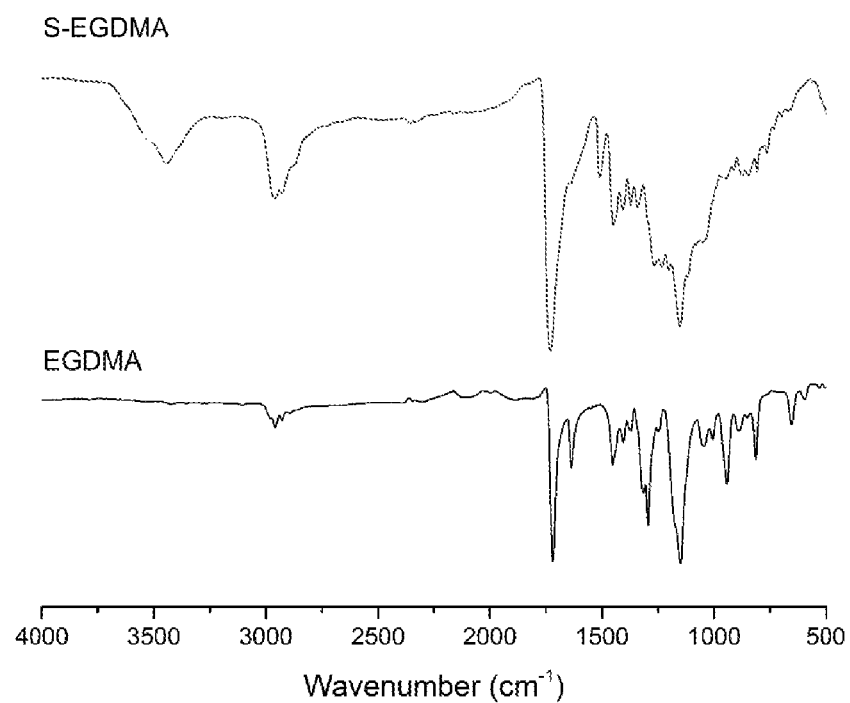
FIG. 9. FT-IR spectra of EGDMA monomer, bottom, and after polymerization with sulfur, top. The reaction was carried out at a 1:1 mass ratio of sulfur to crosslinker, 5 wt. % $ZnD_2$ catalyst loading, at 135° C. After polymerization there is a reduction in the signal at ~1650 $cm^{-1}$ of the C═C stretching vibrations. There is also a reduction, in the fingerprint region, of the alkene C—H bending modes at ~650, 800, 950 $cm^{-1}$.
Figure 10:
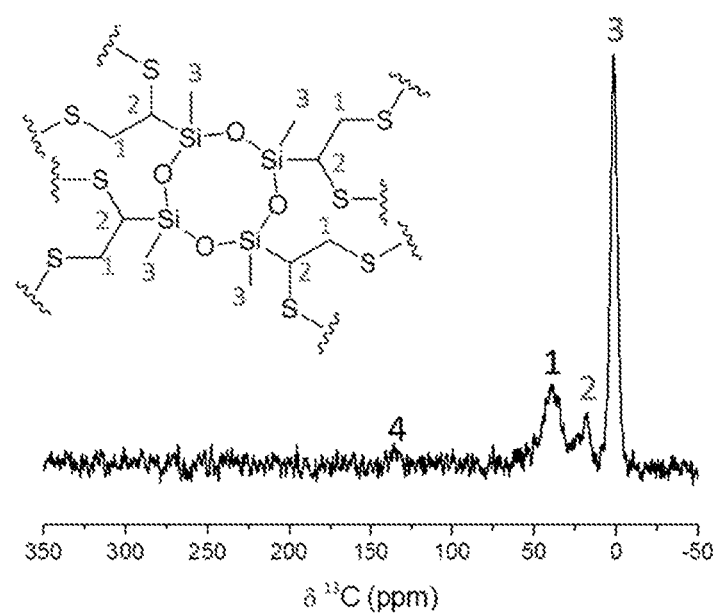
FIG. 10. Solid state $^{13}$C NMR spectra of 1,3,5,7-tetravinyltetramethylcyclotetrasiloxane (TVTCSi) after polymerisation with sulfur. Conditions: equal mass of sulfur and crosslinker, 1 wt. % $ZnD_2$ catalyst, 135° C. The spectra shows the formation of C—S bonds, and almost complete loss of C═C signals (4).
Figure 11:
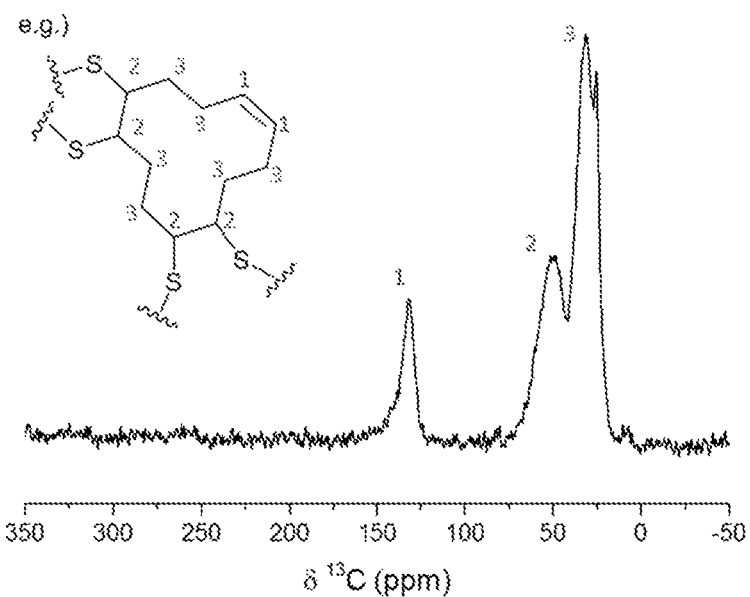
FIG. 11. Solid state $^{13}$C NMR spectra of 1,5,9-Cyclodocatriene (CDDT) after polymerisation with sulfur. Conditions: equal mass of sulfur and crosslinker, 1 wt. % $ZnD_2$ catalyst, 135° C. The spectra shows the formation of C—S bonds, but incomplete addition across the double bonds.
Figure 12:
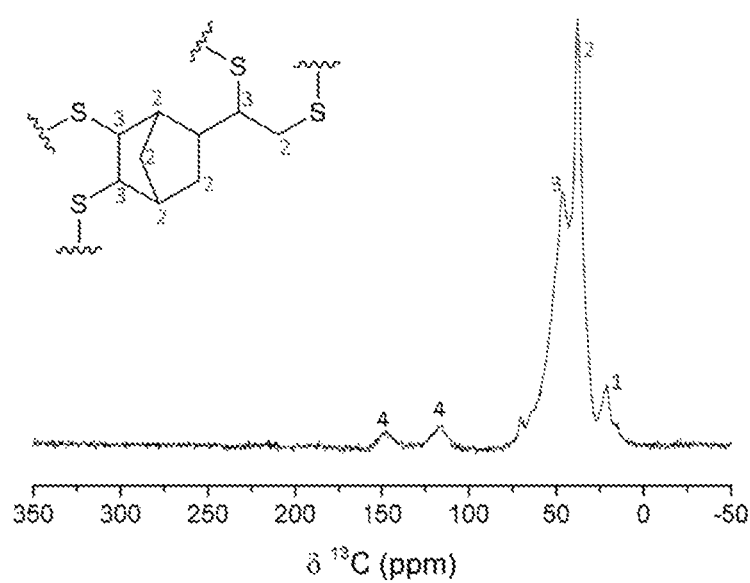
FIG. 12. Solid state $^{13}$C NMR spectra of 5-vinylidene-2-norbornen (VNB) after polymerisation with sulfur. Conditions: equal mass of sulfur and crosslinker, 1 wt. % $ZnD_2$ catalyst, 135° C. The spectrum shows the formation of C—S bonds, and significant loss of C═C signal (4). This signal at position (1) arises from the —$CH_3$ moiety that results from a small proportion of VNB isomerizing to 5-ethylidene-2-norbornene.
Figure 13:
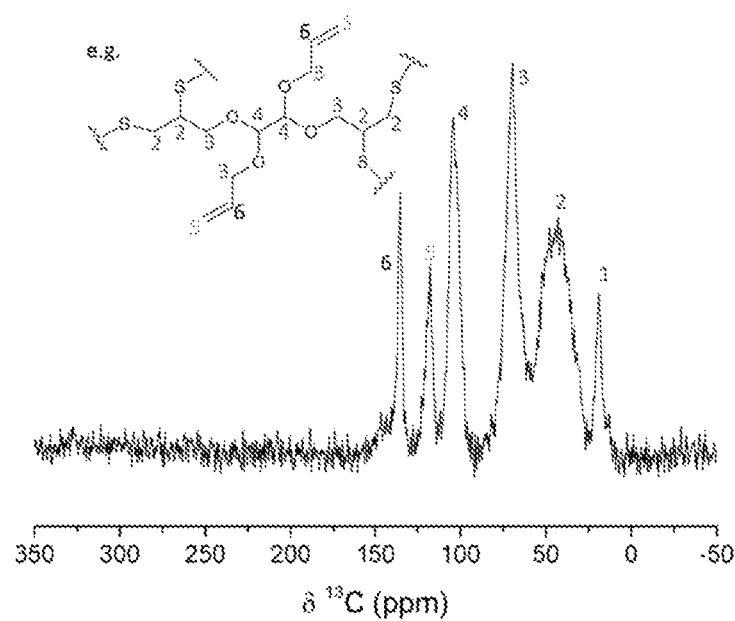
FIG. 13. Solid state $^{13}$C NMR spectra of 5-vinylidene-2-norbornen (VNB) after polymerisation with sulfur. Conditions: equal mass of sulfur and crosslinker, 1 wt. % $ZnD_2$ catalyst, 135° C. The spectrum shows the formation of C—S bonds, though still some significant C═C signals still present-indicative of the relatively low reactivity of this crosslinker that for many of the polymerized crosslinkers fewer than all four double bond positions may have reacted. This cause of the signal at position (1) is not immediately apparent, as nothing in the structure of the crosslinker or polymer should account for this. We hypothesize that some degree of isomerization, shifting the double bond position, or proton migration during reaction, may generate primary alkyl groups.
Figure 14:
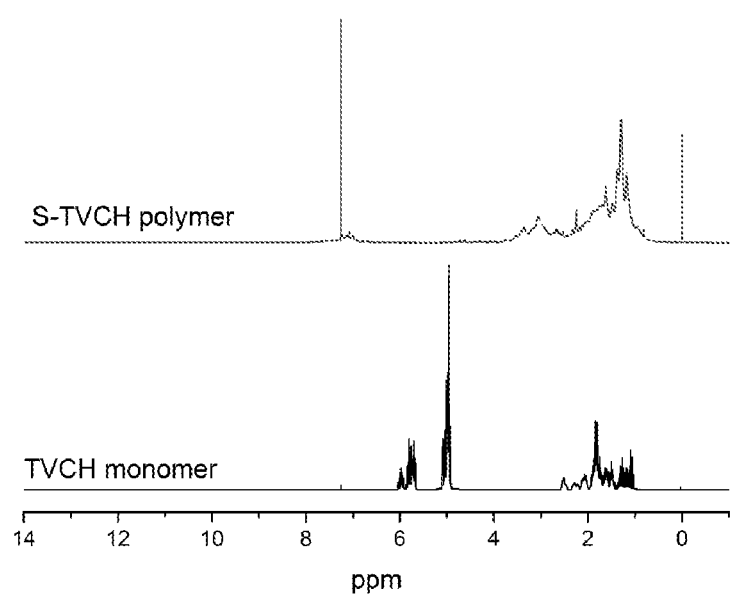
FIG. 14. $^1$H NMR spectra of 1,2,4-Trivinyl-Cyclohexane (TVCH), and after polymerization with sulfur. Polymerization with $ZnD_2$ as catalysts produced a material sparingly soluble in chloroform. NMR confirms conversion of all TVCH crosslinker. The NMR shown that there was no C=C double bonds remaining. The solubility of these materials may provide some very unique applications by allowing solution process-ability. For example, casting or coating of the materials. New peaks appearing in the 3-4 ppm range are indicative of H—C—S protons. It is likely that the close proximity of two of the alkene positions (i.e. the 3 and 4 substituted positions of 1,3,4 trivinyl cyclohexane), lead to a significant amount of intramolecular rather than intermolecular crosslinking-hence increasing the solubility.
Figure 15:
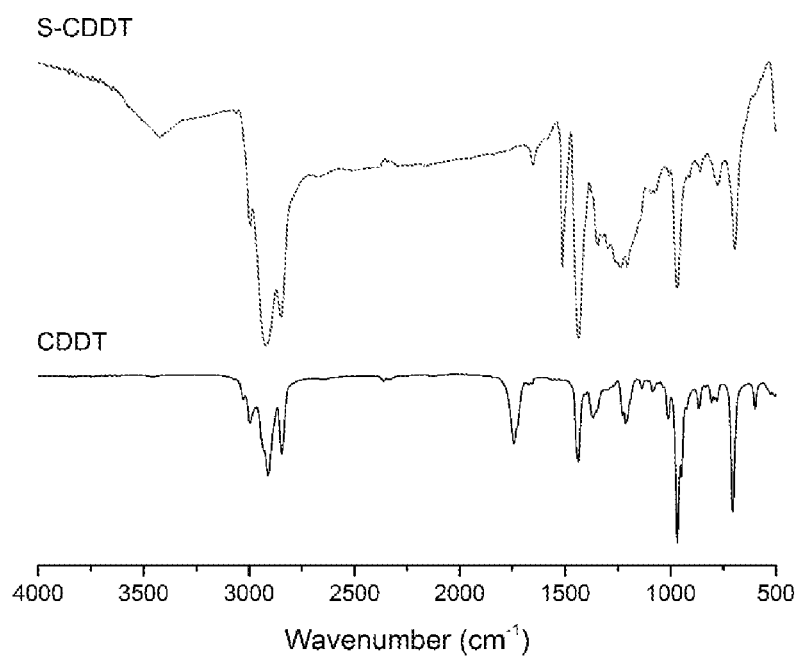
FIG. 15. FT-IR spectra of CDDT monomer, bottom, and after polymerization with sulfur, top. The reaction was carried out at a 1:1 mass ratio of sulfur to crosslinker, 5 wt. % $ZnD_2$ catalyst loading, at 135° C. After polymerization there is a reduction in the signals at ~3050 and ~1750 cm$^{-1}$, of the C=C—H and C=C stretching vibrations. There is also a reduction, in the fingerprint region, of the alkene C—H bending modes at ~600, 850 and 950 cm$^{-1}$.
Figure 16:
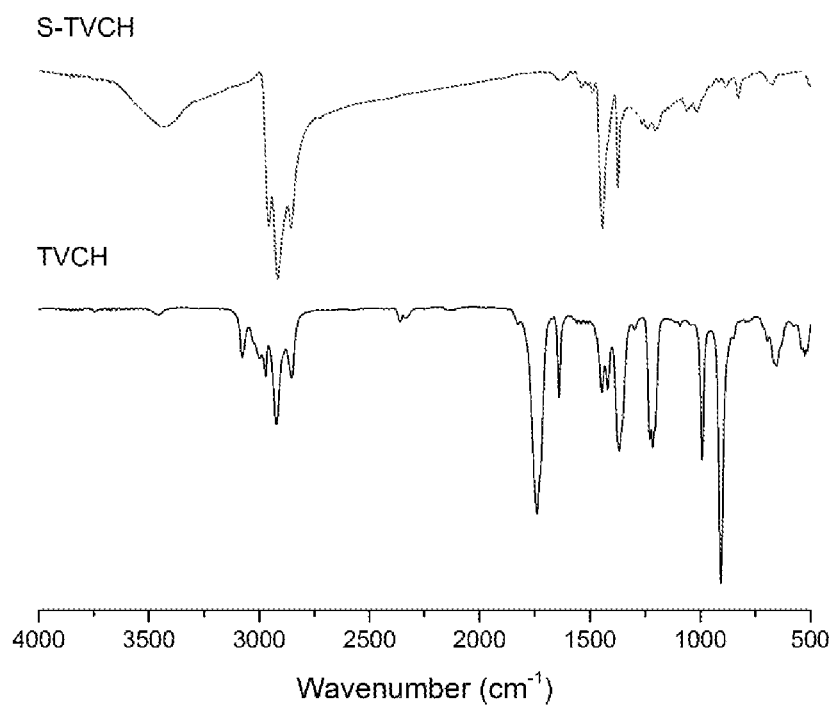
FIG. 16. FT-IR spectra of TVCH monomer, bottom, and after polymerization with sulfur, top. The reaction was carried out at a 1:1 mass ratio of sulfur to crosslinker, 5 wt. % $ZnD_2$ catalyst loading, at 135° C. After polymerization there is a significant reduction in the signals at ~3100 cm$^{-1}$, of the C=C—H vibrations, as well as at ~1750 and 1650 cm$^{-1}$, of the two inequivalent C=C stretching positions. There is also a significant reduction, in the fingerprint region, of the alkene C—H bending modes at ~650, 900, 1000 cm$^{-1}$. The almost complete disappearance of these positions suggests a very high level of conversion.
Figure 17:
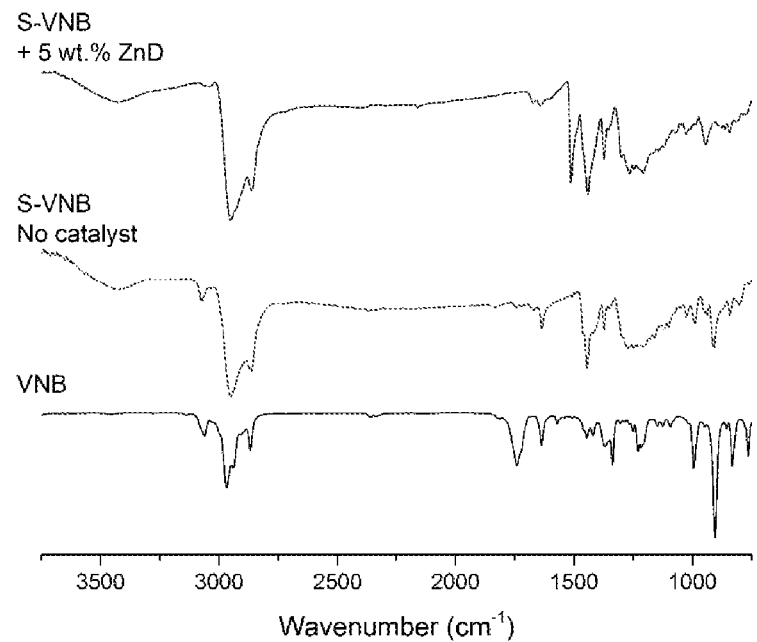
FIG. 17. FT-IR spectra of VNB monomer, bottom, and after polymerization with sulfur, top. The reaction was carried out at a 1:1 mass ratio of sulfur to crosslinker, at 135° C. After polymerization without catalyst there is a reduction in the signals at ~3100 cm$^{-1}$, of the C=C—H vibrations, as well as at ~1750 and 1650 cm$^{-1}$, of the two inequivalent C=C stretching positions. It can be noted that there is still some remaining double bond character, and that one of the positions appears to react more readily than the other. There is also a reduction, in the fingerprint region, of the alkene C—H bending modes at ~750, 900, 1000 cm$^{-1}$. When $ZnD_2$ catalyst is used there is almost complete conversion of both double bonds.
Figure 18:
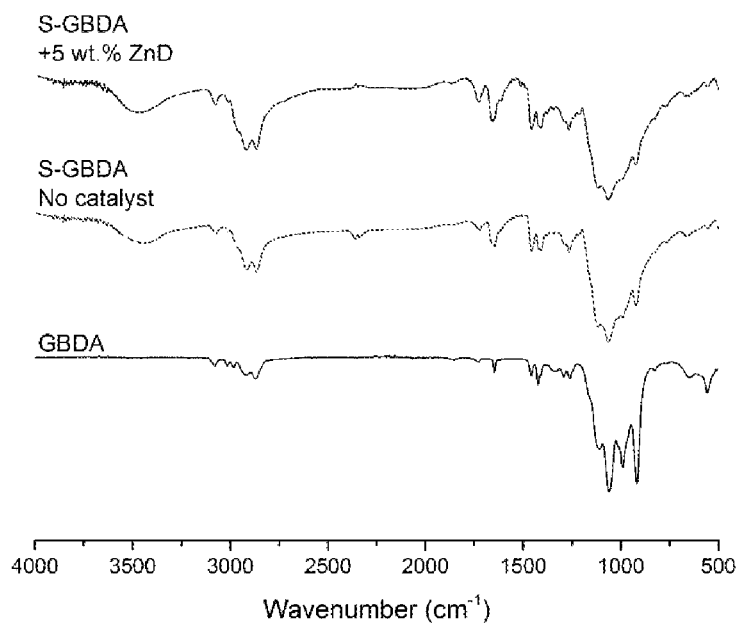
FIG. 18. FT-IR spectra of GBDA monomer, bottom, and after polymerization with sulfur, top. The reaction was carried out at a 1:1 mass ratio of sulfur to crosslinker, at 135° C. After polymerization there is a slight reduction in the signal at ~3100 cm$^{-1}$, corresponding to C=C—H vibrations, but little if any reduction seen at ~1650 cm$^{-1}$, corresponding to C=C stretching. There is also a very slight reduction, in the fingerprint region, of the alkene C—H bending modes at ~550, 900, 1000 cm$^{-1}$. The significant remaining C=C signals indicate there has not been a complete reaction, even when catalyst is used.
Figure 19:
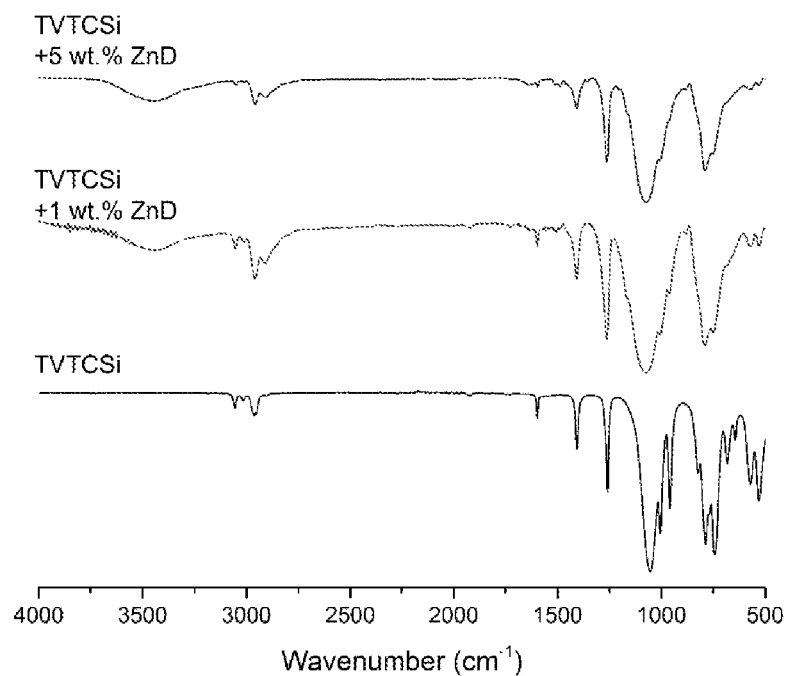
FIG. 19. FT-IR spectra of TVTCSi monomer, bottom, and after polymerization with sulfur, top. The reaction was carried out at a 1:1 mass ratio of sulfur to crosslinker, at 160° C. After polymerization with 1 wt. % $ZnD_2$ there is a slight reduction in the signal at ~3050 cm$^{-1}$, corresponding to C=C—H vibrations, but little if any reduction seen at ~1600 cm$^{-1}$, corresponding to C=C stretching. There is also a very slight reduction, in the fingerprint region, of the alkene C—H bending modes at ~550, 950, 1000 cm$^{-1}$. The significant remaining C=C signals indicate there has not been a complete reaction—perhaps unsurprising considering the relative unreactivity of this crosslinker compared to the others, requiring an elevated temperature (160 rather than 135° C.) in order to react. After polymerization with 5 wt. % catalyst there is noticeably more depletion of the C=C bonds.
Figure 20:
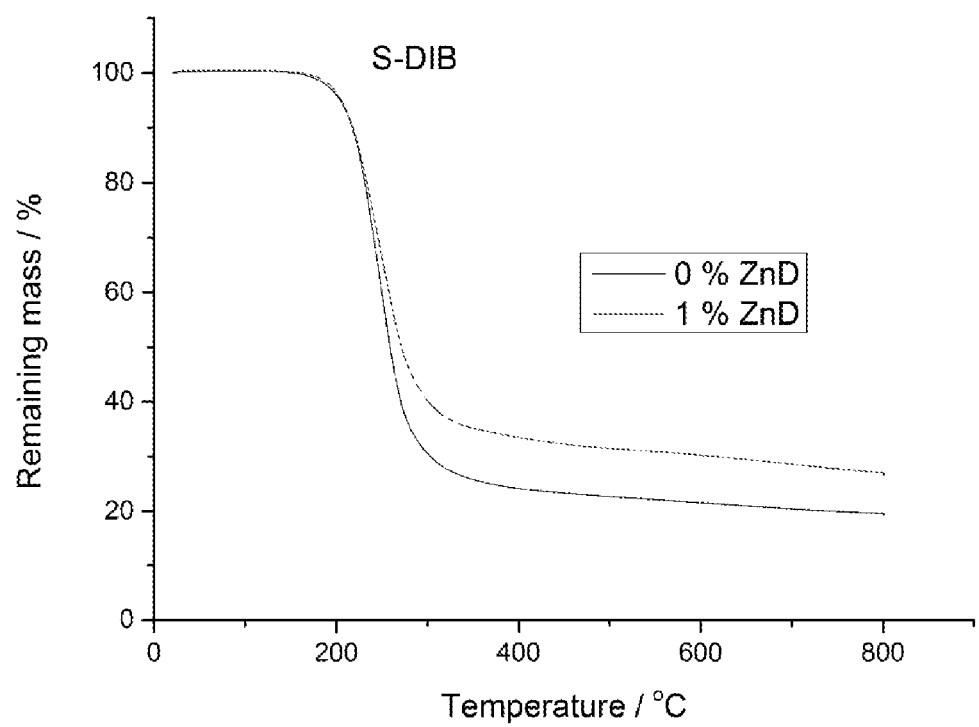
FIG. 20: Thermogravimetric analysis, under nitrogen, of S-DIB copolymers (equal mass ratio of sulfur to crosslinker) with and without catalysis by Zn diethyldithiocarbamate.
Figure 21:
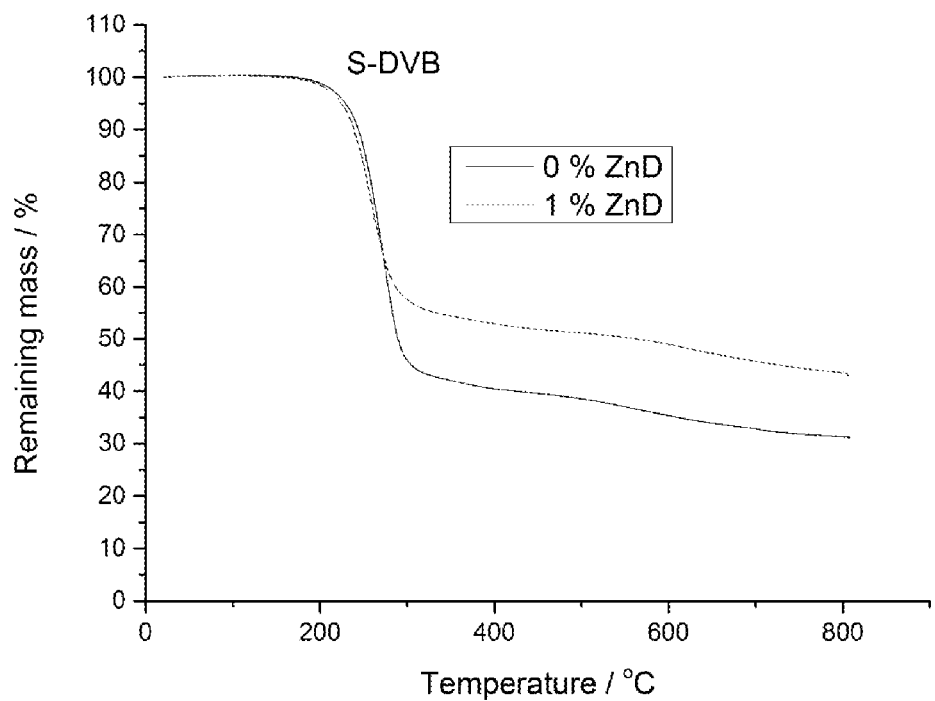
FIG. 21: Thermogravimetric analysis, under nitrogen, of S-DVB copolymers (equal mass ratio of sulfur to crosslinker) with and without catalysis by Zn diethyldithiocarbamate.

Replacing the stearate ligand with diethyldithiocarbamate (D), the reaction becomes noticeably quicker, with the colour changing from yellow to orange-red within minutes after the addition of cross-linker, later becoming a homogeneous rose-red clear solution and finally a deep-red viscous gel, seizing the stirrer bar. In contrast, the same reaction without this catalyst affords two separated layers with minimal reaction even up to 200° C. The catalysed product is a hard black solid, insoluble even in strong organic solvents such as tetrahydrofuran and chloroform. Solid state nuclear magnetic resonance spectroscopy (NMR) shows evidence of C—S bond formation, and loss of C=C bonding, as does Infra-red spectroscopy (FIGS. 8, 9). The diethyldithiocarbamate ligand seems to be more crucial than the metal, as other metals such as Fe and Cu were found to also work effectively with this ligand. NaD (sodium diethyldithiocarbamate) notably reacted the quickest with EGDMA, forming a gel in only a few minutes. However, this short mixing time may lead to inhomogeneous products and NaD was not compatible with all crosslinkers.

Like ZnO, $ZnD_2$ is known to be an effective accelerator in conventional vulcanisation. Unlike ZnO, ZnD showed activity for a broad range of crosslinkers in the inverse vulcanisation process, and was therefore selected for further optimisation. It is important to note the viability of metals such as Fe, Co, or Cu which may be preferable in terms of cost or safety. With several metal complexes showing viability, it seemed possible the catalytic effect could arise from simply the D ligand itself, rather than the metal, by a process similar to reversible addition-fragmentation chain-transfer polymerization (RAFT).[40] To test this, thiram (effectively D-D) and a common RAFT agent (2-Cyano-2-propyl benzodithioate) were also trialled, but showed poor and no activity, respectively.

Figure 2A:
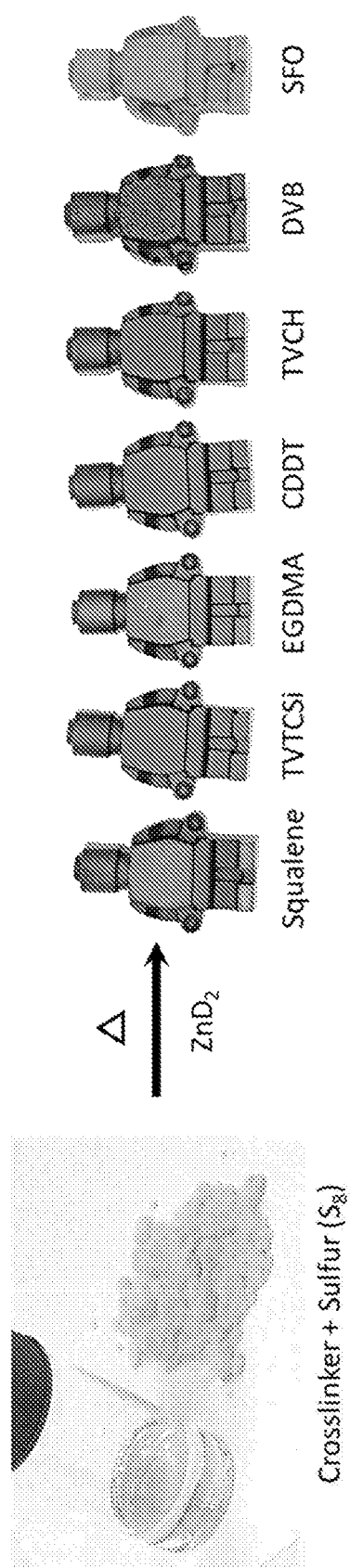
FIG. 2: a) Photographs of a crosslinker (EGDMA) and elemental sulfur and examples of moulded objects of catalysed sulfur polymers. b) Volume of gas produced during reactions of sulfur with crosslinkers, with (dark grey bars) and without (light grey bars) catalysts (see ESI for details). c) Offset DSC traces of sulfur reacted with EGDMA. In the absence of catalyst, the melting of $S_8$ crystals at ~120° C. is apparent. Inset photograph shows the colour of the products (from left to right: 0, 1, and 5 wt. % catalyst). d) Offset PXRD patterns of sulfur reacted with EGDMA, in the absence of catalyst the diffraction of $S_8$ crystals is apparent. e) Reaction time plotted against catalyst loading at 135° C. *Uncatalyzed DIB and DCPD took between 12 and 18 hours (unobserved) so plotted as 18 hours. f) The yield of open reactions performed at 135° C., with (dark grey bars) or without (light grey bars) 1 wt. % ZnD catalyst. g) Glass transition temperature of Sulfur-squalene polymers as a function of ZnD catalyst loading, plotted as the average of three parallel reactions.

Effects of Catalysis:

As well as allowing previously unreactive EGDMA to be polymerized with sulfur, the Zn-diethyldithiocarbamate catalyst was also tested for a wide range of other crosslinkers both previously reported, and untested (FIG. 1b-d, 8-19, Tables 2-4, below). The figures show NMR data for some previously unreported polymers. All catalysed reactions formed solid polymers that could be moulded into objects (FIG. 2a), and that were thermally stable to 200° C. (FIGS. 20-29)

melting transition of $S_8$ crystals. Samples and conditions correspond to those listed in Table 2. Reaction temperatures are 135° C. unless stated otherwise. * No $S_8$ crystals were detected in the lower phase of the uncatalysed GBDA reaction, but the extremely long reaction time required for gelation (over 36 hours) led to significant sublimation of crystalline sulfur above this.

TABLE 2

| | Time until solidification, hours | | | |
|---|---|---|---|---|
| Crosslinker | 0 wt. % $ZnD_2$ | 1 wt. % $ZnD_2$ | 5 wt. % $ZnD_2$ | Comments |
| DIB | >12, <24 | 6.5 | 1 | |
| Limonene | 20 | 8.5 | 1 | |
| DVB | 3.5 | 1.5 | 0.85 | |
| DCPD | >12, <24 | 1.6 | 0.4 | |
| Squalene | >12, <24 | >12 (<24) | 1.5 | |
| Sunflower oil | >24 | >12 (<24) | <2 | S8 detected in all, 0% catalyst reaction still liquid after 24 hr |
| linseed | >24 | 4 | 2.5 | S8 detected at 0%, and trace S8 at 5% catalyst, 0% catalyst reaction still liquid after 24 hr |
| VNB | >12, <24 | >4, <6 | 2 | |
| CDDT | >12, <24 | 6 | 3 | Both CDDT and TVCH, at 0% catalyst loading, did react to form polymeric material, but with significant evaporation of the crosslinker, low yields, and unreacted sulfur sublimed on the sides of the vessel. |
| TVCH | >12, <24 | 6 | 2 | |
| TVTCSi | No reaction | 3.5 | 1.75 | Reacted at 160° C. (No reaction at any catalyst loading at 135° C. |
| EDGMA | No reaction | >12, <24 | >12, <24 | 0% looks like sulfur |
| GBDA | >36, <48 | >12, <24 | 2.5 | 0% catalyst loading reaction is prohibitively slow, taking over 36 hours to form a solid |

Table 2. Time taken from the start of reaction, until solidification of the reaction mixture causes the stirrer bar to cease. All reactions at 135° C. unless stated, all reactions performed with an equal crosslinker to sulfur mass, and on a 10 g scale, and in triplicate. The reactions were typically monitored for the first hour, and then in half hour intervals for the first 12 hours, then checked again after 24 hours (hence why the reaction time is listed as between 12 and 24 hours for some reactions).

TABLE 3

| | $S_8$ melting detected by DSC? | | |
|---|---|---|---|
| Crosslinker | 0 wt. % $ZnD_2$ | 1 wt. % $ZnD_2$ | 5 wt. % $ZnD_2$ |
| DIB | No | No | No |
| Limonene | No | No | No |
| DVB | No | No | No |
| DCPD | No | No | No |
| Squalene | No | No | Yes - slight |
| Sunflower oil | Yes | Yes | Yes |
| linseed | Yes | No | No |
| VNB | No | No | No |
| CDDT | Yes | No | No |
| TVCH | No | No | No |
| TVTCSi (135° C.) | Yes | Yes | Yes |
| TVTCSi (160° C.) | Yes | No | No |
| EDGMA | Yes | No | No |
| GBDA | No* | No | No |

Table 3: DSC allows the success of the reaction at stabilising the polymeric to be determined by detecting the

TABLE 4

| | $S_8$ crystals detected by PXRD? | | |
|---|---|---|---|
| Crosslinker | 0 wt. % $ZnD_2$ | 1 wt. % $ZnD_2$ | 5 wt. % $ZnD_2$ |
| DIB | No | No | No |
| Limonene | No | No | No |
| DVB | No | No | No |
| DCPD | No | No | No |
| Squalene | No | No | No |
| Sunflower oil | Yes $\alpha S_8$ | Yes $\alpha S_8$ | Yes $\alpha S_8$ |
| linseed | Yes $\alpha S_8$ | No | Yes - slight $\alpha S_8$ |
| VNB | No | No | No |
| CDDT | No | No | No |
| TVCH | No | No | No |
| TVTCSi (135° C.) | Yes $\alpha S_8$ | Yes $\alpha S_8$ | Yes $\alpha S_8$ |
| TVTCSi (160° C.) | Yes $\alpha S_8$ | No | Yes - very slight trace of $\gamma S8$ |
| EDGMA | Yes | No | No |
| GBDA | No* | No | No |

Table 4: PXRD allows the success of the reaction at stabilising the polymeric to be determined by detecting diffraction from crystalline $S_8$. Samples and conditions correspond to those listed in Table 2. Reaction temperatures are 135° C. unless stated otherwise. * No $S_8$ crystals were detected in the lower phase of the uncatalysed GBDA reaction, but the extremely long reaction time required for gelation (over 36 hours) led to significant sublimation of crystalline sulfur above this.

Figure 2B:
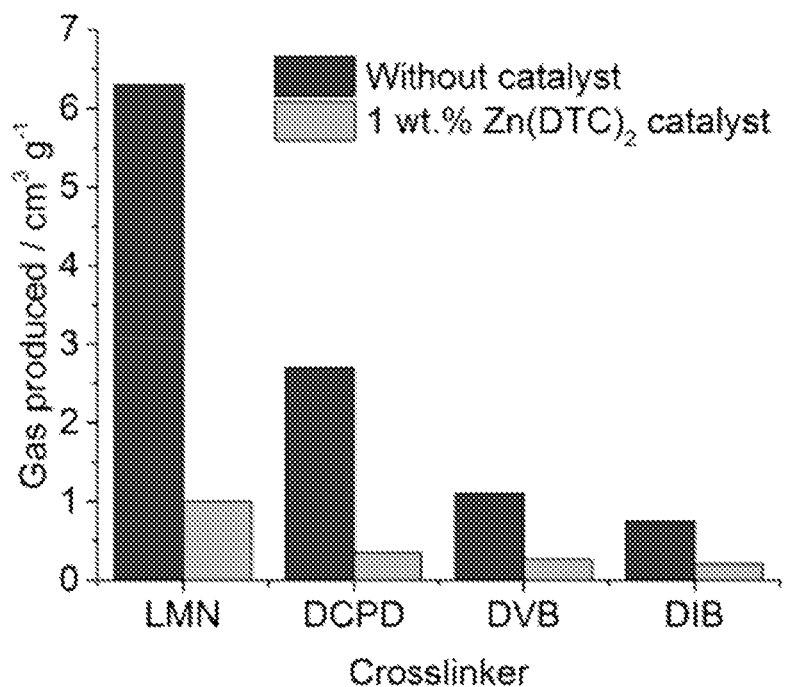
Figure 30:
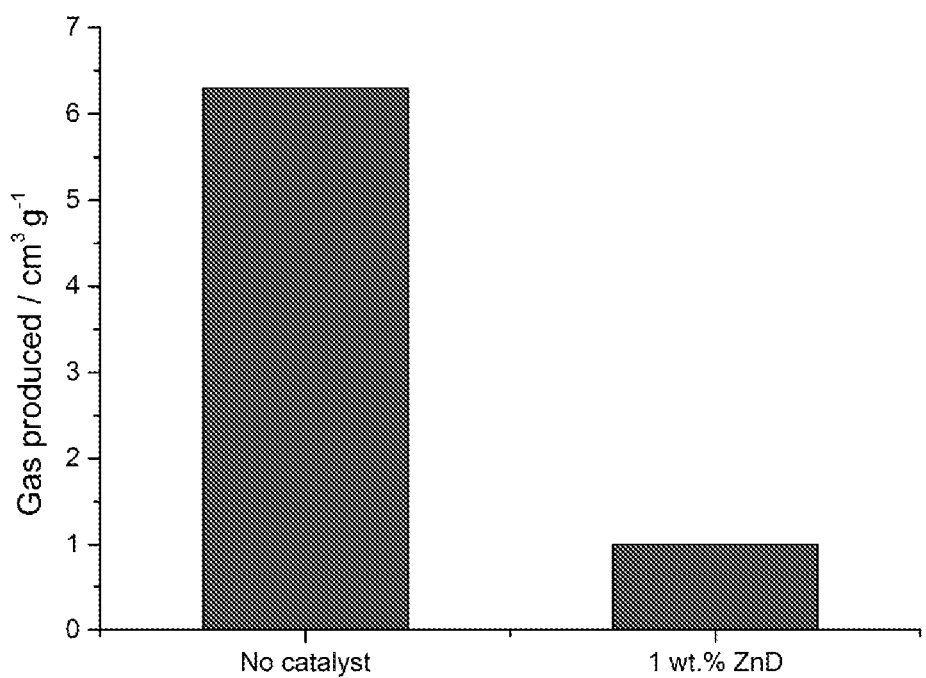
FIG. 30. Volume of gas produced during reactions of sulfur with limonene, with and without catalyst. Both reactions were at an equal mass ratio of sulfur to crosslinker, at 180° C.

Prevention of $H_2S$ Production During Polymerization:

The generation of toxic $H_2S$ gas as a by-product has been noted for some inverse vulcanization reactions.[26,41,42] To test this, reactions were performed both with and without catalyst, with temperatures chosen to achieve comparable rates of reaction, and the volume of gas produced was measured. Catalysed reactions were found to produce up to seven times less, down to negligible levels (FIG. 2b). This is likely the result of the lower temperatures needed, as higher temperatures are known to produce $H_2S$ and thiols in conventional vulcanization, 36 but may also stem from differences to the reaction mechanism itself; Reactions of sulfur with limonene produced significantly less $H_2S$ in the presence of a catalyst, even when performed at the same temperatures (FIG. 30).

Figure 2C:
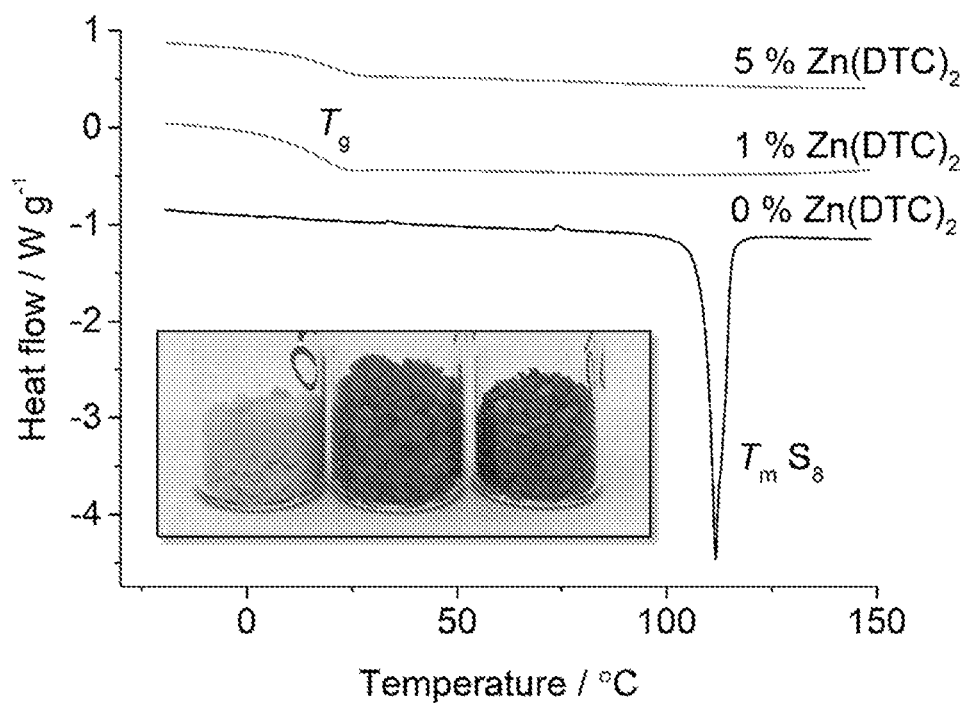
Figure 2D:
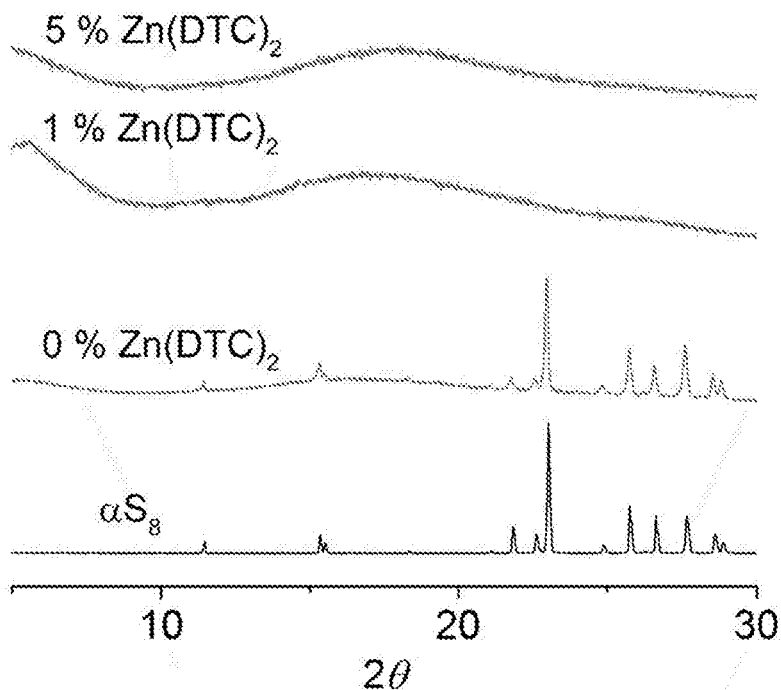

Unlocking New Crosslinkers:

A key benefit of catalytic inverse vulcanization, is to bring unreactive cross-linkers into use, thus expanding the range of possible S-rich polymers. Along with EGDMA, glyoxal bis(diallylacetate) (GBDA) and 1,3,5,7-tetravinyltetramethylcyclotetrasiloxane (TVTCSi) crosslinkers also only reacted viably with sulfur in the presence of catalysts. Monomeric sulfur, $S_8$, readily crystallises, and therefore if the polymerisation is not complete, or depolymerisation occurs, the presence of Se crystals can be detected in differential scanning calorimetry (FIG. 2c and tables 2,3), and by powder x-ray diffraction (PXRD) (FIG. 2d and table 4). The crosslinkers containing heteroatoms (FIG. 1d) all showed residual sulfur in the absence of catalyst, but complete reaction with catalyst. It is likely that the heteroatoms of these crosslinkers deactivate the vinylic positions. Unlocking the reactivity of acrylates, which do not react with sulfur on their own,[43] opens up many new potential crosslinkers. Accessing new crosslinkers is useful not only for the new polymers themselves, but also as co-monomers for blends, to control properties. For example, blending different crosslinkers with TVTCSi can produce stable polymers ranging from glassy solids with no detectable $T_g$ (with TCDD or DCPD), to rubbery solids with sub-room temperature $T_g$ (with EGDMA, 8.7° C.; or Farnesol, 4.3° C., See Table 5 below).

TABLE 5

| Entry | Cross-linkers | Tempt/° C. | Description | Tg |
|---|---|---|---|---|
| 6 | TVTCSi/CDDT | 135 | Black solid | None detected |
| 7 | TVTCSi/DCPD | 135 | Black solid | None detected |
| 8 | TMTVCSi/EGDMA | 135 | Black solid | 8.7° C. |
| 9 | TMTVCSi/Farnesol | 135 | Dark red solid | 4.3° C. |

Table 5-Blending crosslinkers with sulfur. Equal weight ratio of sulfur to crosslinker, and equal weight ratio of the two crosslinkers. Blending different crosslinkers with TVTCSi can produce stable polymers ranging from glassy solids with no detectable $T_g$ (+CDDT and +DCPD), to rubbery solids with sub-room temperature $T_g$ (+EGDMA, 8.7° C.; +Farnesol, 4.3° C., Table 5).

Figure 2E:
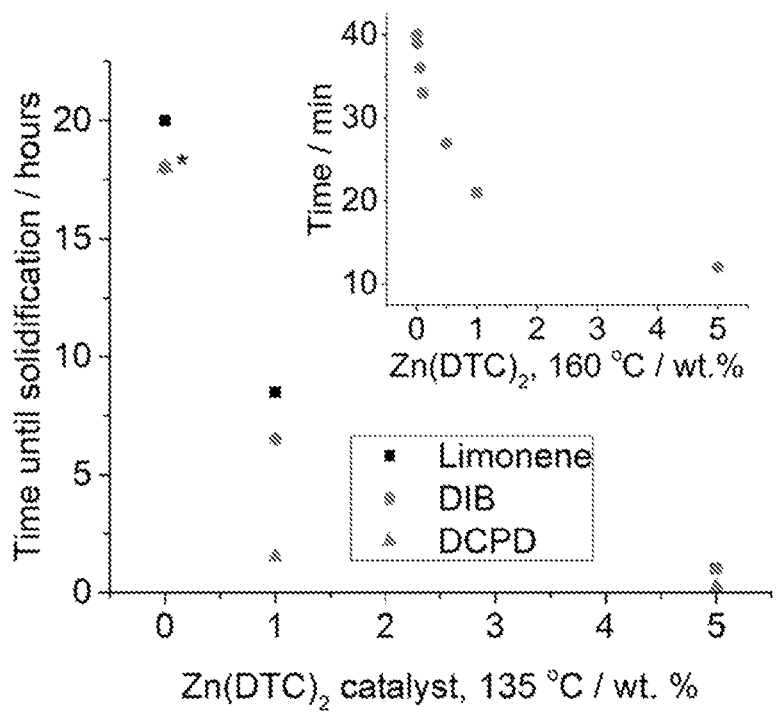
Figure 2F:
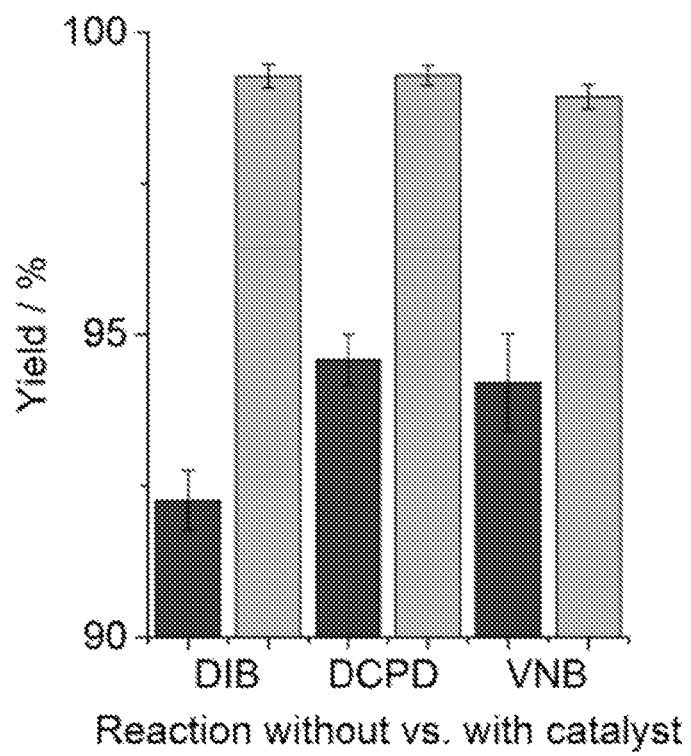
Figure 2G:
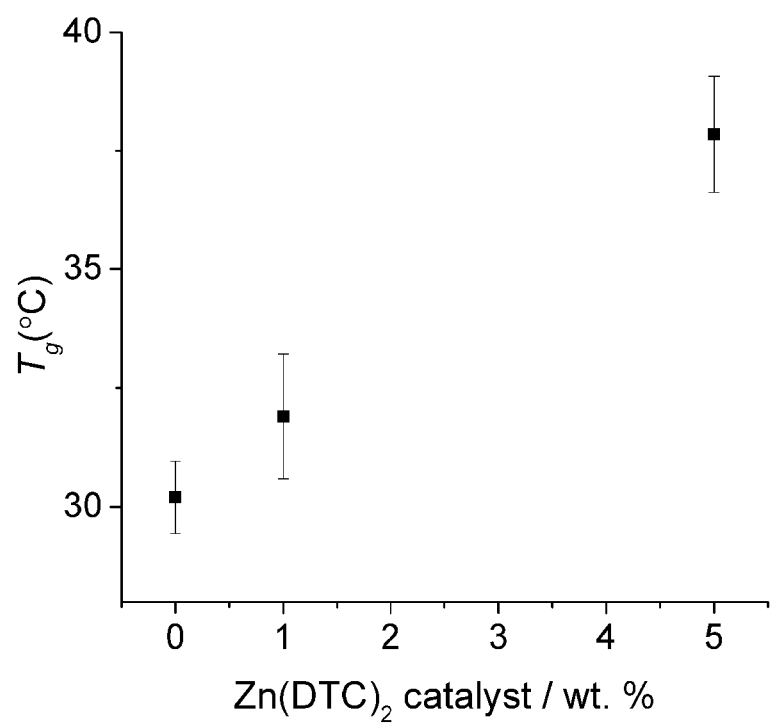
Figure 31:
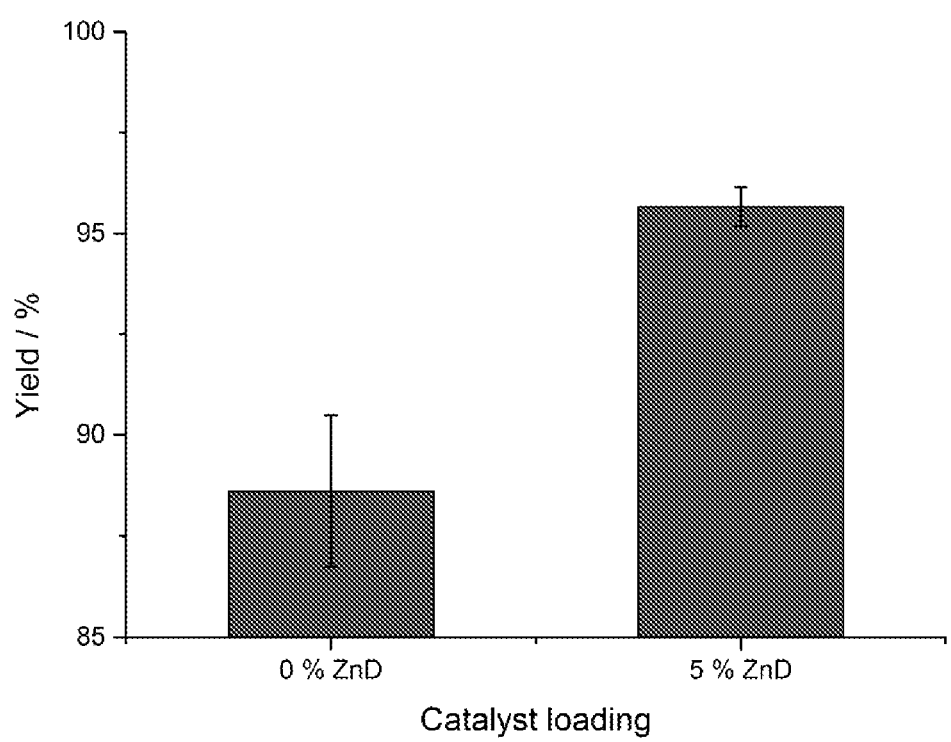
FIG. 31. Investigation of the effect of catalyst on reaction yield at higher temperatures (in comparison to FIG. 2f performed at 135° C. The crosslinker used was DCPD, and the crosslinker to sulfur mass ratio was 1:1 (5 g each), reacted at 160° C. with stirring in a 40 mL open glass vial, for 12 hours. This shows catalysis also provides a benefit to yield in the high temperature regime.
Figure 32:
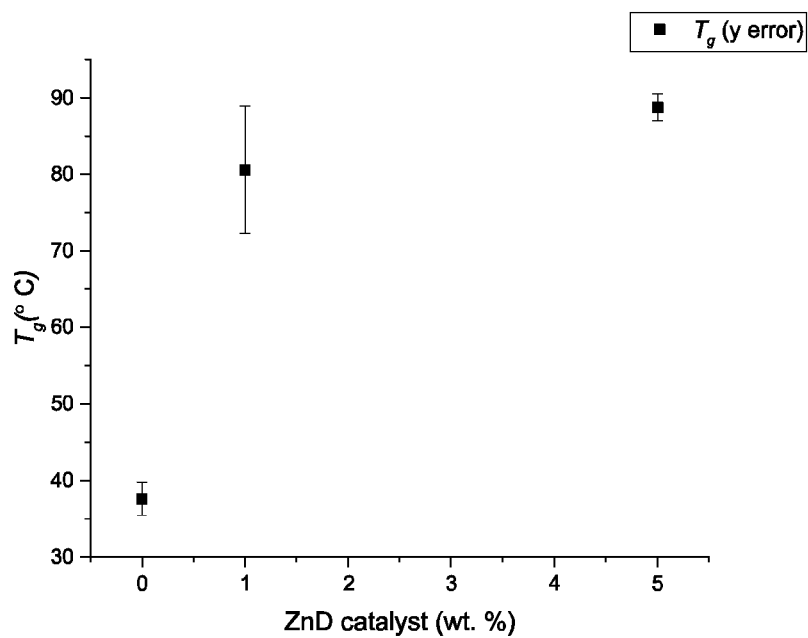
FIG. 32. Glass transition temperatures (from DSC) as a function of catalyst loading for the polymerization of sulfur with DCPD. The reaction was carried out at a 1:1 mass ratio of sulfur to crosslinker, without catalyst, at 135° C., and in triplicate. Standard deviation is given for the average of three parallel reactions. There is a significant increase in glass transition temperature for the 1% catalyzed sample in comparison to the uncatalyzed sample. There is then a slight, though reduced increase when the catalyst loading is increased to 5%.
Figure 33:
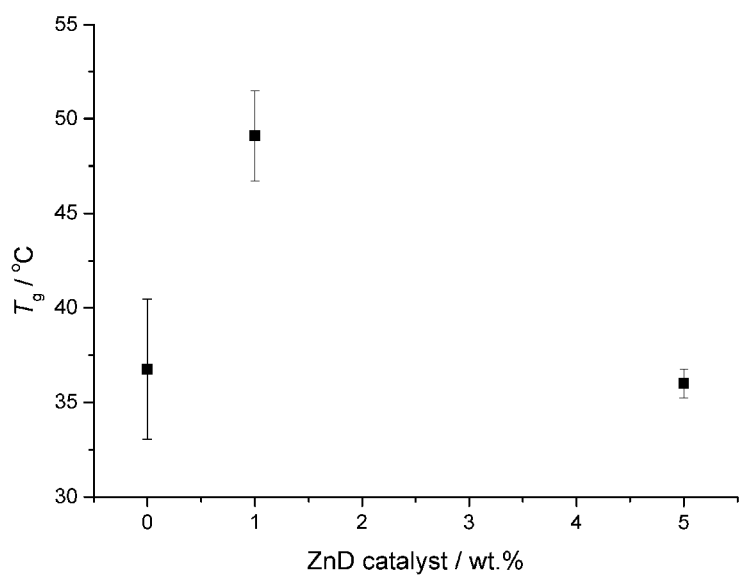
FIG. 33. Glass transition temperatures (from DSC) as a function of catalyst loading for the polymerization of sulfur with DIB. The reaction was carried out at a 1:1 mass ratio of sulfur to crosslinker, without catalyst, at 135° C., and in triplicate. Standard deviation is given for the average of three parallel reactions. There is an increase in glass transition temperature for the 1% catalyzed sample in comparison to the uncatalyzed sample. There is then a reduction when the catalyst loading is increased to 5%, presumably as this is then effectively an excess loading of catalyst, beyond which the catalyst is not providing additional benefit to the reaction, but is plasticising the material, as a small molecular additive.
Figure 34:
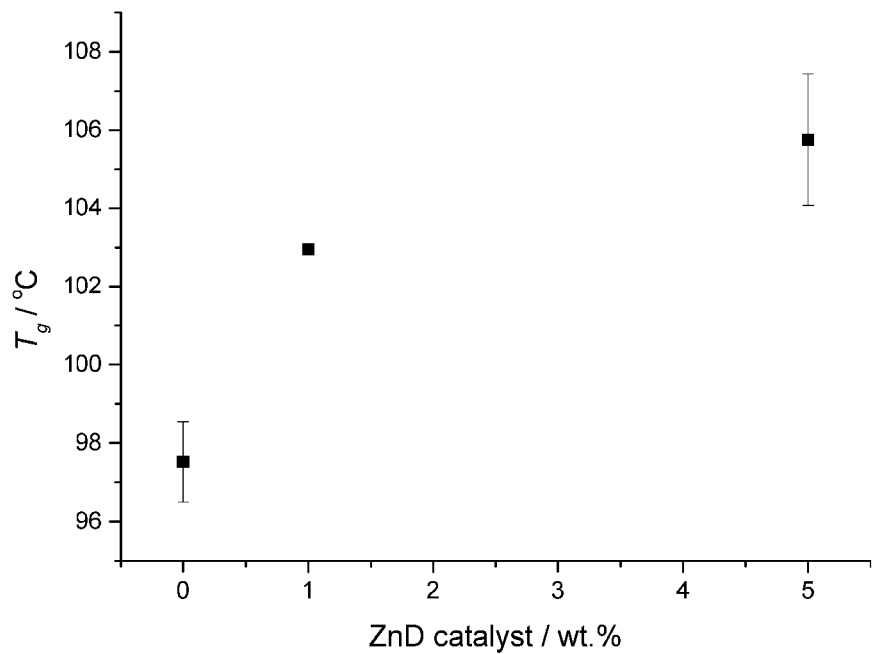
FIG. 34. Glass transition temperatures (from DSC) as a function of catalyst loading for the polymerization of sulfur with DVB. The reaction was carried out at a 1:1 mass ratio of sulfur to crosslinker, without catalyst, at 135° C., and in triplicate. Standard deviation is given for the average of three parallel reactions. There is a significant increase in glass transition temperature for the 1% catalyzed sample in comparison to the uncatalyzed sample. There is then a slight, though reduced increase when the catalyst loading is increased to 5%.
Figure 35:
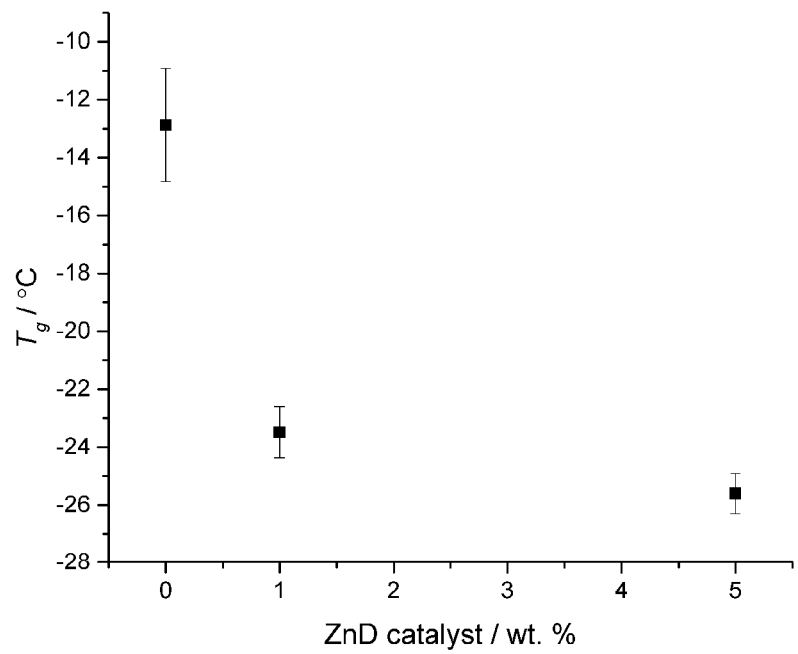
FIG. 35. Glass transition temperatures (from DSC) as a function of catalyst loading for the polymerization of sulfur with linseed oil. The reaction was carried out at a 1:1 mass ratio of sulfur to crosslinker, without catalyst, at 135° C., and in triplicate. Standard deviation is given for the average of three parallel reactions. There is a decrease in the $T_gS$ of the polymers as a result of catalysis. It is not clear why this is the case, however, as linseed oil is a crude mixture of components, this may well be the result of quicker solidification of the polymer, and higher crosslinking, trapping more of the lower molecular weight components during reaction, that would otherwise be lost. These lower molecular weight components may then act to plasticise the material.

Increased rate of reaction: The catalysed reactions typically require significantly less time to reach completion (FIG. 2e). Reducing the required reaction times and temperature for these polymers is significant if they are to be scaled up for the bulk applications that are allowed for by the low cost, availability, and renewability of many of the feedstocks. If the catalyst loading is varied there is a clear trend of reduced time with increasing catalyst addition (FIG. 2e inset). In open reactions there is a gradual loss of mass by evaporation of the monomers. The increased reaction rate therefore also corresponds to a higher yield (FIG. 2f, 31).

Figure 22:
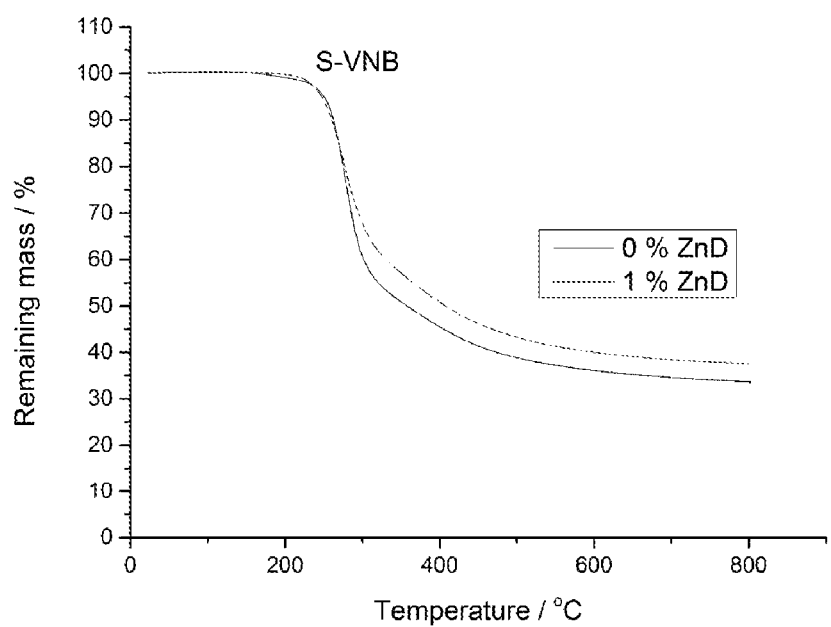
FIG. 22: Thermogravimetric analysis, under nitrogen, of S—VNB copolymers (equal mass ratio of sulfur to crosslinker) with and without catalysis by Zn diethyldithiocarbamate.
Figure 23:
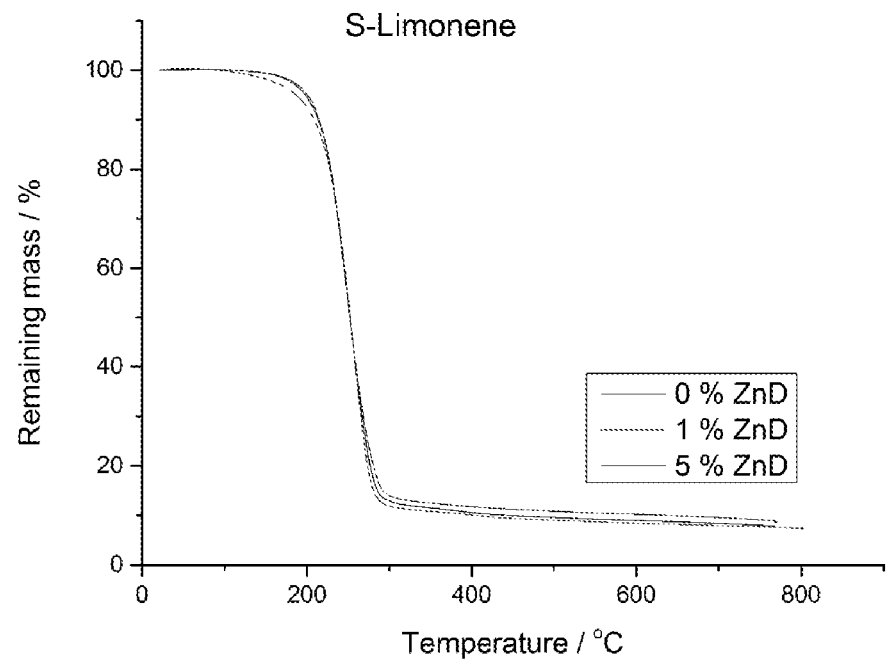
FIG. 23: Thermogravimetric analysis, under nitrogen, of S-limonene copolymers (equal mass ratio of sulfur to crosslinker) with and without catalysis by Zn diethyldithiocarbamate.
Figure 24:
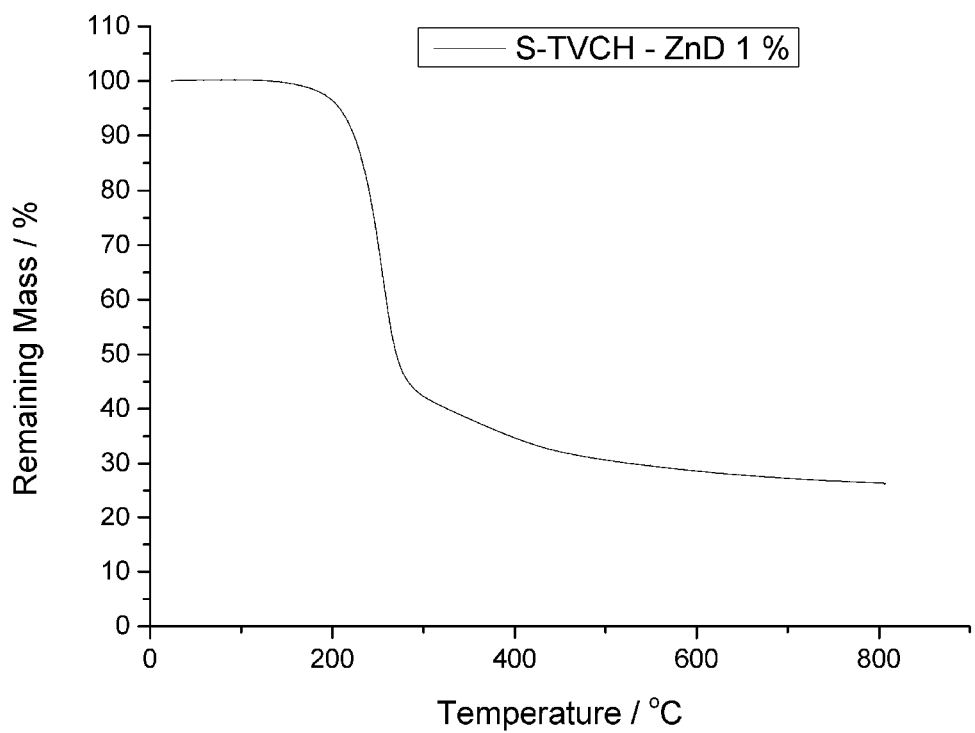
FIG. 24: Thermogravimetric analysis, under nitrogen, of S-TVCH copolymer (equal mass ratio of sulfur to crosslinker) catalysed by Zn diethyldithiocarbamate.
Figure 25:
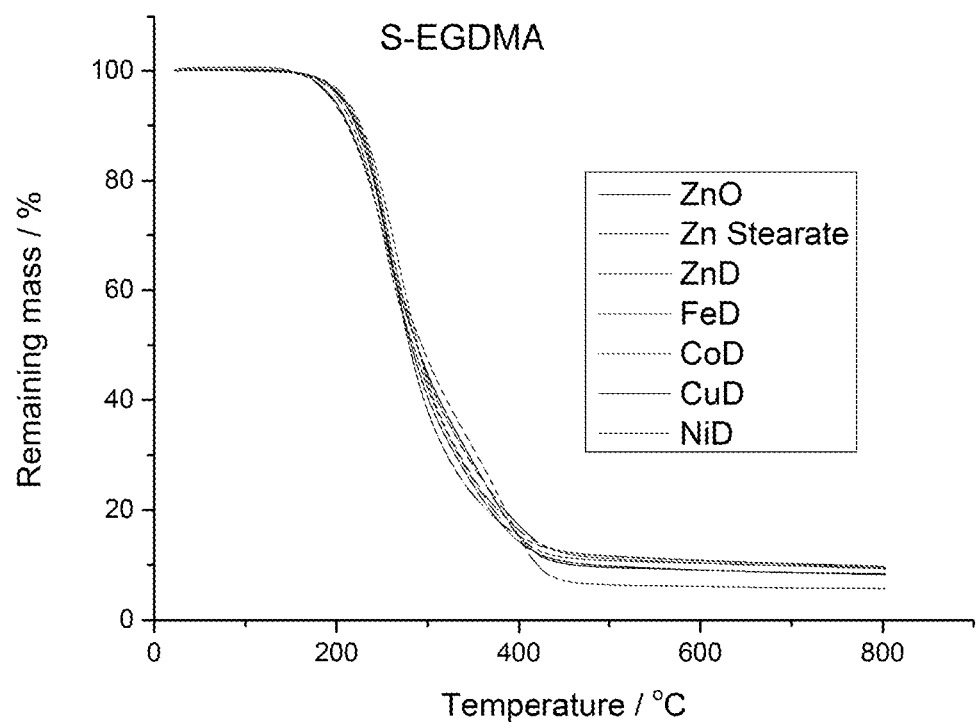
FIG. 25: Thermogravimetric analysis, under nitrogen, of S-EGDMA copolymers (equal mass ratio of sulfur to crosslinker) with a range of potential catalysts, all at 1 wt. % loading.
Figure 26:
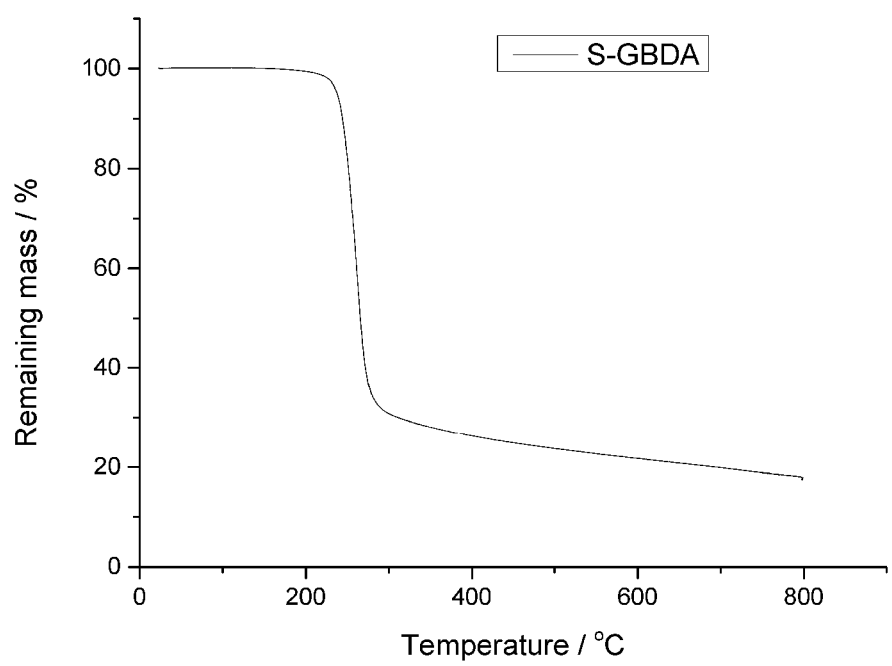
FIG. 26: Thermogravimetric analysis, under nitrogen, of S-GBDA copolymer (equal mass ratio of sulfur to crosslinker) catalysed by Zn diethyldithiocarbamate.
Figure 27:
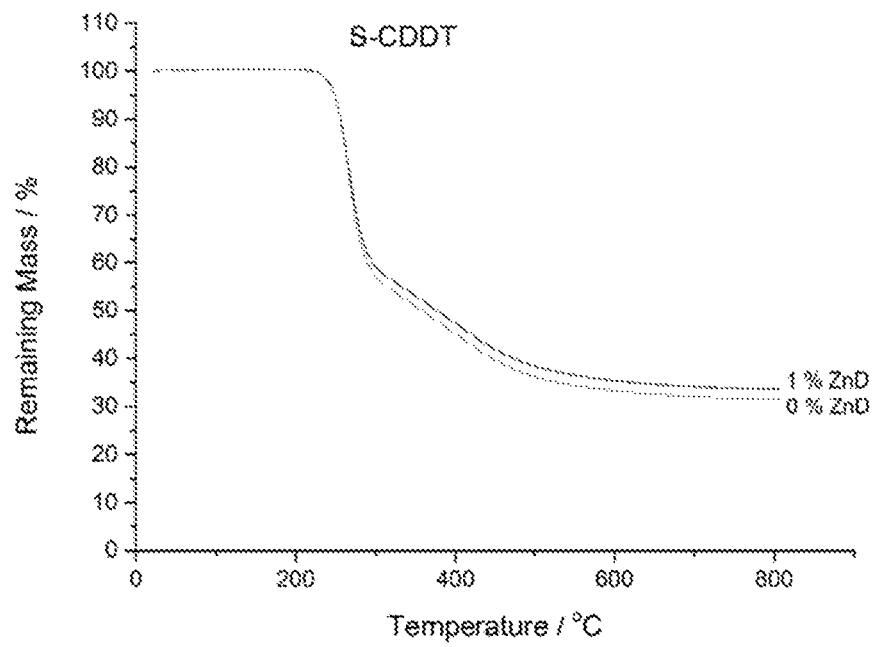
FIG. 27: Thermogravimetric analysis, under nitrogen, of S-CDDT copolymers (equal mass ratio of sulfur to crosslinker) with and without catalysis by Zn diethyldithiocarbamate.
Figure 28:
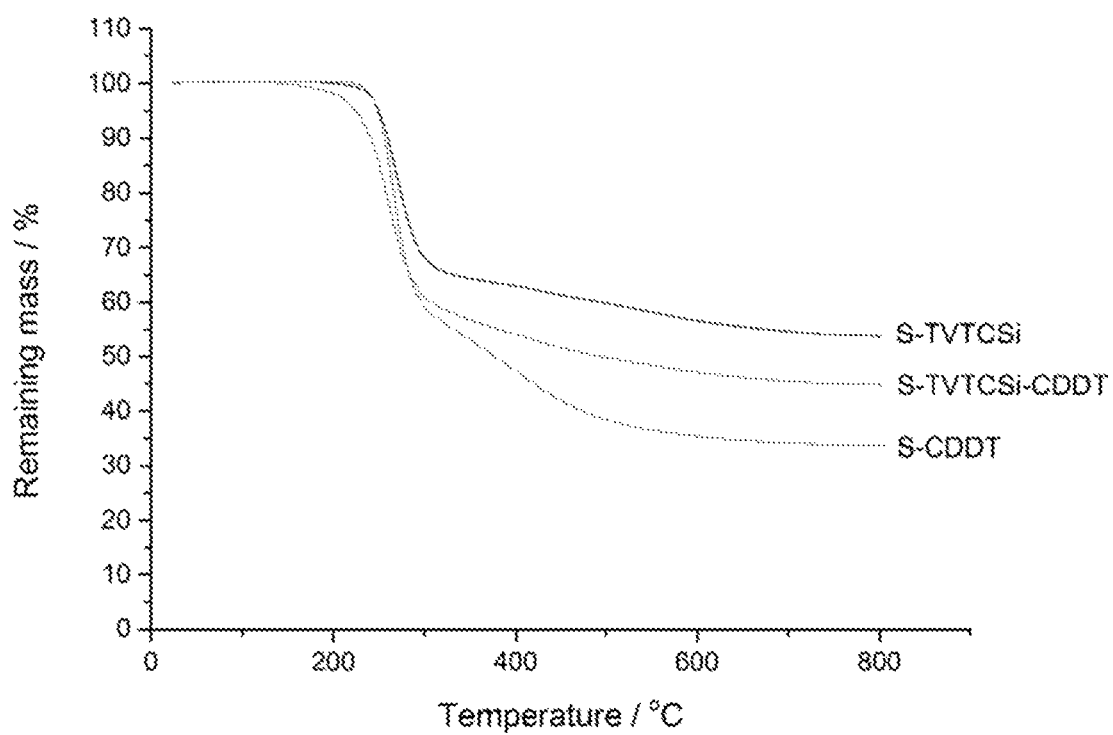
FIG. 28: Thermogravimetric analysis, under nitrogen, of S-crosslinker copolymers (equal mass ratio of sulfur to crosslinker) catalysed by Zn diethyldithiocarbamate (1 wt. %). The crosslinkers used were either TVTCSi, CDDT, or an equal weight mixture of the two. Blending of the crosslinkers gives an average of the two residual masses.
Figure 29:
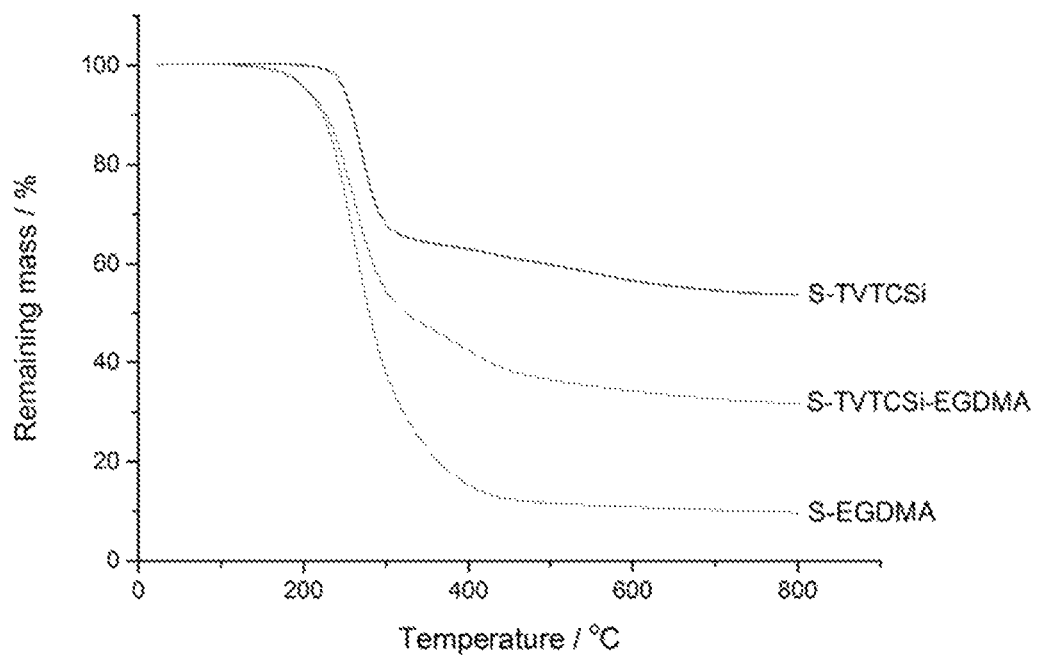
FIG. 29: Thermogravimetric analysis, under nitrogen, of S-crosslinker copolymers (equal mass ratio of sulfur to crosslinker) catalysed by Zn diethyldithiocarbamate (1 wt. %). The crosslinkers used were either TVTCSi, EGDMA, or an equal weight mixture of the two. Blending of the crosslinkers gives an average of the two residual masses.
Figure 39:
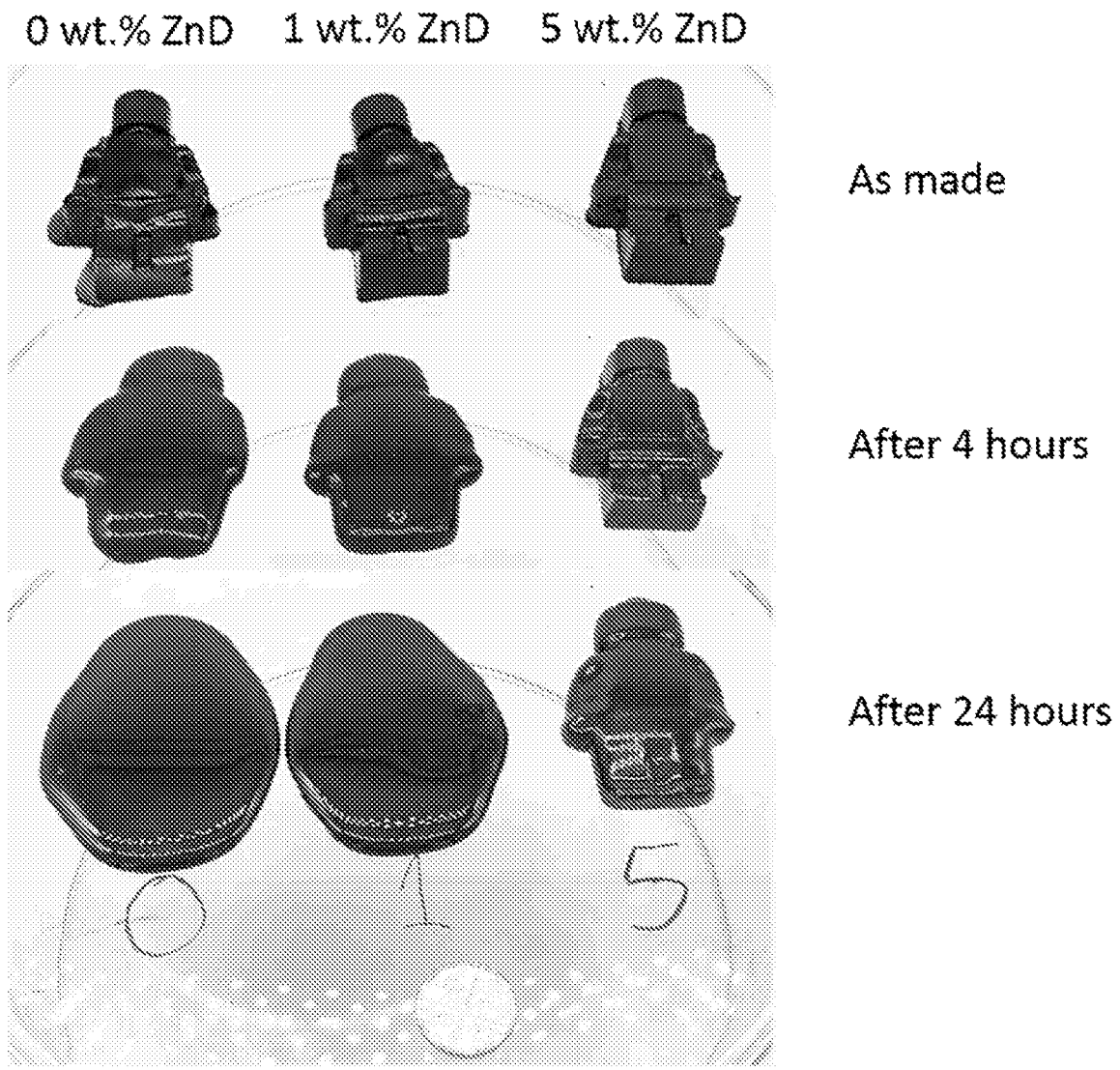
FIG. 39: S-Limonene polymers made by reacting an equal mass of sulfur with limonene, with and without catalyst (Zn Diethyldithiocarbamate). The reaction was performed following the method reported by Chalker et al,[4] only adjusting the catalyst loading. Limonene is known to undergo hydrogen abstraction, form by-products including cymene, and produce only low molecular weight polysulfides rather than high molecular weight polymers, and consequently these are not shape persistent.[4,5] The catalysed samples were notably less tacky to touch, and deformed less with general handling. All samples shower creep under the action of gravity alone, though this was reduced for the catalysed samples.
Figure 40:
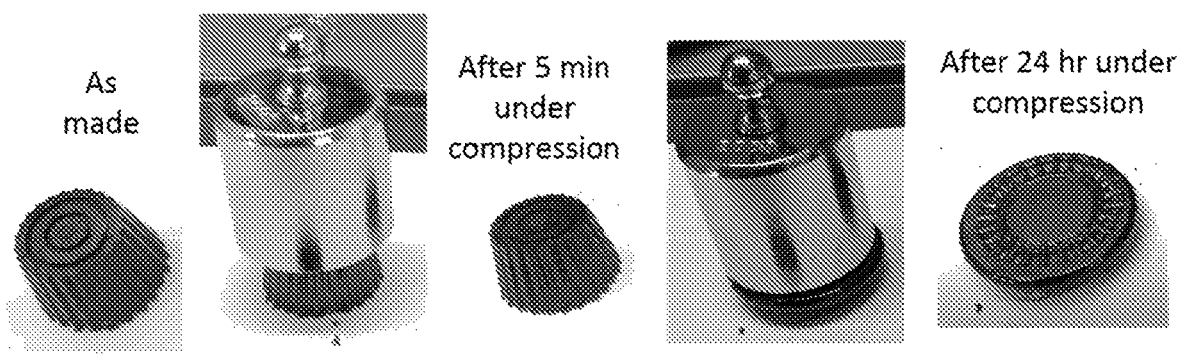
FIG. 40: S-Limonene polymer catalyzed by Zn Diethyldithiocarbamate is able to undergo compression with a 200 g weight, with no noticeable effect after 5 minutes. However, if left under compression for 24 hours the sample is noticeably deformed. Un-catalysed samples are fully deformed within 5 minutes under compression.
Figure 41:
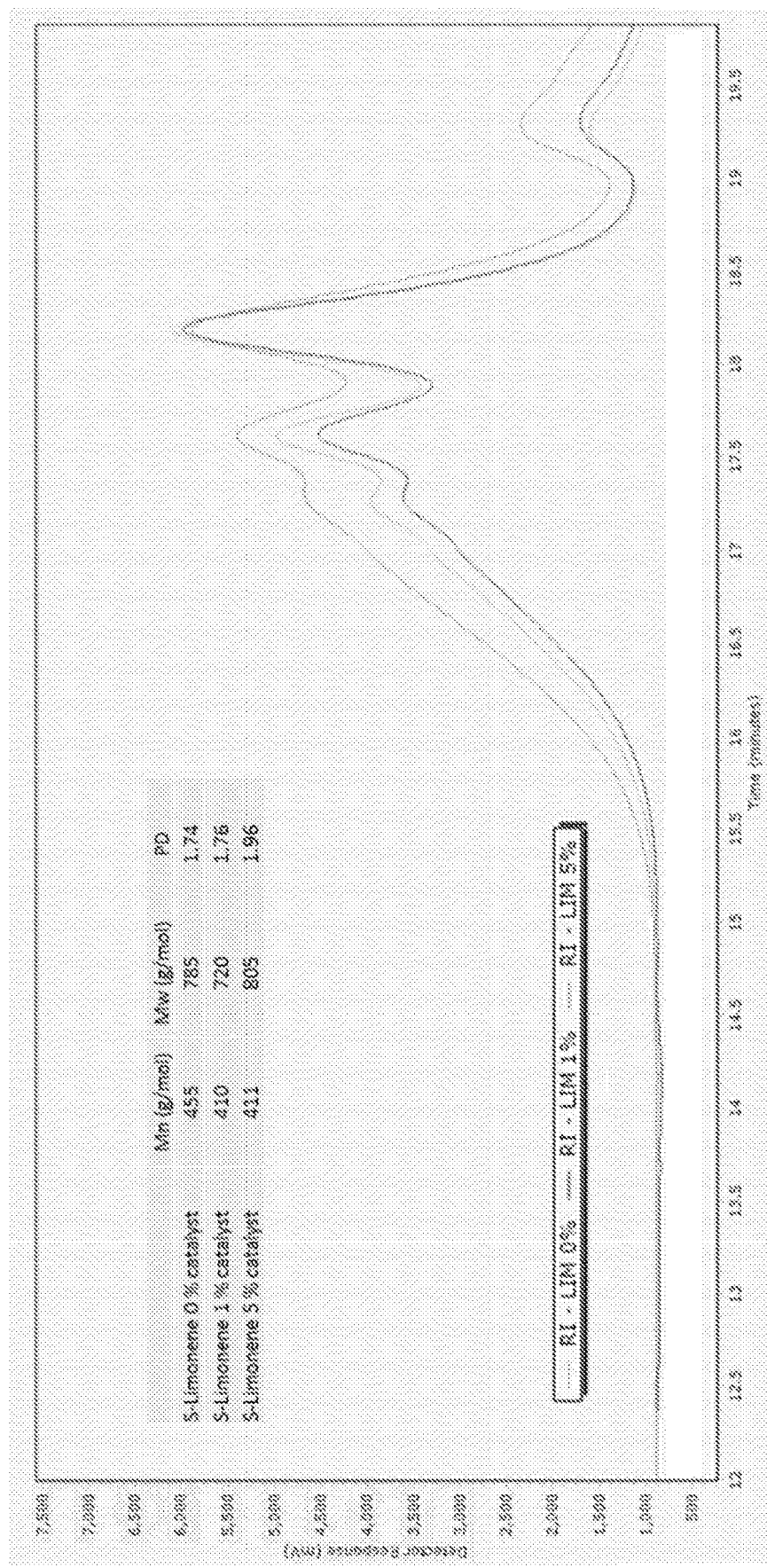
FIG. 41. GPC chromatograms, of the refractive index signal as a function of retention time, for S-limonene polymers with varying $ZnD_2$ catalyst loadings. There is little difference between the 0 and 1 wt. % catalyst loaded samples. However, the sample loaded with 5 wt. % catalyst has a broader distribution of molecular weights. The inclusion of higher molecular weight material may account for the reduced creep of the 5 wt. % catalyst sample, as well as its higher $T_g$. Mn and Mw numbers given in the inset are by comparison to conventional linear polystyrene standard calibration, and are provided for comparative purposes, but should not be taken as accurate as this is likely a poor model for these polymers.
Figure 42:
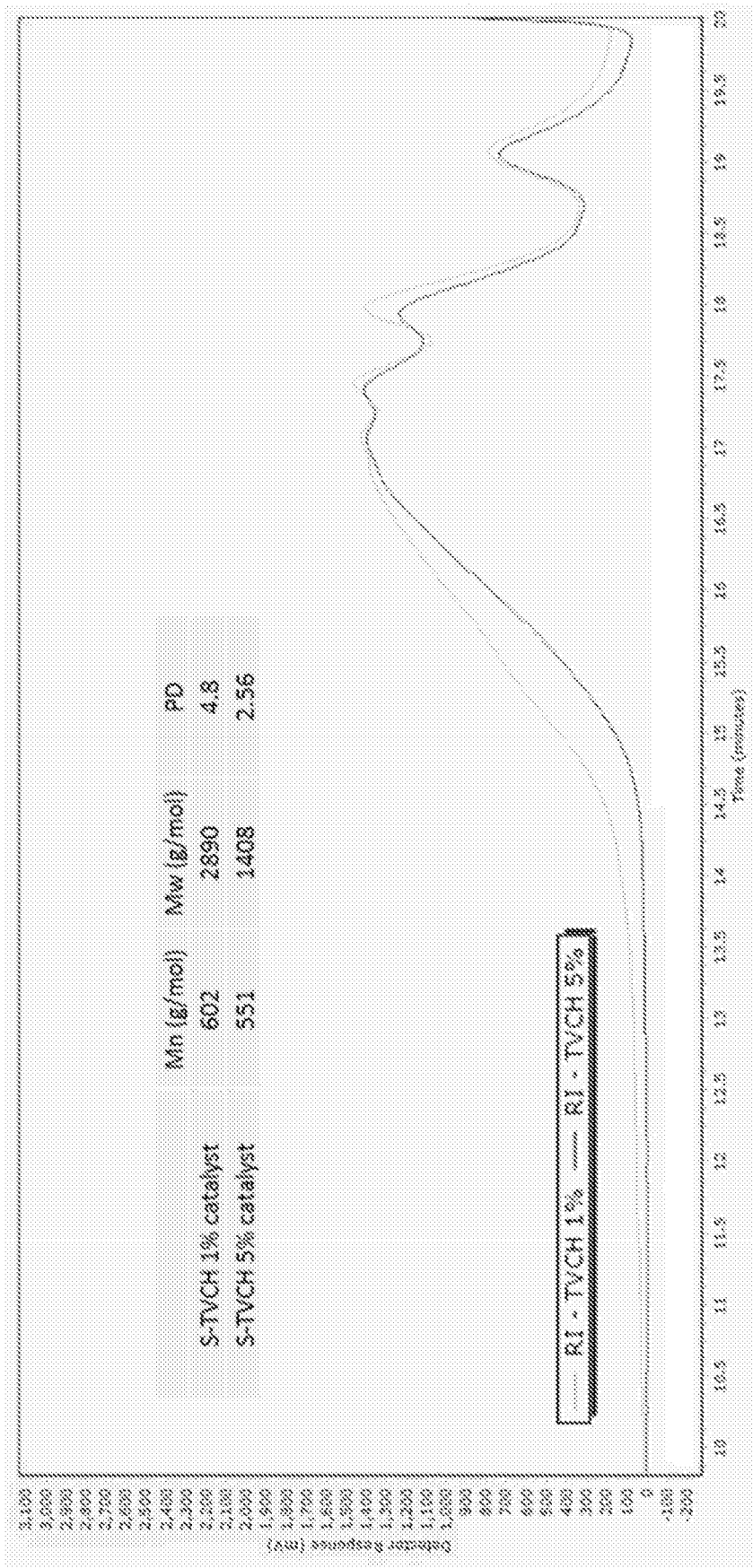
FIG. 42. GPC chromatograms, of the refractive index signal as a function of retention time, for S-limonene polymers with varying $ZnD_2$ catalyst loadings. Both samples can be seen to have significantly higher molecular weight than S-limonene. This likely accounts for why S-TVCH displays greater shape persistency (non-creeping solid) in comparison to S-limonene (creeping high viscous liquid), despite both being soluble. The lower catalyst loading sample shows a higher molecular weight, which is consistent with DSC findings that show it also has a higher $T_g$. Mn and Mw numbers given in the inset are by comparison to conventional linear polystyrene standard calibration, and are provided for comparative purposes, but should not be taken as accurate as this is likely a poor model for these polymers.

Improved properties: Of the crosslinkers able to react in the absence of catalyst (FIG. 1b, 1c), as well as reduced reaction times, many also showed an increase in glass transition temperature (To) when catalysed (FIG. 2g, 32-38, table 6). It is likely the catalysis produces more crosslinking, and a more even distribution of sulfur leading to shorter sulfur chains between crosslinkers. Sulfur-DCPD copolymers show a particularly pronounced difference in properties between catalysed and uncatalysed reactions—with an increase in $T_g$ from 38° C. to 89° C., (FIG. 22). This behaviour in DCPD is linked to the difference in reactivity between the double bonds. At temperatures below 140° C., only the norbornene double bond is reactive, 30,35 with higher temperatures needed to activate the cyclopentane bond. Catalysis allows both bonds to react in the low temperature regime. Limonene is desirable as a crosslinker for sulfur as it is a renewable by-product of the citrus industry, and its sulfur polymer has been shown to have potential for mercury capture.[21] As well as increasing the $T_g$, catalysis also improved the shape persistency of sulfur-limonene, giving it a reduced tendency to creep (FIGS. 39-41). The low molecular weight of sulfur-limonene copolymers (<1000 Mw by gel permeation chromatography, FIG. 41) in comparison to other inverse vulcanised polymers provides solubility in organic solvents.

TABLE 6

| Crosslinker | 0 wt. % $ZnD_2$ | 1 wt. % $ZnD_2$ | 5 wt. % $ZnD_2$ |
|---|---|---|---|
| TVCH | Not measured | 37.1° C. ± 2.6 | 22.8° C. ± 1.3 |
| CDDT | Not measured | 35.1° C. ± 0.9 | None detected |
| EGDMA | No reaction | 19.9° C. ± 0.6 | 20.3° C. ± 3.6 |

Table 6-Glass transition temperatures for polymers where fewer than three catalyst loadings gave values. The reaction was carried out at a 1:1 mass ratio of sulfur to crosslinker, without catalyst, at 135° C., and in triplicate. Standard deviation is given for the average of three parallel reactions.

TABLE 7

| No. | Sample name | Catalyst | Heating | Heating time |
|---|---|---|---|---|
| 17 | L6 | No | Initially 185° C., dropped to 135° C. after 10 minutes | 3 hours |
| 16 | L5 | | | 1 hour |
| 15 | L4 | | | 10 min |
| 14 | L3 | | | 7 min |
| 13 | L2 | | | 4 min |
| 12 | L1 | | | 1 min |
| 11 | C5 | 1 wt % $ZnD_2$ | 135° C. | 3 hours |
| 10 | C4 | | | 1 hour |
| 9 | C3 | | | 20 min |
| 8 | C2 | | | 10 min |
| 7 | C1 | | | 1 min |
| 6 | D5 | No | 135 120 | 40 min |
| 5 | D4 | | | 30 min |
| 4 | D3 | | | 20 min |
| 3 | D2 | | | 10 min |
| 2 | D1 | | | 1 min |
| 1 | D | No | rt | 0 min |

Figure 36:
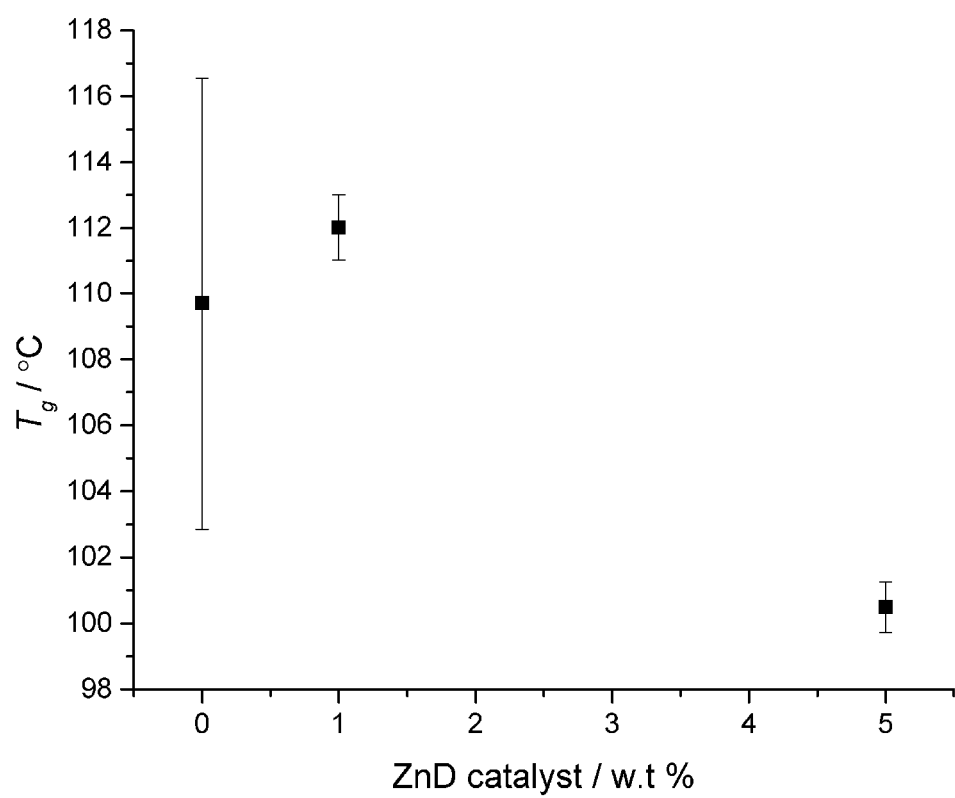
FIG. 36. Glass transition temperatures (from DSC) as a function of catalyst loading for the polymerization of sulfur with VNB. The reaction was carried out at a 1:1 mass ratio of sulfur to crosslinker, without catalyst, at 135° C., and in triplicate. Standard deviation is given for the average of three parallel reactions. There is a slight increase in glass transition temperature for the 1% catalyzed sample in comparison to the uncatalyzed sample. There is then a significant reduction when the catalyst loading is increased to 5%, presumably as this is then effectively an excess loading of catalyst, beyond which the catalyst is not providing additional benefit to the reaction, but is plasticising the material, as a small molecular additive. It should be noted that the $T_gS$ for the 0 wt. % loaded samples were very faint, however the 1 and 5 wt. % catalyst loaded samples were more pronounced.
Figure 37:
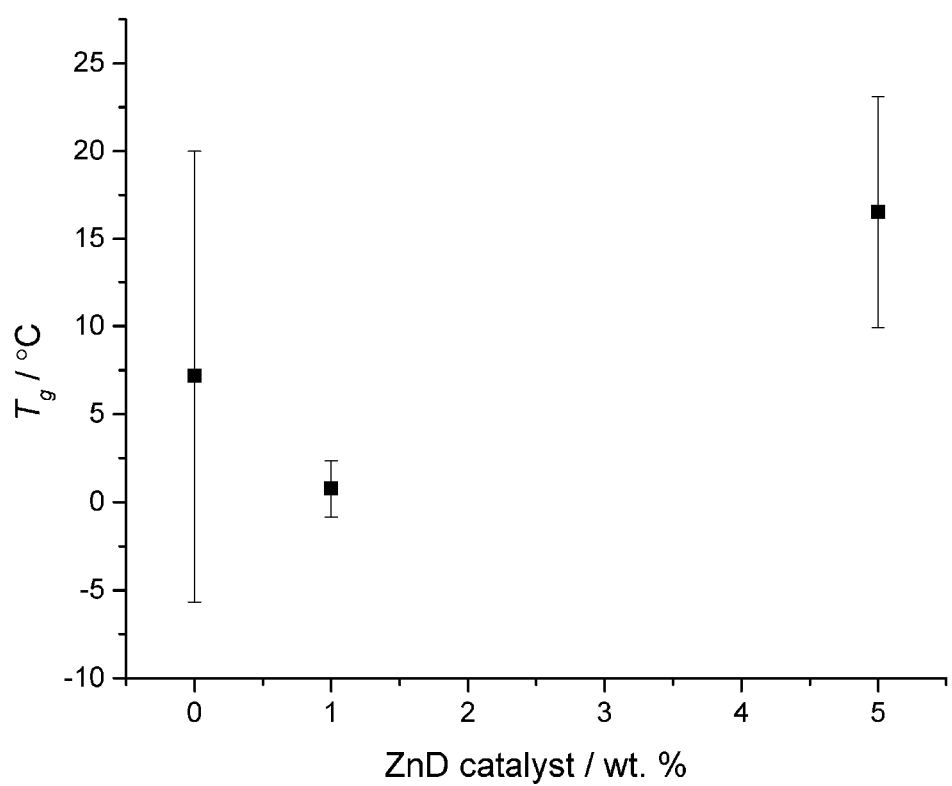
FIG. 37. Glass transition temperatures (from DSC) as a function of catalyst loading for the polymerization of sulfur with GBDA. The reaction was carried out at a 1:1 mass ratio of sulfur to crosslinker, without catalyst, at 135° C., and in triplicate. Standard deviation is given for the average of three parallel reactions. Only very faint transitions were detected, which is likely the cause of the poor accuracy in measurement. There appears to be a slight decrease in glass transition temperature moving from the zero to 1% loaded sample, and then an increase in the 5% loaded sample, however, in view of the poor reproducibility, this may not be significant.
Figure 38:
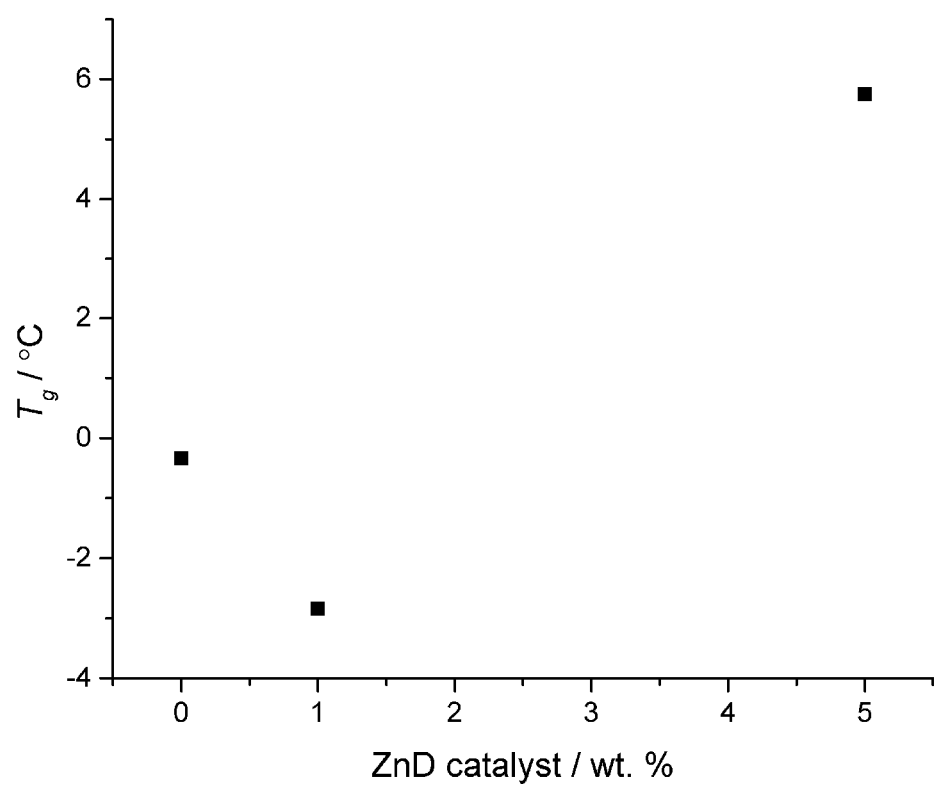
FIG. 38. Glass transition temperatures (from DSC) as a function of catalyst loading for the polymerization of sulfur with limonene. The reaction was carried out at a 1:1 mass ratio of sulfur to crosslinker, according to the reported procedure. There appears to be a slight decrease in glass transition temperature moving from the zero to 1% loaded sample, and then an increase in the 5% loaded sample.

Table 7. Reaction conditions for a series of S-DCPD reactions monitored by NMR in deuterated chloroform. All entries 50 wt. % each of sulfur and crosslinker, except entry number #1, which is pure DCPD prior to reaction. The numbers on the left hand side correspond to the labelling of NMR spectra in the following figures. Labels on the second column correspond to the labelling in the photographic images presented in the figure below (FIG. 36). NMRs are presented in FIGS. 37-44.

Figure 3:
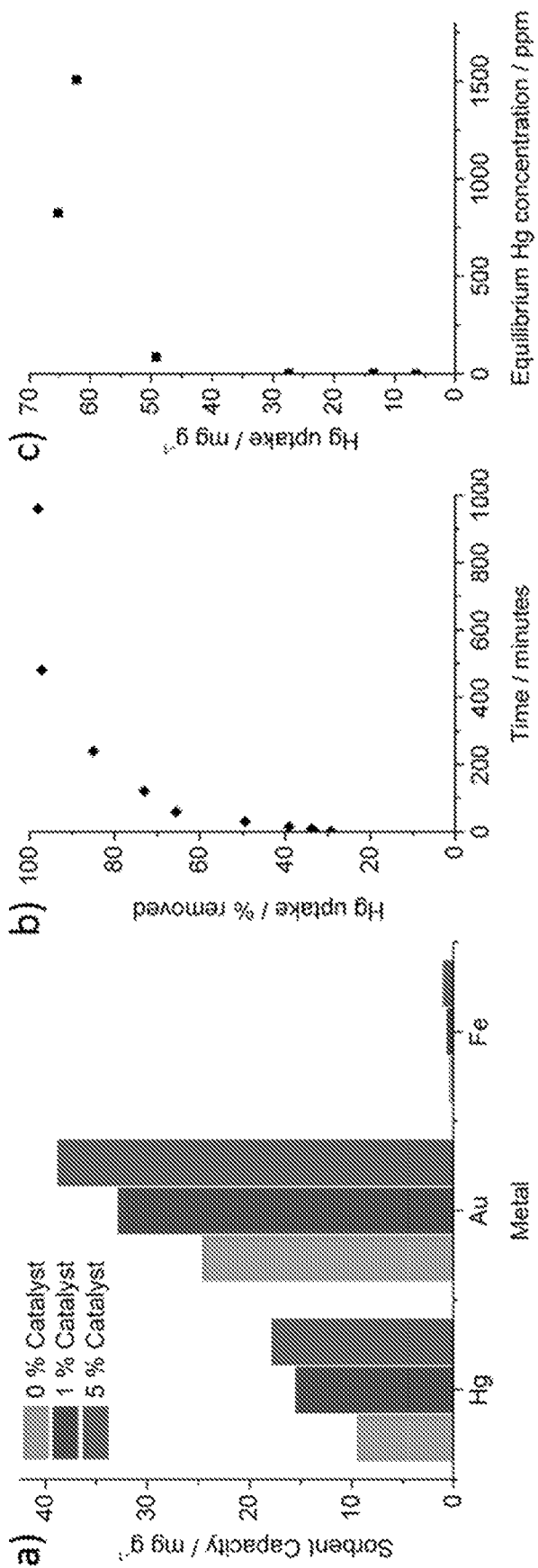
FIG. 3. a) Uptake of metal by sulfur-limonene coated silica gel from 400 ppm aqueous solution of mercury chloride and iron chloride, and 800 ppm gold chloride, with varying $ZnD_2$ catalyst loading, after 1 hour. b) The uptake of Hg from 1000 ppm $HgCl_2$ aqueous solution, by 5 wt. % $ZnD_2$ catalysed sulfur-limonene coated silica gel, as a function of time. c) The uptake of Hg, by 5 wt. % $ZnD_2$ catalysed sulfur-limonene coated silica gel, as a function of equilibrium concentration, to determine maximum capacity.
Figure 43:
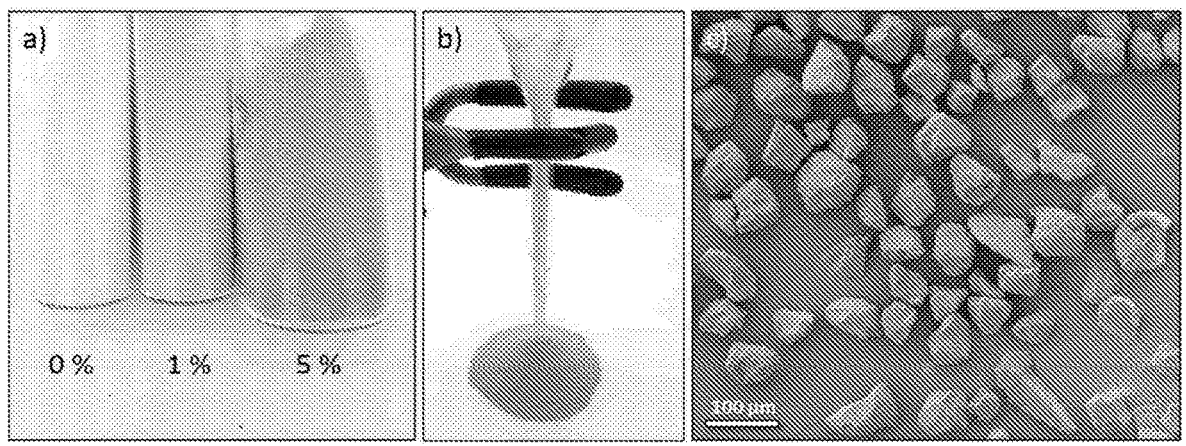
FIG. 43. a) Photograph of powders of silica gel coated with an additional 10 wt. % loading of sulfur-limonene copolymer synthesized using 0 wt. % (left), 1 wt. % (middle), and 5 wt. % $ZnD_2$ catalyst (right). The colour is noticeably darker with more catalyst. b) Photograph of the polymer coated silica gel flowing through a funnel as a free flowing powder. c) SEM image of the particles after coating with polymer.
Figure 44:
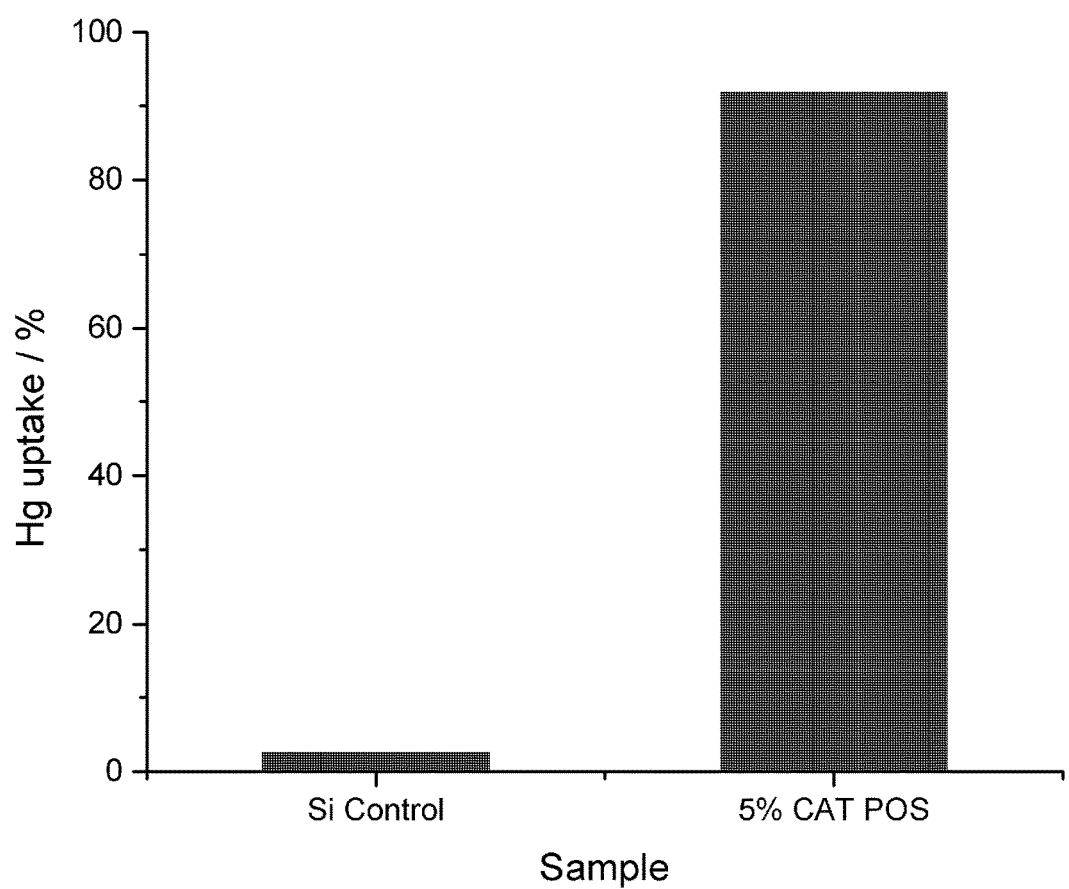
FIG. 44: Uptake of Hg from a 1000 ppm aqueous solution of $HgCl_2$ by uncoated silica compared to silica coated with sulfur-limonene copolymer (10 wt. % loading).
Figure 45:
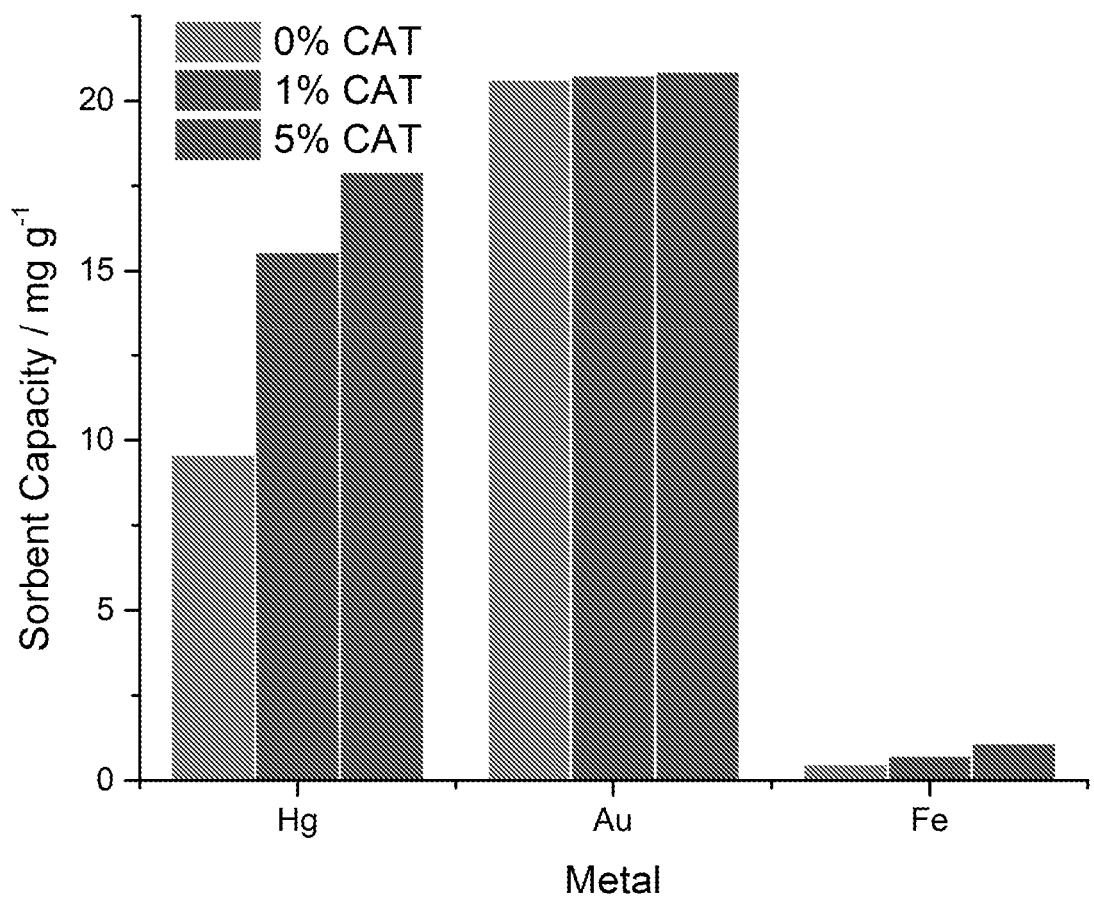
FIG. 45: Uptake of metal by sulfur-limonene coated silica gel from 400 ppm aqueous solutions of mercury chloride, iron chloride, and gold chloride, with varying $ZnD_2$ catalyst loading, after 1 hour. At this concentration the polymer was able to almost quantitatively remove the gold from solution, hence the necessity to increase the gold concentration to 800 ppm (as shown in FIG. 3 of the main paper), to more accurately represent the capacity. It can be seen that the affinity of the polymer for soft metal ions such as Hg and Au is significantly higher than for the harder ion of Fe.
Figure 46:
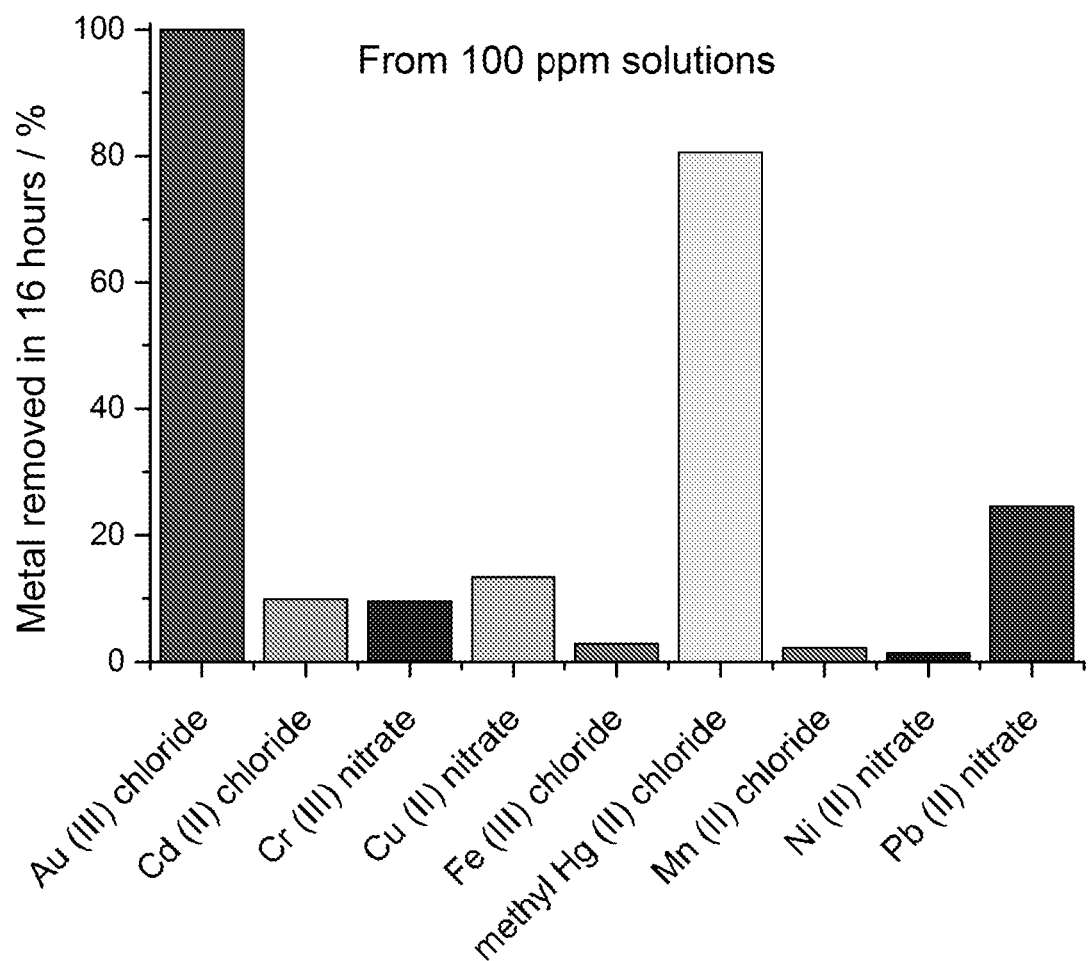
FIG. 46: Uptake of metal by sulfur-limonene coated silica gel from 100 ppm aqueous solutions of various metals, after 16 hours. The affinity for gold and mercury can be seen to be considerably higher than for many other metals. It is significant that the polymer shows good affinity for mercury in the form of methyl mercury chloride, as well as $HgCl_2$. Methyl mercury chloride is the form in which mercury is most commonly found in environmental pollution, and contamination of land and waterways. It is in this form that there is most need for environmental remediation, and methyl mercury chloride is commonly seen as more challenging to adsorb than mercury chloride.[6]

The solubility of catalysed sulfur-based polymers was utilised to coat commercial silica gel with sulfur-limonene copolymers, in order to test their function as a filtration medium for mercury. After coating with a 10 wt. % loading of polymer, the silica gel was a fine free flowing powder, maintaining the same particle size, and without aggregation of the particles (FIG. 43). Exposure of this powder to aqueous solutions of mercury chloride gives a significant increase in mercury uptake (FIG. 3a) in comparison to uncoated silica gel, which had negligible effect on mercury concentration (FIG. 44). As well as taking up mercury, crucial for environmental applications, the polymers also show affinity for removing gold from solution, which is relevant to mining and recovery applications.[44] Importantly, the high uptake is specific to heavy metals such as Hg and Au, with much lower uptake for other common metals (FIGS. 3a and 45, 46). Importantly, it is noted that the uptake of mercury unexpectedly increases with catalyst loading, potentially resulting from improved dispersion and bonding of sulfur.

Figure 47:
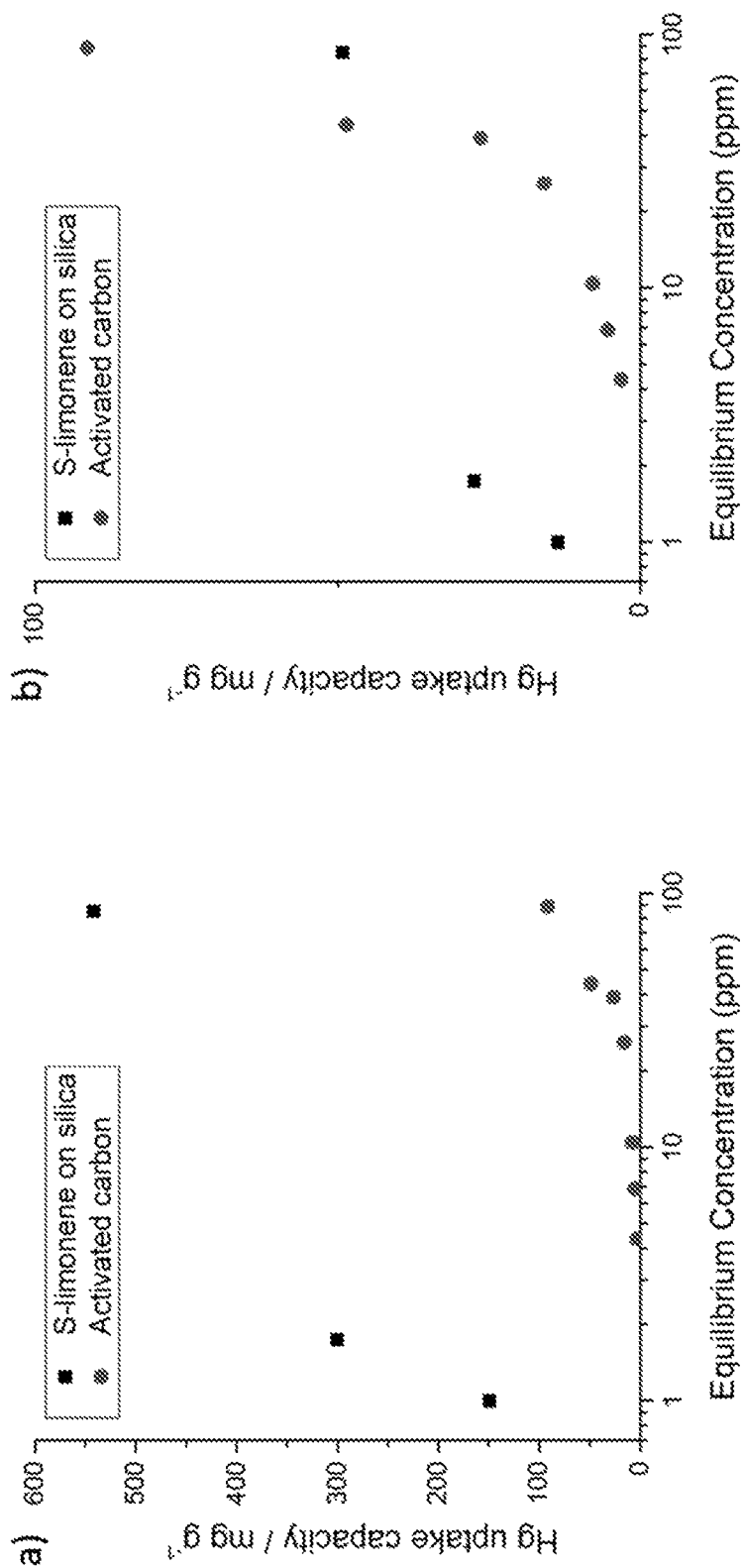
FIG. 47: Mercury uptake isotherms, from aqueous solutions of $HgCl_2$, by S-limonene copolymers compared to commercial activated carbon.[7] a) Hg uptake into S-limonene coated on silica gel calculated from the mass of polymer only. b) Hg uptake into S-limonene coated on silica gel calculated from the total mass of sorbent (polymer and silica). The high sulfur polymer has a much higher affinity than activated carbon for mercury at industrially relevant low concentrations (e.g. 5 ppm and below). Even when considering the total sorbent mass, the polymer-on-silica outperforms commercial activated carbon (commonly used industrially) up to about 40 ppm concentration.
Figure 48:
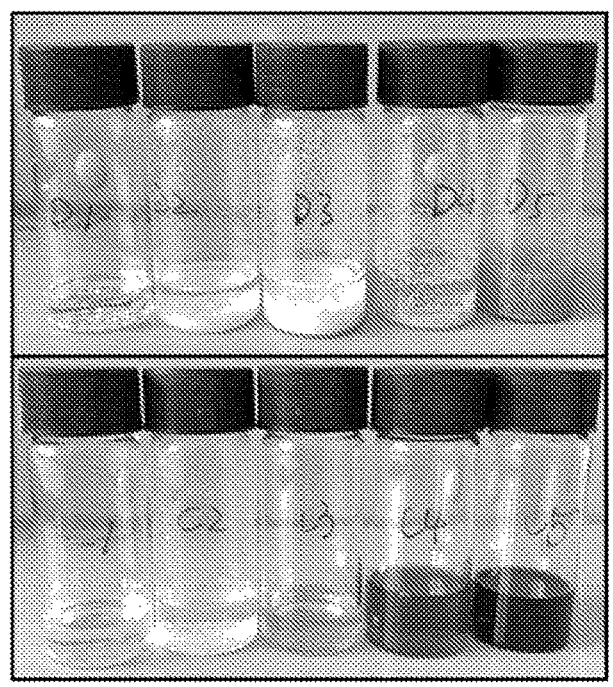
FIG. 48. Photographs of reactions D1-D5 (above) and C1-C5 (below), after cooling to room temperature.
Figure 49:
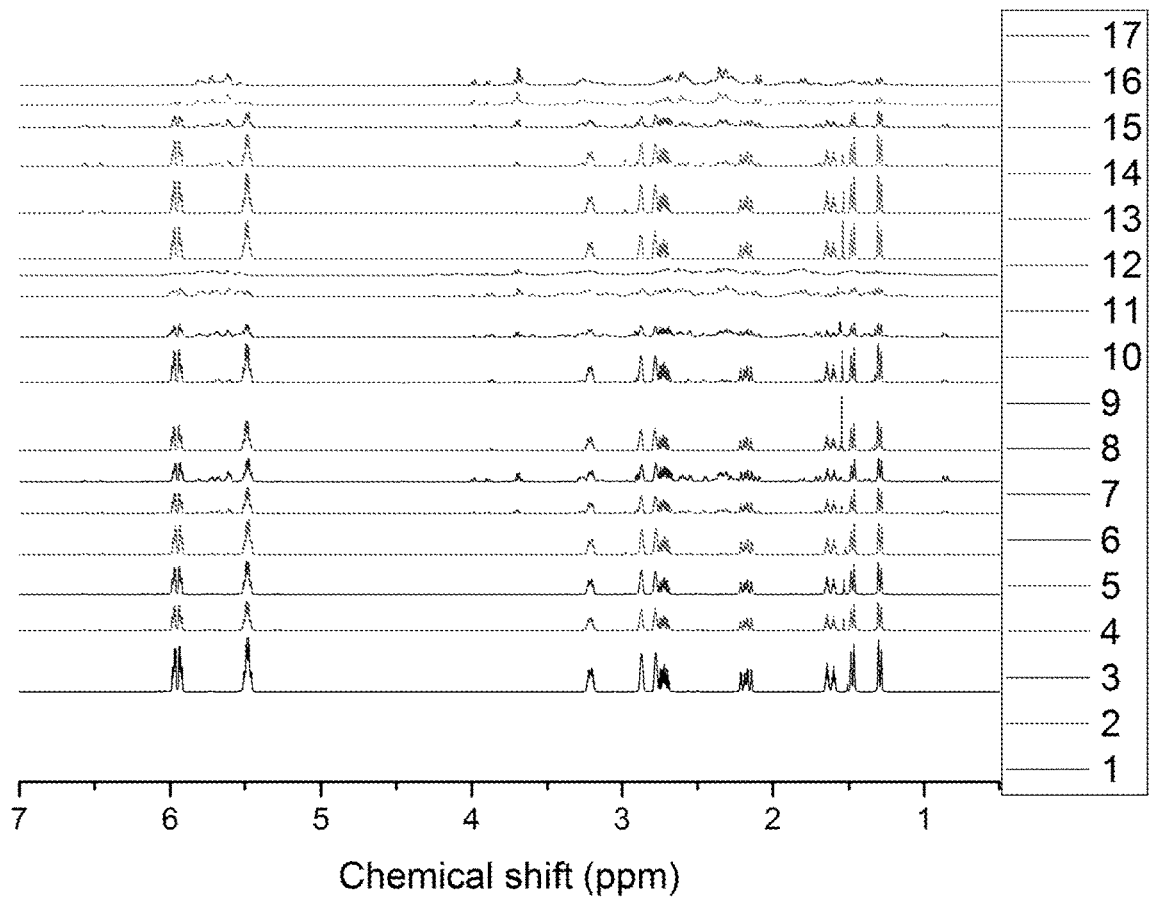
FIG. 49. $^1$H NMR (in $CDCl_3$), of sulfur-DCPD after reaction times and conditions as listed in table 7.
Figure 50:
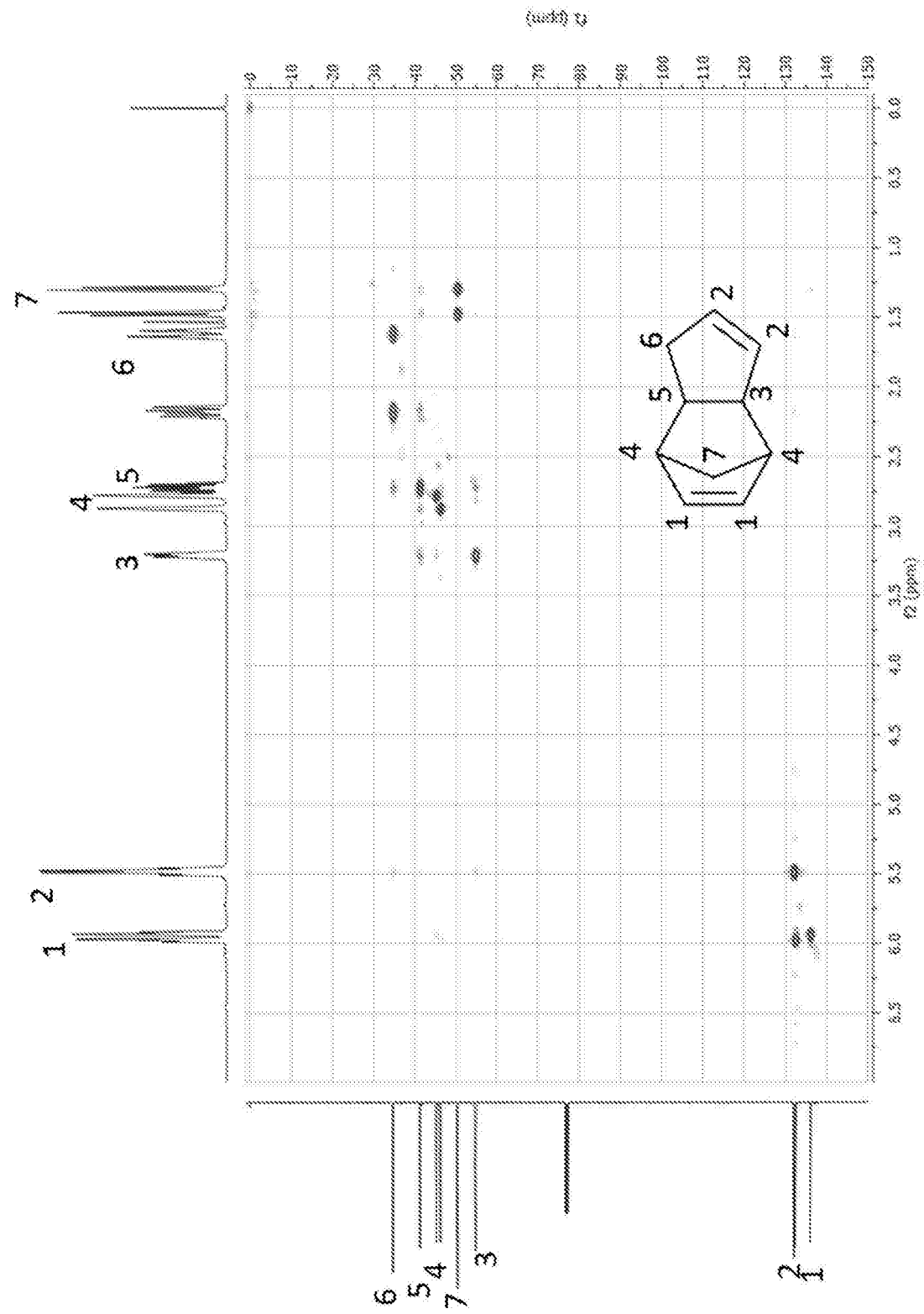
FIG. 50. HSQC NMR of sample #2 from table 5. The spectrum shows only unreacted DCPD. The peaks of the $^1$H (horizontal) and $^{13}$C (vertical) spectra are assigned on the structure.
Figure 51:
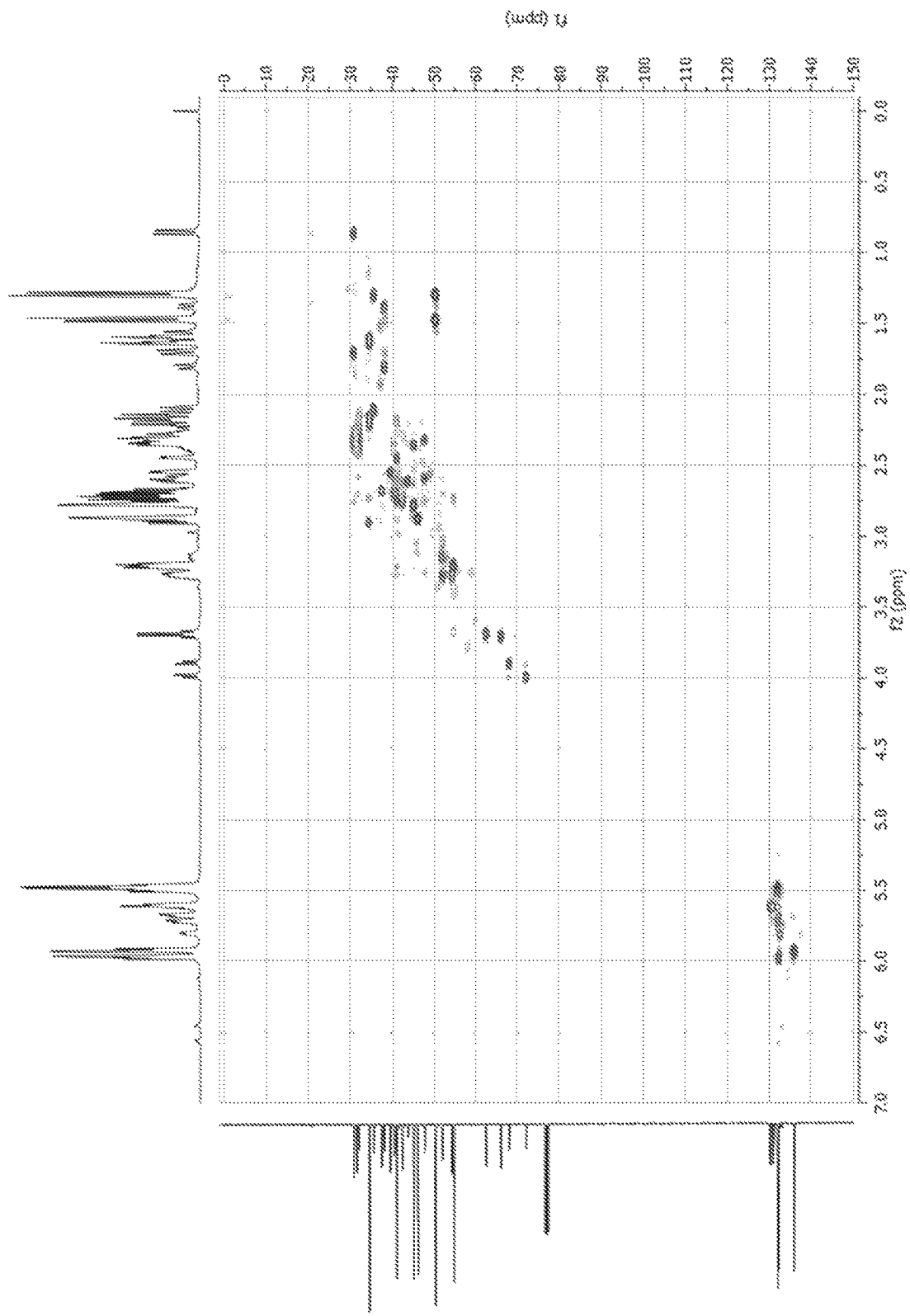
FIG. 51. HSQC NMR of sample #6 from table 5, sulfur reacted with DCPD at low temperature (135° C.) for 40 minutes, in the absence of catalyst. Evidence of reaction can be seen in the formation of new peaks in the 3.5-4 ppm range associated with S—C—H protons. Changes in the 5.5-6 ppm region may be associated with shifts to the vinylic protons on one double bond position, after the addition of sulfur across the other C=C bond of the same molecule. However, there is also a signal appearing at ~6.5 ppm, associated with proton substitution at the a position causing a shift to downfield in the vinylic protons.
Figure 52:
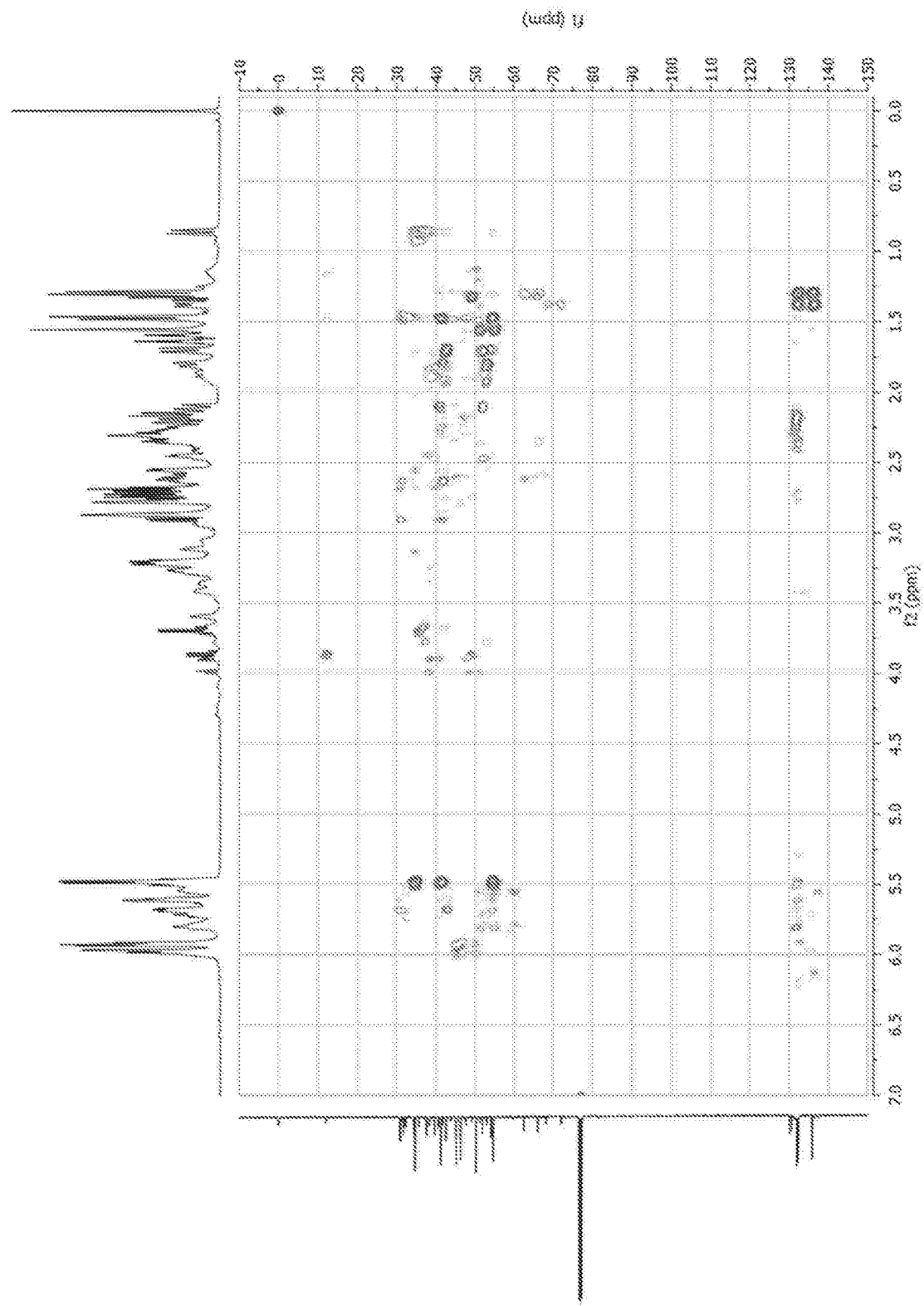
FIG. 52. HSQC NMR of sample #9 from table 5, sulfur reacted with DCPD at low temperature (135° C.) for 20 minutes, in the presence of 1 wt. % $ZnD_2$ catalyst. Evidence of reaction can be seen in the formation of new peaks in the 3.5-4 ppm range associated with S—C—H protons, as well as a marked broadening of all peaks, indicative of polymerization. Changes in the 5.5-6 ppm region may be associated with shifts to the vinylic protons on one double bond position, after the addition of sulfur across the other C=C bond of the same molecule. There is almost no detectible signal appearing at ~6.5 ppm, associated with proton substitution at the α position causing a shift to downfield in the vinylic protons. $ZnD_2$ FIG. 53. HSQC NMR of sample #15 from table 5, sulfur reacted with DCPD at high temperature (185° C.) for 10 minutes, in the absence of catalyst. Evidence of reaction can be seen in the formation of new peaks in the 3.5-4 ppm range associated with S—C—H protons. Changes in the 5.5-6 ppm region may be associated with shifts to the vinylic protons on one double bond position, after the addition of sulfur across the other C=C bond of the same molecule. However, there is also a significant signal appearing at ~6.5 ppm, associated with proton substitution at the a position causing a shift to downfield in the vinylic protons. This signal is higher than that detected for lower temperature reactions, even at the same degree of reaction.
Figure 53:
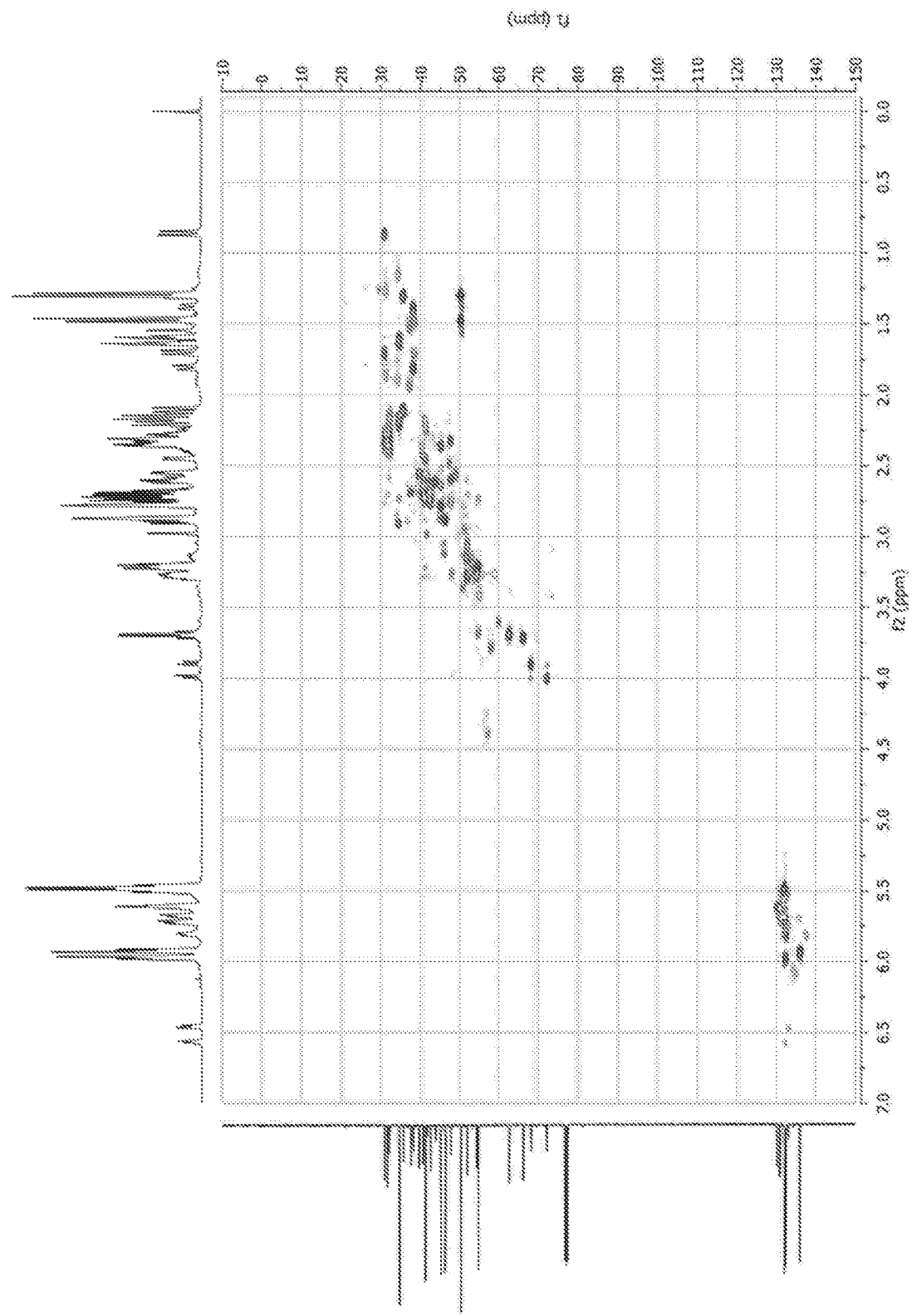

A rapid uptake occurs immediately on exposure to mercury solution, followed by a more gradual uptake reaching equilibrium in a few hours (FIG. 3b). The isotherm has a steep uptake at low concentration, of most relevance industrially (FIGS. 3c, 47. The maximum capacity of 65 mg g$^1$ sorbent corresponds to 716 mg of Hg per gram of polymer—to our knowledge the highest uptake reported to date for inverse vulcanisation. Thus, the presence of a catalyst in the sulfur-based polymer demonstrates improved affinity for mercury compared to the uncatalyzed polymer. The presence of a catalyst not only allows for more convenient reaction conditions but also results in a product which demonstrates improved performance in mercury uptake.

Mechanism

Figure 4:
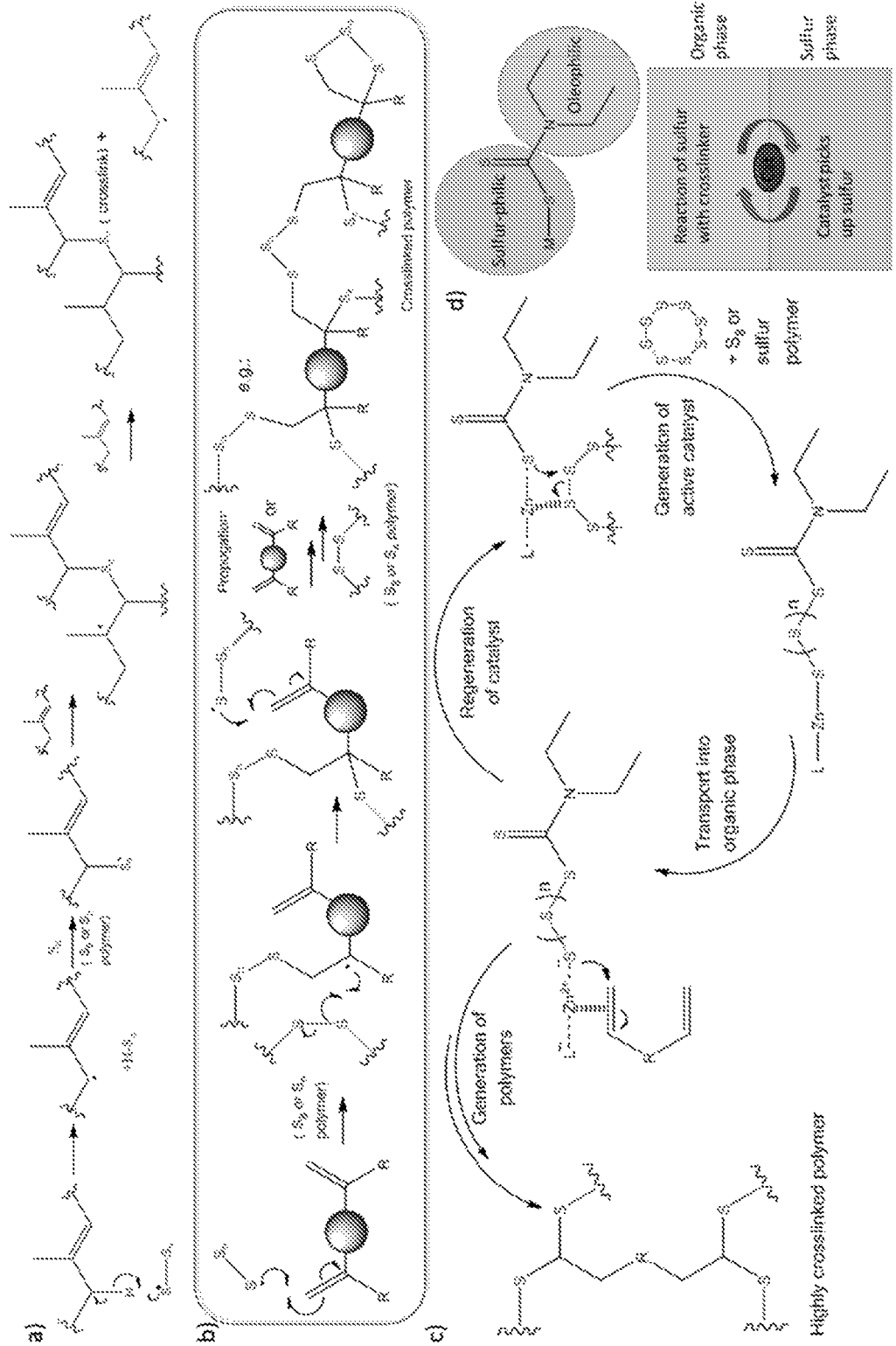
FIG. 4. a) Reaction scheme representative of the general view of conventional vulcanization. b) Simplified representation of a reaction scheme for inverse vulcanization (chain transfer, branching, and termination omitted). c) Suggested catalytic cycle for inverse vulcanization. Only one ligand shown on the metal for simplicity. d) Schematic representation of the action of the catalyst as a phase transfer agent.

Despite a long history of use, the mechanism of even uncatalyzed conventional vulcanization is not fully understood, and remains complex, difficult to characterize, and controversial.[38] Without wishing to be bound by theory, conventional vulcanization has been ascribed to either radical or ionic pathways according to homolytic, or heterolytic fission of $S_8$ rings (Scheme $S_1$ below),[36,38,46] and even recently as initially radical, with ionic species generated after reaction of sulfur with organic species.[47] That said, the most widely agreed pathway for conventional vulcanization is via hydrogen abstraction of the α-position relative to the double bond, leading to a combination of crosslinking by proton substitution and addition across the double bonds, with substitutions of hydrogen for sulfur being the dominant factor (FIG. 4a).[36, 38, 46, 48]

Scheme S1 a)

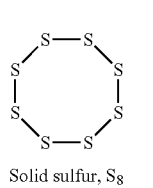

Solid sulfur, $S_8$

↓ T > 119° C.

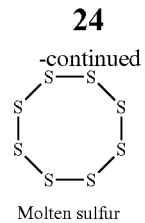

Molten sulfur

T > 159° C.
Homolytic fission

T > 230° C.
Heterolytic fission

·S—S$_x$—S·            $^\ominus$S—S$_x$—S$^\oplus$ b)

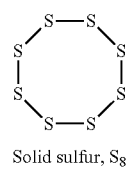

Solid sulfur, $S_8$

⇅

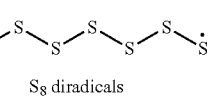

$S_8$ diradicals

⇅ T > 159° C. (floor temperature)

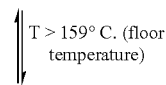

Polymeric sulfur a) Potential cleavages of sulfur, either homolytically or heterolytically. b) Reversible porcedure of ring opening/closing and polymerization/depolymerization of sulfur. The "floor temperature" is the temperature below which no polymeric species are found in appreciable quantities.[8]

In comparison, inverse-vulcanisation is relatively new, and has yet to undergo as extensive an investigation into its mechanism. Most of the existing discussion describes inverse vulcanization as being bulk free radical copolymerization of unsaturated co-monomers in liquid sulfur[20], and invokes addition across the double bonds being either the only, or dominant feature (FIG. 4b).[8,10] However, abstraction of hydrogen and $H_2S$ evolution have also been reported.[18,49] It is likely that both mechanisms, radical addition to the double bond, and hydrogen substitution, occur in both classes of vulcanization, with the ratio highly dependent on the temperature, as well as the proportion of sulfur.

The starting temperature of homolytic fission for Sa has not been agreed, with reports ranging from 140° C. to 181° C.[47, 50, 51, 52, 53] That catalysis allows temperatures below this range to be used may therefore make a crucial difference to the nature of the reaction. In the first report of inverse vulcanisation, Pyun and co-workers reported that the polymerization of liquid sulfur above its 'floor' temperature (159° C., the temperature at pure sulfur exists mostly as polymers, rather than as $S_8$) was a key stage in the reaction (Scheme $S_1b$).[8] This is possibly the reason many un-catalysed inverse vulcanizations are performed over 160° C.

The α-proton of allyl groups is known to be very active and it has been proved thiyl radicals can abstract this α-proton atom during vulcanization.[46,54] Un-catalysed polymerizations are likely to undergo a step-wise mechanism triggered by initial hydrogen abstraction, as in conventional vulcanisation. The thiyl radicals abstract a proton first to generate carbon radicals on the C=C double bond, these carbon radicals will then initiate further polymerization. For catalytic inverse vulcanisation we tentatively suggest the pathway shown in FIG. 4c. The metal-sulfur bond allows the opening of the $S_8$ ring at lower temperatures, and insertion of sulfur between the metal and diethyldithiocarbamate ligand to generate the active pre-catalyst. The catalyst then brings the sulfur into proximity to the crosslinker, and lowers the energy barrier to bond formation. It is not clear whether this step is radical or ionic in character. Repeated chain transfer and reaction will lead to highly crosslinked networks with more even distributions of sulfur. The lack of any activity shown by the conventional RAFT agent, 2-Cyano-2-propyl benzodithioate, results from the lack of S—S or metal-S bonds. These bonds are necessary for insertion of sulfur from the $S_8$ phase, and transport into the organic phase for reaction and catalysis. Thiram, with a reversible S—S bond, allows such a mechanism, but the efficiency was lower than for the metal-based catalysts. The more ionic nature of the metal-sulfur bond, in comparison to disulphide bonds, provides higher reactivity. Many inverse vulcanisation reactions suffer from poor miscibility between the organic crosslinker and molten sulfur phases. Without wishing to be bound by theory, it is believed that oleophilic and sulfur-philic moieties of $ZnD_2$ (FIG. 4d) allow it to act as an ideal phase transfer catalyst to shuttle reactive sulfur into the organic phase.

Figure 5:
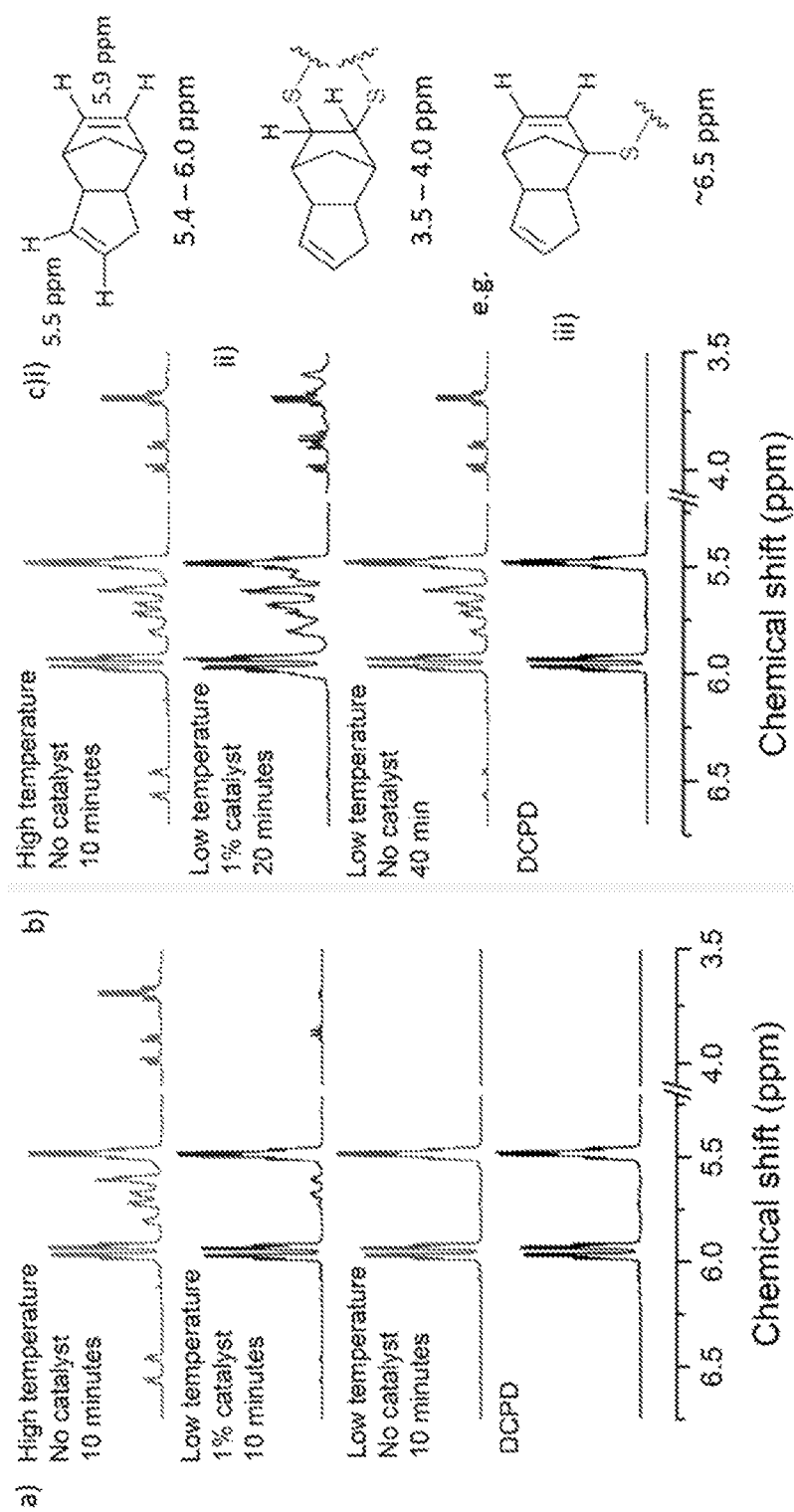
FIG. 5 $^1$H NMR spectra of DCPD at various stages of reaction with sulfur: a) After 10 minutes of reaction and, b) at approximately the same stage of reaction, but under different conditions. Low temperature reactions were carried out at 135° C., and high temperature at 185° C. C) i) Before reaction, the vinylic protons of DCPD appear at 5.5-5.9 ppm. ii) Reaction with sulfur yields S—C—H protons that appear in the 3.5-4 ppm region. iii) Proton substitution at the α position, without addition across the double bond, results in C═C(—H)—C—S proton environments that are shifted downfield w.r.t. their original positions, as those appearing at ~6.5 ppm.
Figure 6:
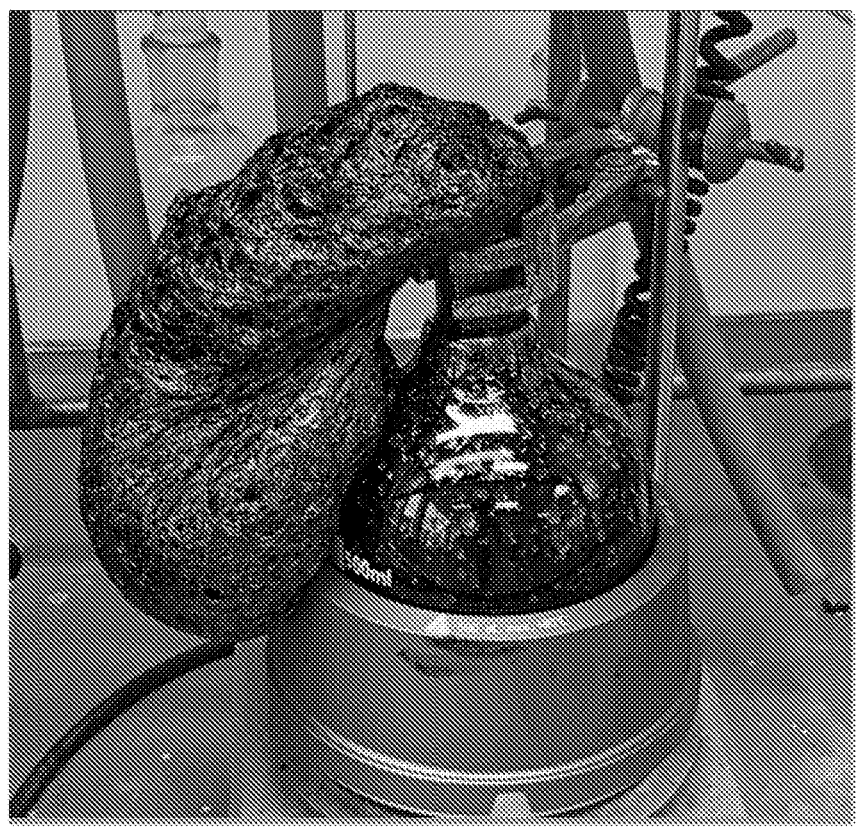
FIG. 6: An example of an inverse vulcanization reaction that has undergone unintended auto-acceleration. In this case, Sulfur-DCPD copolymer. During polymerization, the liquid reaction mixture filled less than 100 mL of the 500 mL round bottom flask as a calm black liquid. Within a few seconds it boiled up violently to overflow the container, venting gas and volatilized monomer, before rapidly setting as a solid.
Figure 54:
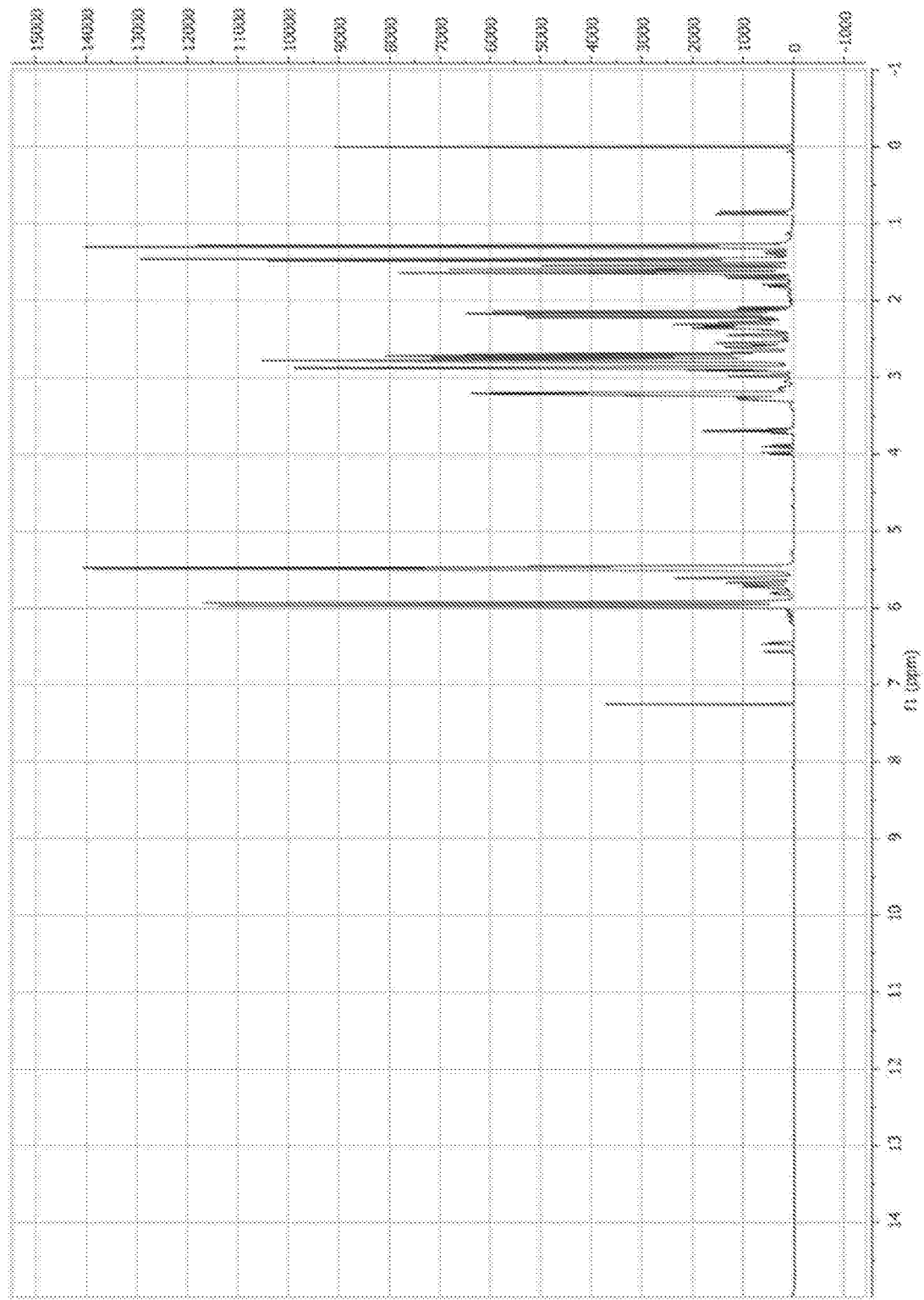
FIG. 54. $^1$H NMR (in $CDCl_3$), of sulfur-DCPD at low temperature (135° C.), without catalyst, at the reaction time that showed the highest signal at 6.5 ppm (30 minutes).
Figure 55:
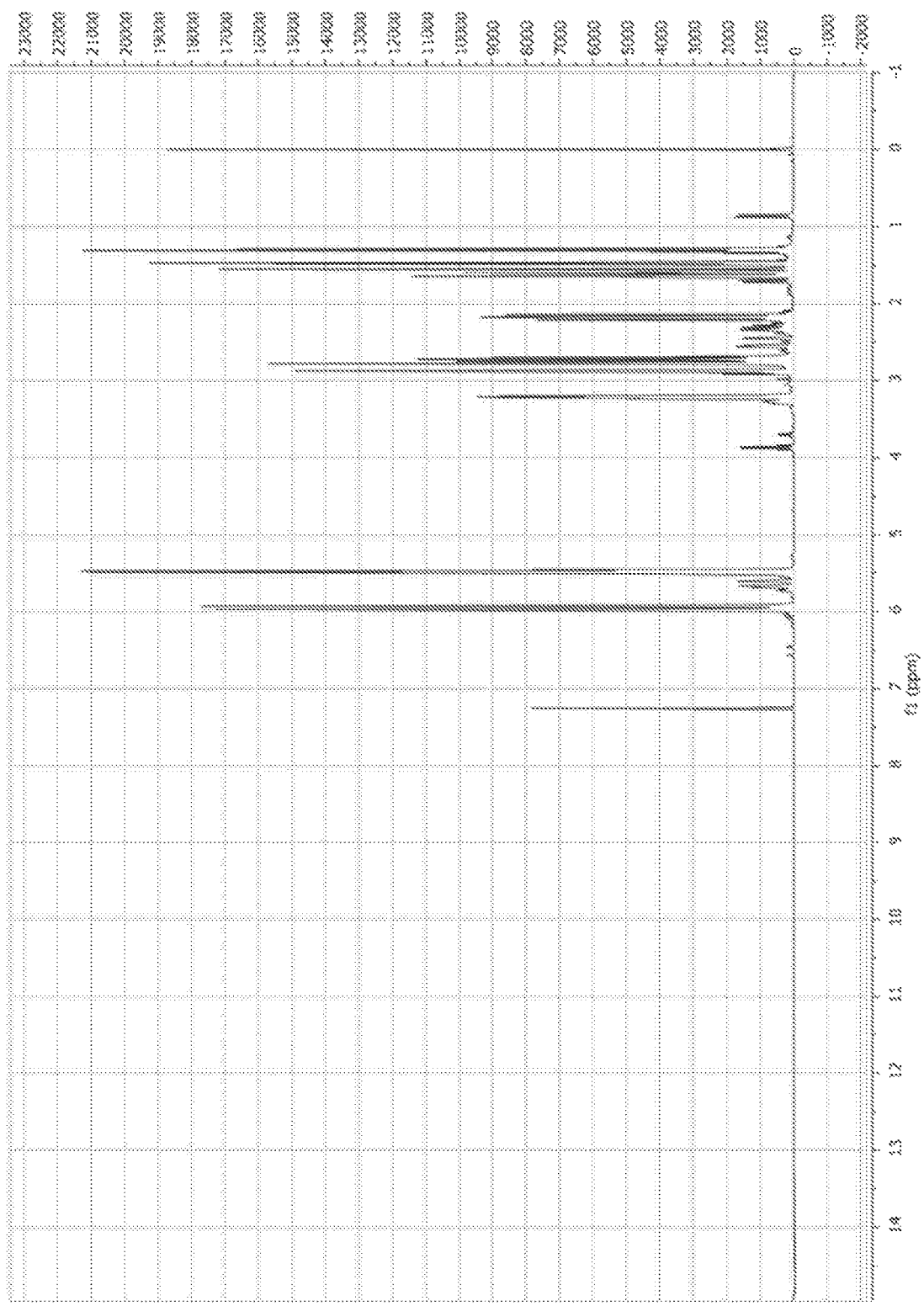
FIG. 55. $^1$H NMR (in $CDCl_3$), of sulfur-DCPD at low temperature (135° C.), with 1 wt. % $ZnD_2$ catalyst, at the reaction time that showed the highest signal at 6.5 ppm (10 minutes).
Figure 56:
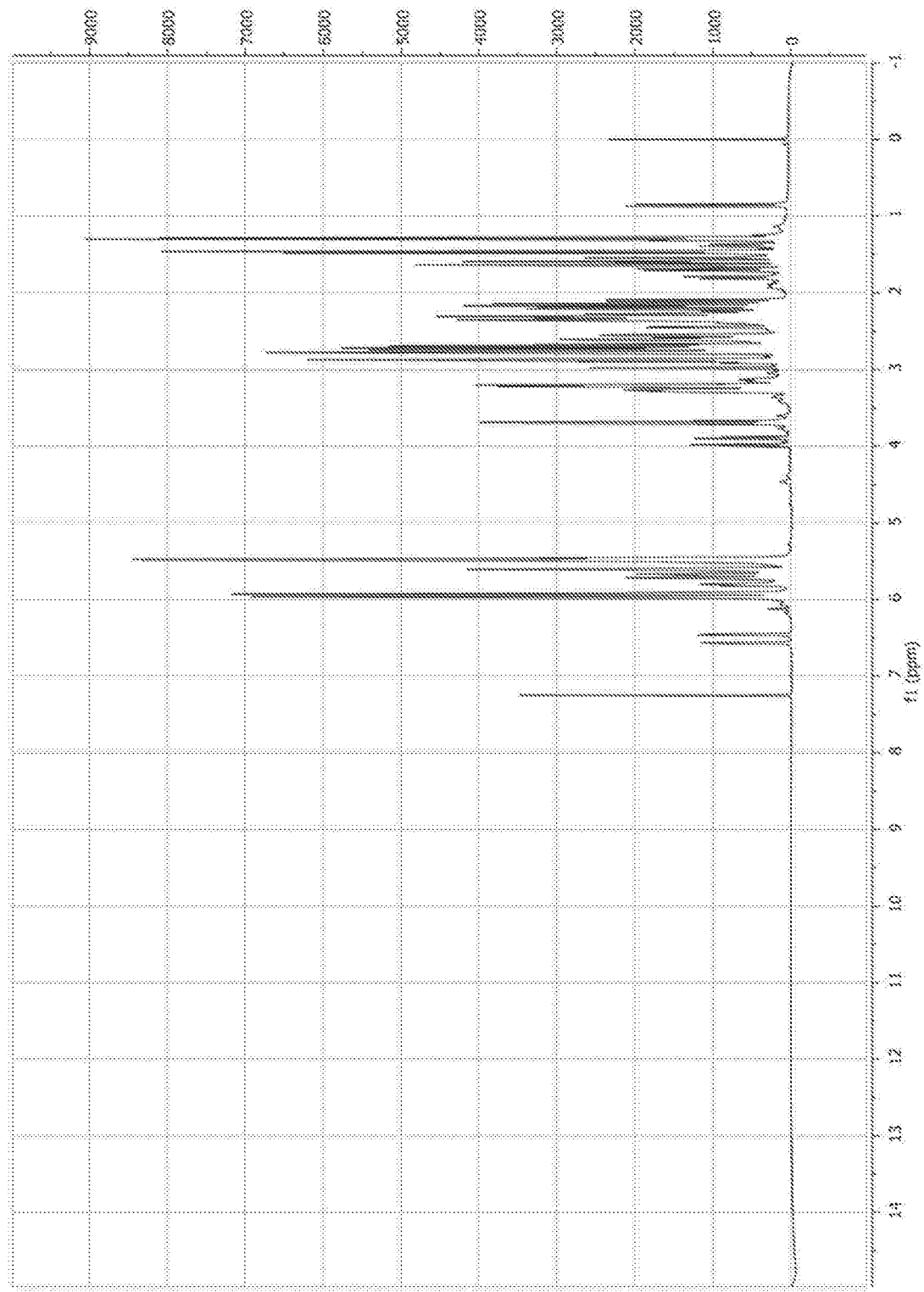
FIG. 56. $^1$H NMR (in $CDCl_3$), of sulfur-DCPD with high temperature initiation (185° C.), without catalyst, at the reaction time that showed the highest signal at 6.5 ppm (10 minutes).

NMR analysis was performed of early stages of the polymerization of sulfur with DCPD, for which the forming oligomers are soluble (FIG. 5). Reactions were carried out in the low temperature regime (135° C.), with and without catalyst, and compared to high temperature reactions (initiated at 185° C.). When comparing the three conditions at equal reaction time (10 minutes, FIG. 5a), the catalysed reaction has already begun to react, while there is no change for the uncatalyzed sample. The higher temperature reaction has progressed further for the same time; however, a significant degree of hydrogen substitution is evident, based on the appearance of peaks around 6.5 ppm. These new peaks correspond to the norbornene C=C bond proton after α-proton sulfur substitution but without radical sulfur chain insertion into the C=C bond. In contrast, there is markedly less H-substitution for the catalytic reaction, even when the reactions are compared for the same degree of polymerization, as judged by development of the 5.4-6.0 and 3.5-4.0 ppm regions (FIG. 56, 4c), suggesting that the action of the catalyst promotes a greater degree of addition across the double bond in comparison to proton-substitution. However, some degree of proton substitution is still always evident at the early stages of all three reactions (FIG. 54-56), suggesting that α-proton substitution may be necessary in activating inverse vulcanisation reactions, perhaps aided by the catalyst (Scheme $S_2$).

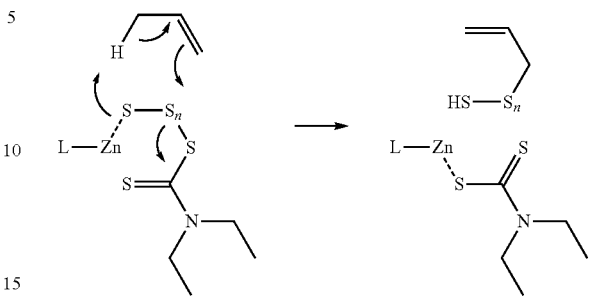

Scheme S2 Proposed mechanism for proton abstraction from the α-position, by sulfur, catalyzed by a $ZnD_2$ catalyst.[9]

REFERENCES 1. http://www.plasticseurope.org/. 2015.
2. Anastas P, Eghbali N. Green Chemistry: Principles and Practice. *Chemical Society Reviews* 2010, 39(1): 301-312.
3. Zhu Y Q, Romain C, Williams C K. Sustainable polymers from renewable resources. Nature 2016, 540(7633): 354-362.
4. Mekonnen T, Mussone P, Bressler D. Valorization of rendering industry wastes and co-products for industrial chemicals, materials and energy: review. *Critical Reviews in Biotechnology* 2016, 36(1): 120-131.
5. Clark J H, Matharu A S. Waste to Wealth using Green Chemistry. In: Hester R E, Harrison R M (eds). *Waste as a Resource,* 2013, pp 66-82.
6. Kutney G. *Sulfur: History, Technol., Appl. & Industry.* ChemTec: Toronto, 2013.
7. Boyd D A. Sulfur and Its Role In Modern Materials Science. *Angewandte Chemie-International Edition* 2016, 55(50): 15486-15502.
8. Chung W J, Griebel J J, Kim E T, Yoon H, Simmonds A G, Ji H J, et al. The use of elemental sulfur as an alternative feedstock for polymeric materials. *Nature Chemistry* 2013, 5(6): 518-524.
9. Griebel J J, Glass R S, Char K, Pyun J. Polymerizations with elemental sulfur: A novel route to high sulfur content polymers for sustainability, energy and defense. *Progress in Polymer Science* 2016, 58: 90-125.
10. Worthington M J H, Kucera R L, Chalker J M. Green chemistry and polymers made from sulfur. *Green Chemistry* 2017, 19(12): 2748-2761.
11. Lim J, Pyun J, Char K. Recent Approaches for the Direct Use of Elemental Sulfur in the Synthesis and Processing of Advanced Materials. *Angewandte Chemie-International Edition* 2015, 54(11): 3249-3258.
12. Nguyen T B. Recent Advances in Organic Reactions Involving Elemental Sulfur. *Advanced Synthesis & Catalysis* 2017, 359(7): 1066-1130.
13. Griebel J J, Namnabat S, Kim E T, Himmelhuber R, Moronta D H, Chung W J, et al. New Infrared Transmitting Material via Inverse Vulcanization of Elemental Sulfur to Prepare High Refractive Index Polymers. *Advanced Materials* 2014, 26(19): 3014-3018.
14. Griebel J J, Nguyen N A, Namnabat S, Anderson L E, Glass R S, Norwood R A, et al. Dynamic Covalent Polymers via Inverse Vulcanization of Elemental Sulfur for Healable Infrared Optical Materials. *ACS Macro Lett* 2015, 4(9): 862-866.

15. Kleine T S, Nguyen N A, Anderson L E, Namnabat S, LaVilla E A, Showghi S A, et al. High Refractive Index Copolymers with Improved Thermomechanical Properties via the Inverse Vulcanization of Sulfur and 1,3,5-Triisopropenylbenzene. *ACS Macro Lett* 2016, 5(10): 1152-1156.
16. Abraham A M, Kumar S V, Alhassan S M. Porous sulphur copolymer for gas-phase mercury removal and thermal insulation. *Chemical Engineering Journal* 2018, 332: 1-7.
17. Röttger M, Domenech T, van der Weegen R, Breuillac A, Nicolaÿ R, Leibler L. High-performance vitrimers from commodity thermoplastics through dioxaborolane metathesis. *Science* 2017, 356(6333): 62-65.
18. Arslan M, Kiskan B, Yagci Y. Benzoxazine-Based Thermosets with Autonomous Self-Healing Ability. *Macromolecules* 2015, 48(5): 1329-1334.
19. Arslan M, Kiskan B, Cengiz E C, Demir-Cakan R, Yagci Y. Inverse vulcanization of bismaleimide and divinylbenzene by elemental sulfur for lithium sulfur batteries. *European Polymer Journal* 2016, 80: 70-77.
20. Zhang Y Y, Griebel J J, Dirlam P T, Nguyen N A, Glass R S, Mackay M E, et al. Inverse vulcanization of elemental sulfur and styrene for polymeric cathodes in Li—S batteries. *Journal of Polymer Science Part a-Polymer Chemistry* 2017, 55(1): 107-116.
21. Crockett M P, Evans A M, Worthington M J H, Albuquerque I S, Slattery A D, Gibson C T, et al. Sulfur-Limonene Polysulfide: A Material Synthesized Entirely from Industrial By-Products and Its Use in Removing Toxic Metals from Water and Soil. *Angewandte Chemie International Edition* 2016, 55(5): 1714-1718.
22. Hasell T, Parker D J, Jones H A, McAllister T, Howdle S M. Porous inverse vulcanised polymers for mercury capture. *Chemical Communications* 2016, 52(31): 5383-5386.
23. Lee J S M, Parker D J, Cooper A/I, Hasell T. High surface area sulfur-doped microporous carbons from inverse vulcanised polymers. *Journal of Materials Chemistry A* 2017, 5(35): 18603-18609.
24. Thielke M, Bultema L, Brauer D, Richter B, Fischer M, Theato P. Rapid Mercury(II) Removal by Electrospun Sulfur Copolymers. *Polymers* 2016, 8(7): 266.
25. Chung W J, Simmonds A G, Griebel J J, Kim E T, Suh H S, Shim I B, et al. Elemental Sulfur as a Reactive Medium for Gold Nanoparticles and Nanocomposite Materials. *Angewandte Chemie-International Edition* 2011, 50(48): 11409-11412.
26. Kim E T, Chung W J, Lim J, Johe P, Glass R S, Pyun J, et al. One-pot synthesis of PbS NP/sulfur-oleylamine copolymer nanocomposites via the copolymerization of elemental sulfur with oleylamine. *Polymer Chemistry* 2014, 5(11): 3617-3623.
27. Martin T R, Mazzio K A, Hillhouse H W, Luscombe C K. Sulfur copolymer for the direct synthesis of ligand-free CdS nanoparticles. *Chemical Communications* 2015, 51(56): 11244-11247.
28. Bear J C, Peveler W J, McNaughter P D, Parkin I P, O'Brien P, Dunnill C W. Nanoparticle-sulphur "inverse vulcanisation" polymer composites. *Chemical Communications* 2015, 51(52): 10467-10470.
29. Zhuoling D, Alexander H, Patrick T, Karen L. Surface Properties and Antimicrobial Activity of Poly(sulfur-co-1,3-diisopropenylbenzene) Copolymers. *Macromolecular Chemistry and Physics* 2018, 219(5): 1700497.
30. Parker D J, Jones H A, Petcher S, Cervini L, Griffin J M, Akhtar R, et al. Low cost and renewable sulfur-polymers by inverse vulcanisation, and their potential for mercury capture. *Journal of Materials Chemistry A* 2017, 5(23): 11682-11692.
31. Worthington M J H, Kucera R L, Albuquerque I S, Gibson C T, Sibley A, Slattery A D, et al. Laying Waste to Mercury: Inexpensive Sorbents Made from Sulfur and Recycled Cooking Oils. *Chemistry-A European Journal* 2017, 23(64): 16219-16230.
32. Gomez I, Leonet O, Blazquez J A, Mecerreyes D. Inverse Vulcanization of Sulfur using Natural Dienes as Sustainable Materials for Lithium-Sulfur Batteries. *ChemSusChem* 2016, 9(24): 3419-3425.
33. Zhu Y, Romain C, Williams C K. Sustainable polymers from renewable resources. *Nature* 2016, 540: 354.
34. Salman M K, Karabay B, Karabay L C, Cihaner A. Elemental sulfur-based polymeric materials: Synthesis and characterization. *Journal of Applied Polymer Science* 2016, 133(28): n/a-n/a.
35. Blight L, Currell B R, Nash B J, Scott RAM, Stillo C. Preparation and Properties of Modified Sulfur Systems. *New Uses of Sulfur-II*, vol. 165. AMERICAN CHEMICAL SOCIETY, 1978, pp 13-30.
36. Bateman L, Association NRPR. *The Chemistry and Physics of Rubber-like Substances: Studies of the Natural Rubber Producers' Research Association*. Applied Science Publishers, 1963.
37. Nicholson J W. Polymerisation reactions. *The Chemistry of Polymers* (3). The Royal Society of Chemistry, 2006, pp 23-39.
38. Martin J M, Smith W K. *Handbook of Rubber Technology*, vol. Vol 1. Satish Kumar Jain for CBS Publishers & Distributors: New Delhi, 2007.
39. Ikeda Y, Yasuda Y, Ohashi T, Yokohama H, Minoda S, Kobayashi H, et al. Dinuclear Bridging Bidentate Zinc/Stearate Complex in Sulfur Cross-Linking of Rubber. *Macromolecules* 2015, 48(3): 462-475.
40. Moad G, Rizzardo E, Thang S H. Radical addition-fragmentation chemistry in polymer synthesis. *Polymer* 2008, 49(5): 1079-1131.
41. Griebel J J, Li G, Glass R S, Char K, Pyun J. Kilogram Scale Inverse Vulcanization of Elemental Sulfur to Prepare High Capacity Polymer Electrodes for Li—S Batteries. *Journal of Polymer Science Part a-Polymer Chemistry* 2015, 53(2): 173-177.
42. Arslan M, Kiskan B, Yagci Y. Combining Elemental Sulfur with Polybenzoxazines via Inverse Vulcanization. *Macromolecules* 2016, 49(3): 767-773.
43. Zhang Y, Konopka K M, Glass R S, Char K, Pyun J. Chalcogenide hybrid inorganic/organic polymers (CHIPs) via inverse vulcanization and dynamic covalent polymerizations. *Polymer Chemistry* 2017, 8(34): 5167-5173.
44. Esdaile L J, Chalker J M. The Mercury Problem in Artisanal and Small-Scale Gold Mining. *Chemistry-A European Journal* 2018, 24(27): 6905-6916.
45. Kanchi S, Singh P, Bisetty K. Dithiocarbamates as hazardous remediation agent: A critical review on progress in environmental chemistry for inorganic species studies of 20th century. *Arabian Journal of Chemistry* 2014, 7(1): 11-25.
46. Dondi D, Buttafava A, Zeffiro A, Palamini C, Lostritto A, Giannini L, et al. The mechanisms of the sulphur-only and catalytic vulcanization of polybutadiene: An EPR and DFT study. *European Polymer Journal* 2015, 62: 222-235.

47. Lian Q S, Li Y, Li K, Cheng J, Zhang J Y. Insights into the Vulcanization Mechanism through a Simple and Facile Approach to the Sulfur Cleavage Behavior. *Macromolecules* 2017, 50(3): 803-810.
48. Glass R S. Sulfur Radicals and Their Application. *Topics in current chemistry (Cham)* 2018, 376(3): 22.
49. Shankarayya Wadi V K, Jena K K, Khawaja S Z, Yannakopoulou K, Fardis M, Mitrikas G, et al. NMR and EPR Structural Analysis and Stability Study of Inverse Vulcanized Sulfur Copolymers. *ACS Omega* 2018, 3(3): 3330-3339.
50. Westlake H E. THE SULFURIZATION OF UNSATURATED COMPOUNDS. *Chemical Reviews* 1946, 39(2): 219-239.
51. Bateman L, Moore C G, Porter M. THE REACTION OF SULPHUR AND SULPHUR COMPOUNDS WITH OLEFINIC SUBSTANCES 0.11. THE MECHANISM OF INTERACTION OF SULPHUR WITH MONO-OLEFINS AND 1-5-DIENES. *Journal of the Chemical Society* 1958(AUG): 2866-2879.
52. Parker A J, Kharasch N. THE SCISSION OF THE SULFUR-SULFUR BOND. *Chemical Reviews* 1959, 59(4): 583-628.
53. Liu Y H, Wang T J, Qin L, Jin Y. Urea particle coating for controlled release by using DCPD modified sulfur. *Powder Technology* 2008, 183(1): 88-93.
54. Lian Q S, Li Y, Yang T, Li K, Xu Y F, Liu L, et al. Study on the dual-curing mechanism of epoxy/allyl compound/sulfur system. *Journal of Materials Science* 2016, 51(17): 7887-7898.

Experimental Section 1

A. Materials Sulfur ($S_8$, sublimed powder, reagent grade, ≥99.5%, Brenntag UK & Ireland. Purchased in 25 Kg bags), ethylene glycol dimethylacrylate (EGDMA, 98%, Alfa Aesar), glyoxal bis(diallyl acetal) (GBDA, Aldrich), trans, trans,cis-1,5,9-cyclododecatriene (CDDT, 98%, Alfa Aesar), 1,3,5,7-tetravinyltetramethylcyclotetrasiloxane (TVTM-CTSi, 97%, Alfa Aesar), 1,2,4-trivinylcycohexane (TVCH, 98%, Fluorochem), dicyclopentadiene (DCPD, >95%, TCI), 1,3-diisopropenylbenzene (DIB, 97%, Aldrich), divinylbenzene (DVB, 80%, Merck), (R)-(+)-limonene (97%, Aldrich), squalene (≥98%, Alfa Aesar), linseed oil (Aldrich), sunflower oil (Tesco), sodium diethyldithiocaebamate trihydrate (Alfa Aesar), copper diethyldithiocaebamate (TCI), nickel diethyldithiocaebamate (TCI), ZnO (Aldrich), zinc (Aldrich), $ZnCl_2$ (Aldrich), $FeCl_2$ (Aldrich), CuO (Aldrich), $CuCl_2$ (Aldrich), zinc stearate (Aldrich), 2-Cyano-2-propyl benzodithioate (>97%, Aldrich), thiram (Aldrich), chloroform (Aldrich), and chloroform-d ($CDCl_3$, Cambridge Isotope Laboratories Inc.) were commercially available and used as received without any further purification. Iron diethyldithiocaebamate and cobalt diethyldithiocaebamate were both synthesized from sodium diethyldithiocaebamate following a method reported in the literature.[1]

B. Instrumentation Used for Characterization:

Gel permeation chromatography (GPC): The molecular weight of the soluble fraction of the polymers was determined by gel permeation chromatography (GPC) using a Viscotek system comprising a GPCmax (degasser, eluent and sample delivery system), and a TDA302 detector array, using THE as eluent.

Powder X-ray Diffraction (PXRD): Data was measured using a PANalytical X'Pert PRO diffractometer with Cu—$K_{\alpha 1+2}$ radiation, operating in transmission geometry.

Differential Scanning calorimetry (DSC) were performed on a TA Instruments Q200 DSC, under nitrogen flow, and with heating and cooling rates of 5° C./min.

Thermogravimetric analysis (TGA) samples were heated under nitrogen to 800° C. at a heating rate of 20° C. $min^{-1}$ using a TA Instruments Q500.

Fourier-transform infrared spectroscopy (FT-IR) was performed using a Thermo NICOLET IR200, between 400 $cm^{-1}$ to 4000 $cm^{-1}$. Samples were loaded either neat, using an attenuated total reflectance accessory, or in transmission after pressing into a KBr pellet.

Solution NMR was recorded in deuterated chloroform using a Bruker Advance DRX (400 MHZ) spectrometer.

$^1H$ and $^{13}C$ magic-angle spinning (MAS) NMR spectra were performed on a Bruker Avance III operating at a $^1H$ Larmor frequency of 700 MHZ, using a Bruker 4 mm HX probe. Chemical shifts were referenced using the $CH_3$ resonance of solid alanine at 1.1 ppm (1H) and 20.5 ppm ($^{13}C$) (see ESI for full details). DFT calculations on polymer fragments: Computational calculations on the structural fragments were performed using Gaussian 09. Structures were generated using the GaussView package and fully optimized at the B3LYP level of theory using the 6-31G(d) basis set, before NMR parameters were calculated under the same conditions. For each polymer fragment shown in Scheme 2, cross-linking bonds were terminated with S—H groups prior to the calculations. A chemical shielding reference of 189.7 ppm was used, determined from a separate calculation on an optimized tetramethylsilane molecule.

Solid-State NMR: $^1H$ magic-angle spinning (MAS) NMR spectra ws performed on a Bruker Avance Ill operating at a $^1H$ Larmor frequency of 700 MHZ, using a Bruker 4 mm HX probe. Chemical shifts were referenced using the $CH_3$ resonance of solid alanine at 1.1 ppm (1H). The $^1H$ heteronuclear decoupling using two-pulse phase modulation and a radiofrequency field strength of 100 kHz was applied during acquisition. The $^1H$ MAS NMR spectrum was recorded at a MAS frequency of 9881 Hz with DUMBO homonuclear decoupling[2] applied to achieve high resolution. An empirically-determined scaling factor of 0.44 was applied to the $^1H$ chemical shifts.

C. Experimental Procedures:

A note on the reproducibility and sensitivity of inverse vulcanization reactions: We have noted that these reactions are particularly susceptible to changes in apparatus and conditions. This results from the nature of the reactions, being driven by radical initiation, and exothermic polymerization. Care must be taken not to let the temperature of the heating medium (we use metal heating blocks on hot plate stirrers) to 'overshoot' in temperature, as this will affect the reaction time. The sulfur polymerization mixture is also quite a poor thermal conductor, and if care is not taken, the exothermic reaction causes the internal temperature to increase above the intended temperature. The reaction will therefore proceed differently depending on the heat transfer away from the reaction. As a result, using different sizes and shapes of heating blocks, different glassware volumes, stirrer speeds, stirrer geometries etc. will all affect this process. For this reason, we took great care to keep all of these variables constant in these reactions.

1) General Procedure for the Catalysts Discovery and Screening: Preparation of Poly (Sulfur-Random-(Ethylene Glycol Dimethacrylate)) (Poly(S-r-EGDMA)) To a 40 mL glass reaction vial equipped with a magnetic stir bar was added 5 g (19.5 mmol) of elemental sulfur, catalysts (masses detailed below) and heated until molten by placing the vial in a metal heating block set to 135° C. The melting point of sulfur is ~120° C. The reactions were stirred at 200 RPM using cross shaped magnetic stirrer bars. When the sulfur was molten, 5 g (25.2 mmol) of Ethylene glycol dimethacrylate (EGDMA) cross-linker was added. The stirring rate was then increased to 900 RPM, and the reaction continued for up to 10 hours. Samples that were observed to react to form a homogeneous molten state (does not separate if removed on a spatula and cooled to room temperature), were then removed from stirring and cured in an oven at 140° C. for 10 hours further. Samples that showed no sign of reaction, and that were still two phases after 10 hours were aborted.

- a. Preparation of Poly(S-r-EGDMA) with 1 w % of ZnO as catalyst: The copolymerization was carried out by the following the general method mentioned above with ZnO (100 mg, 1 w % loading, 1.22 mmol) to afford two layers of mixture with yellow solid at bottom and a clear liquid on the top (yield: 9.7 g). Elemental Analysis for $(C_{10}H_{14}O_4+S_8)_n$ (50 w % S), Calcul. (%): C, 32.95; H, 3.56; S, 50; Found: C, 29.52; H, 3.30; S, 49.58. PXRD and DSC confirmed the presence of unreacted sulfur.
- b. Preparation of Poly(S-r-EGDMA) with 1 w % of Zinc as catalyst: The copolymerization was carried out by the following the general method mentioned above with Zinc (100 mg, 1 w % loading, 1.53 mmol) to afford two layers of mixture with yellow solid at bottom and a clear liquid on the top (yield: 9.3 g). PXRD and DSC confirmed the presence of unreacted sulfur.
- c. Preparation of Poly(S-r-EGDMA) with 1 w % of Zinc Chloride as catalyst: The copolymerization was carried out by the following the general method mentioned above with $ZnCl_2$ (100 mg, 1 w % loading, 0.736 mmol) to afford two layers with gray-brown solid at the bottom and a clear liquid above (yield: 9.5 g). PXRD and DSC confirmed the presence of unreacted sulfur.
- d. Preparation of Poly(S-r-EGDMA) with 1 w % of iron Chloride as catalyst: The copolymerization was carried out by the following the general method mentioned above with $FeCl_2$ (100 mg, 1 w % loading, 0.787 mmol) to afford two layers with brown-red solid at the bottom and clear liquid on above (yield: 9.3 g). PXRD and DSC confirmed the presence of unreacted sulfur.
- e. Preparation of Poly(S-r-EGDMA) with 1 w % of Copper oxide as catalyst: The copolymerization was carried out by the following the general method mentioned above with CuO (100 mg, 1 w % loading, 1.26 mmol) to afford two layers of mixture with brown solid at bottom and liquid on the top (yield: 9.1 g). PXRD and DSC confirmed the presence of unreacted sulfur.
- f. Preparation of Poly(S-r-EGDMA) with 1 w % of Copper Chloride as catalyst: The copolymerization was carried out by the following the general method mentioned above with $CuCl_2$ (100 mg, 1 w % loading, 0.743 mmol) to afford two layers with a brown-green solid at the bottom and a clear liquid above (yield: 9.3 g). PXRD and DSC confirmed the presence of unreacted sulfur.
- g. Preparation of Poly(S-r-EGDMA) with 1 w % of Zinc Stearate (Zn-STR) as catalyst: The copolymerization was carried out by the following the general method mentioned above with Zn-STR (100 mg, 1 w % loading, 0.743 mmol) to afford an orange-red solution that cooled to a solid (yield: 9.3 g). Elemental Analysis for $(C_{10}H_{14}O_4+S_8)_n$ (50 w % S), Calcul. (%): C, 32.95; H, 3.56; S, 50; Found: C, 31.75; H, 3.64; S, 47.33. PXRD and DSC confirmed the presence of unreacted sulfur.
- h. Preparation of Poly(S-r-EGDMA) with 1 w % of Zinc diethyldithiocarbamate ($ZnD_2$) as catalyst: The copolymerization was carried out by the following the general method mentioned above with $ZnD_2$ (100 mg, 1 w % loading, 0.276 mmol) to afford a dark-red homogeneous gel and then black-red solid (yield: 9.9 g). Elemental Analysis for $(C_{10}H_{14}O_4+S_8)_n$ (50 w % S), Calcul. (%): C, 32.95; H, 3.56; S, 50; Found: C, 28.72; H, 3.25; S, 51.48. DSC and PXRD confirm the absence of crystalline $S_8$. The $T_g$ was 20° C.
- i. Preparation of Poly(S-r-EGDMA) with 1 w % of Iron diethyldithiocarbamate (Fe-D) as catalyst: The copolymerization was carried out by the following the general method mentioned above with Fe-D (100 mg, 1 w % loading, 0.284 mmol) to afford a black-green homogeneous gel and then a black solid (yield: 9.8 g). Elemental Analysis for $(C_{10}H_{14}O_4+S_8)_n$ (50 w % S), Calcul. (%): C, 32.95; H, 3.56; S, 50; Found: C, 29.73; H, 3.29; S, 49.99. DSC and PXRD confirm the absence of crystalline $S_8$. The $T_g$ was 22° C. j. Preparation of Poly(S-r-EGDMA) with 1 w % of Cobalt diethyldithiocarbamate (Co-D) as catalyst: The copolymerization was carried out by the following the general method mentioned above with Co-D (100 mg, 1 w % loading, 0.281 mmol) to afford a dark-brown homogeneous gel and then a black solid (yield: 9.6 g). Elemental Analysis for $(C_{10}H_{14}O_4+S_8)_n$ (50 w % S), Calcul. (%): C, 32.95; H, 3.56; S, 50; Found: C, 28.89; H, 3.29; S, 51.10. DSC and PXRD confirm the absence of crystalline Sa. The $T_g$ was 18° C.
- k. Preparation of Poly(S-r-EGDMA) with 1 W % of Copper diethyldithiocarbamate (Cu-D) as catalyst: The copolymerization was carried out by the following the general method mentioned above with Cu-D (100 mg, 1 w % loading, 0.278 mmol) to afford a dark-red homogeneous gel and then a black-red solid (yield: 9.8 g). Elemental Analysis for $(C_{10}H_{14}O_4+S_8)_n$ (50 w % S), Calcul. (%): C, 32.95; H, 3.56; S, 50; Found: C, 30.07; H, 3.39; S, 49.49. A slight melting transition was detected for unreacted S& by DSC, but no crystallinity was detected by PXRD. The To was 24° C.
- l. Preparation of Poly(S-r-EGDMA) with 1 W % of Nickel diethyldithiocarbamate (Ni-D) as catalyst: The copolymerization was carried out by the following the general method mentioned above with Ni-D (100 mg, 1 w % loading, 0.282 mmol) to afford a dark-brown homogeneous gel and then a black solid (yield: 9.7 g). Elemental Analysis for $(C_{10}H_{14}O_4+S_8)_n$ (50 w % S), Calcul. (%): C, 32.95; H, 3.56; S, 50; Found: C, 29.63; H, 3.38; S, 50.13. DSC and PXRD confirm the absence of crystalline $S_8$. The To was 18° C.

2) Synthesis of sulfur polymers with a range of cross-linkers, with and without $ZnD_2$ catalyst: To a 40 mL glass reaction vial equipped with a cross shaped magnetic stir bar was added 5 g (19.5 mmol) of elemental sulfur, 5 g of crosslinker, and Zn-Diethyldithiocarbamate catalyst (0 mg, 100 mg, or 500 mg) and heated until molten by placing the vial in a metal heating block set to 135° C. The melting point of sulfur is ~120° C. A rubber septum was placed over the top of the vial, and pierced with a needle to allow outgassing during heating. After the first 10 minutes, by which time the sample was completely molten, the needle was removed and the stirring increased to 900 RPM. The use of a rubber septum reduces loss of monomers by evaporation. The high stirring rate aids heat transfer to the sides of the reaction to prevent increases in temperature due to the exothermic reaction. The end-point of the reaction was taken as the point at which solidification of the reaction mixture caused the stirrer bar to cease motion. However, all reactions were left in the heating blocks for at least 24 hours before being removed and allowed to cool. The reactions were monitored for the first hour, and then in half hour intervals for the first 12 hours, then checked again after 24 hours (hence why the reaction time is listed as 12-24 hours for some reactions). After cooling samples were recovered by breaking the vials. All of these reactions were performed in triplicate to ensure the timings were consistent, and allow DSC to be performed on three separate reactions. All crosslinkers were prepared according to the above method, except for limonene, which is known to produce low molecular weight byproducts including cymene, where the reaction was performed under vacuum distillation as reported by Chalker et al.[3]

3) Synthesis of moulded objects: Moulded objects (such as the 'robots' in FIG. 2) were produced using a modified version of the synthesis above. The initial phase of the reaction was the same, but when the reaction mixture had formed a 'pre-polymer' state (increase in viscosity, darkened colour, single phase, no separation on cooling) it was transferred from the glass vial into a silicone mould and placed in an over at 140° C. for a further 12 hours to cure.

4) General procedure for the synthesis of sulfur-rich polymers with combined cross-linkers by using Zn Diethyldithiocarbamate as catalyst: To a 40 mL glass reaction vial equipped with a magnetic stir bar was added 5 g (19.5 mmol) of elemental sulfur, Zn Diethyldithiocarbamate (100 mg, 1 w % loading, 0.276 mmol) and heated until molten by placing the vial in a metal heating block set to 135° C. The melting point of sulfur is ~120° C. The reactions were stirred vigorously using magnetic stirrer bars. When the sulfur was molten, 5 g of combined two cross-linkers (masses detailed below) were added. The reaction time was counted from the addition of cross-linker to the molten sulfur, until the reaction was aborted or a homogeneous stable polymer was formed. Formation of a stable homogeneous polymer was indicated by gelation and darkening of the reaction mixture, or solid of the reaction mixture. Homogeneous polymer samples were then transferred into an oven to cure. The oven was pre-heated to 140° C. and the sample cured at this temperature for 10 h before being cooled to room temperature and removed.

m. Preparation of poly (sulfur-random-TVTCSi & CDDT) Poly(S-r-TVTCSi/CDDT) with 1 w % of Zinc diethyldithiocarbamate as catalyst: The copolymerization was carried out by the following the general method mentioned above in the presence of catalysts with two cross-linkers of TVTCSi (2.5 g, 7.34 mmol) and CDDT (2.5 g, 15.41 mmol) to afford a red homogeneous gel and black solid (yield: 9.9 g). Elemental Analysis for $(C_{24}H_{42}O_4Si_4+S_8)_n$ (50 w % S), Calcul. (%): C, 28.43; H, 4.17; S, 50; Found: C, 31.28; H, 4.17; S, 52.01.

n. Preparation of poly (sulfur-random-TVTCSi & DCPD)) Poly(S-r-TVTCSi/DCPD) with 1 w % of Zinc diethyldithiocarbamate as catalyst: The copolymerization was carried out by the following the general method mentioned above in the presence of catalysts with two cross-linkers of TVTCSi (2.5 g, 7.34 mmol) and DCPD (2.5 g, 18.91 mmol) to afford a red homogeneous gel and black solid (yield: 10.0 g). Elemental Analysis for $(C_2H_{36}O_4Si_4+S_8)_n$ (50 w % S), Calcul. (%): C, 27.71; H, 3.81; S, 50; Found: C, 32.60; H, 3.88; S, 50.20.

o. Preparation of poly (sulfur-random-TVTCSi & EGDMA)) Poly(S-r-TVTCSi/EGDMA) with 1 w % of Zinc diethyldithiocarbamate as catalyst: The copolymerization was carried out by the following the general method mentioned above in the presence of catalysts with two cross-linkers of TVTCSi (2.5 g, 7.34 mmol) and EGDMA (2.5 g, 12.6 mmol) to afford a red homogeneous gel and black solid (yield: 9.7 g). Elemental Analysis for $(C_{22}H_{38}O_8Si_4+S_8)_n$ (50 w % S), Calcul. (%): C, 24.34; H, 3.53; S, 50; Found: C, 24.49; H, 3.36; S, 50.14.

p. Preparation of poly (sulfur-random-TVTCSi & Farnesol)) Poly(S-r-TVTCSi/Farnesol) with 1 w % of Zinc diethyldithiocarbamate as catalyst: The copolymerization was carried out by the following the general method mentioned above in the presence of catalysts with two cross-linkers of TVTCSi (2.5 g, 7.34 mmol) and Farnesol (2.5 g, 11.24 mmol) to afford a red homogeneous gel and black-red solid (yield: 9.2 g). Elemental Analysis for $(C_{27}H_{50}O_5Si_4+S_8)_n$ (50 w % S), Calcul. (%): C, 28.59; H, 4.45; S, 50; Found: C, 29.30; H, 4.35; S, 52.36.

5) Experimental for the H$_2$S Gas Determination

General procedure for catalytic inverse vulcanization: In a glove box, Sulfur (5 g, 19.5 mmol), cross-linkers (5 g), and ZnD$_2$ catalyst (100 mg, 0.276 mmol) were added to a 40 mL reaction vial equipped with a stirrer bar under N$_2$ atmosphere. The vial was sealed with a rubber septum and the reaction was setup in a fume hood. The vial was then connected with a N$_2$-degassed tube ended with a needle to a measuring cylinder (100 mL). The measuring cylinder was filled with deionised water and was placed upside down in a 1 L beaker with water. The reaction mixture was heated until molten by placing the vial in a metal heating block set to 135° C. The reactions were stirred vigorously using magnetic stirrer bars for each crosslinkers until each reaction produced no more gas, typically under an hour.

General procedure for non-catalytic inverse vulcanization: In a glove box, Sulfur (5 g, 19.5 mmol) and cross-linkers (5 g) were added to a 40 mL reaction vial equipped with a stirrer bar under N$_2$ atmosphere. The vial was sealed with a rubber septum and the reaction was setup in the normal fume hood. The vial was then connected with a N$_2$-degassed tube ended with a needle to a measuring cylinder (100 mL). The measuring cylinder was filled with deionised water and was placed upside down in a 1 L beaker with water. The reaction mixture was heated until molten by placing the vial in a metal heating block set to normally higher temperatures that the equivalent reactions without catalysts, to induce similar degrees of reaction over the same timescale. Temperatures were therefore chosen according to the relative reactivities of the crosslinkers and were as follows: Limonene 180° C., DCPD 170° C., ENB 135° C., DVB and DIB 160° C. The reactions were stirred vigorously using magnetic stirrer bars for each crosslinkers until each reaction produced no more gas, typically under an hour. Another experiment was performed in the same manner with limonene, at 1 wt. % ZnD$_2$ loading, but at 180° C., the same temperature as the uncatalysed reaction.

Observations: The reaction of sulfur and limonene without catalyst generated 63 mL H$_2$S gas, while with 1 wt. % catalyst, the same reaction only generated 10 ml of the H$_2$S gas. The former reaction was carried out at 180° C. for 15 min and the latter at 135° C. for 50 min. Similar observations were reached for DCPD, for which the reaction was carried out at 170° C. in the absence of catalysts for 27 min, the reaction produced 26.5 mL of gas. The same reaction with 1 wt. % catalyst was carried out at 135° C. for 45 min, the amount of gas generated was only 3.5 mL. The generation of $H_2S$ gas is dependent on the presence of α-proton of allyl groups and related to the reaction temperature. Therefore, with those cross-linkers without α-proton of allyl groups (e.g. DVB, DIB), lower amounts of gas were released, and only at the beginning of the reaction, there was not any gas generated after the first 3-5 min, especially for the reactions with catalysts. ENB is more reactive than DCPD, and as a result requires lower temperatures, producing less $H_2S$. In the cases only small amounts of gas were produced (few mL from 10 g reactions), it is possible this recorded volume is at least partly the result of the desorption of gases and moisture dissolved in the reactants, because of heating. In the samples were larger amounts of gas were produced (DCPD and limonene without catalyst), the production of $H_2S$ was confirmed by exposing a $H_2S$ detector to the gas produced.

6) Heavy Metal Remediation Testing

Synthesis of polymer coated fumed silica: In a round bottom flask, 0.5 g of S-limonene polymers was dissolved in 50 mL of tetrahydrofuran (THF) at room temperature. 5 g of silica gel (Fluorochem, pore size 60 Å, 40-63 μm particle size) was added then added to the flask and the mixture agitated for several minutes. THF was removed by placing the round bottom flask on a rotary evaporator (water bath at 45° C.) and the material was evaporated to dryness, at which point the flask was removed and the coated silica particles were weighed and stored in a glass vial.

Effect of catalyst loading on metal uptake: To determine whether the amount of catalyst used in the sulfur polymer synthesis affected the amount of metal removed from an aqueous solution, polymer coated silica samples were prepared from polymers synthesised with 0, 1 and 5 wt. % catalyst ($ZnD_2$) loading. To test the effect on metal uptake, 400 ppm solutions of Hg, Au, and Fe were prepared. Each test involved placing 240 mg of coated silica in 12 mL of chosen metal solution, capping the vial and agitating the vials on a tube roller for 60 minutes. After 1 hour the samples were removed, filtered using 0.45 μm nylon syringe filter and an aliquot from each was removed for ICP-OES analysis. Metal uptake was calculated by difference when compared to a control sample which did not contain the coated silica.

Kinetic and capacity studies using mercury solution: Before conducting capacity tests for the sorbent, a kinetics study was preformed to determine the optimal time to leave the samples to fully adsorb the mercury from an aqueous solution. The kinetics study was performed by placing 240 mg of 5% catalysed S-Lim coated silica in to vials with 12 mL of 1000 ppm mercury chloride aqueous solution. Once capped the vials were placed on a tube roller for agitation before being removed at regular intervals. Once a sample was removed, a small aliquot was removed, diluted by a factor 1:100 and analysed by ICP-OES. Mercury uptake was calculated by difference when compared to a control sample which did not contain the 5% S-Lim coated silica. A capacity study was conducted by sampling different mass of 5% S-Lim coated silica (120, or 240 mg) in different mercury chloride solution strengths (125-2000 ppm). A peak capacity for the material was calculated at 65.250 mg of mercury per gram of sorbent used. However the majority of the sorbent mass is the fumed silica support, suggesting that the capacity of the polymer is likely to be x10 greater than the capacity for the whole polymer coated silica. To ensure that the silica itself played no part in the mercury removal process a control of uncoated fumed silica was added to 12 mL of 1000 ppm mercury solution and agitated for 16 hours on a tube roller as well. Negligible mercury capture was noted (<3%).

Affinity for other metals: To test the selectivity and ability of the 5% S-Lim coated silica, a range of different metals were tested. These included gold chloride, methylmercury chloride (to simulate organomercury compounds), cadmium chloride, chromium chloride iron (III) chloride and lead nitrate. All solutions were prepared to 100 ppm concentration. Tests involved using 240 mg of 5% catalyst S-Limonene and 12 mL of the test solution. Samples were then capped and agitated on a tube roller for 16 hours, after which an aliquot of solution was removed, filtered and analysed via ICP-OES. Metal uptake was calculated by difference when compared to a control sample which did not contain the coated silica.

GPC of Soluble Polymers:

The nature of the inverse vulcanization reaction leads to crosslinked polymers, and as such most of the polymers reported here are insoluble. Only two of the polymers, S-limonene and S-TVCH, were found to be fully soluble. These we dissolved in chloroform (10 mg/mL) to allow analysis by GPC (See FIG. 41).

REFERENCES FOR EXPERIMENTAL SECTION 1

1. Hasegawa Y, Maeda M, Nakanishi T, Doi Y, Hinatsu Y, Fujita K, et al. Effective Optical Faraday Rotations of Semiconductor EuS Nanocrystals with Paramagnetic Transition-Metal Ions. *Journal of the American Chemical Society* 2013, 135(7): 2659-2666.
2. Elena B, de Paëpe G, Emsley L. Direct spectral optimisation of proton-proton homonuclear dipolar decoupling in solid-state NMR. *Chem Phys Lett* 2004, 398(4-6): 532-538.
3. Crockett M P, Evans A M, Worthington M J H, Albuquerque I S, Slattery A D, Gibson C T, et al. Sulfur-Limonene Polysulfide: A Material Synthesized Entirely from Industrial By-Products and Its Use in Removing Toxic Metals from Water and Soil. *Angewandte Chemie International Edition* 2015, 55(5): 1714-1718.
4. Crockett M P, Evans A M, Worthington M J H, Albuquerque I S, Slattery A D, Gibson C T, et al. Sulfur-Limonene Polysulfide: A Material Synthesized Entirely from Industrial By-Products and Its Use in Removing Toxic Metals from Water and Soil. *Angewandte Chemie International Edition* 2016, 55(5): 1714-1718.
5. Parker D J, Jones H A, Petcher S, Cervini L, Griffin J M, Akhtar R, et al. Low cost and renewable sulfur-polymers by inverse vulcanisation, and their potential for mercury capture. *Journal of Materials Chemistry A* 2017, 5(23): 11682-11692.
6. Esdaile L J, Chalker J M. The Mercury Problem in Artisanal and Small-Scale Gold Mining. *Chemistry-A European Journal* 2018, 24(27): 6905-6916.
7. Lee J S M, Parker D J, Cooper A I, Hasell T. High surface area sulfur-doped microporous carbons from inverse vulcanised polymers. *Journal of Materials Chemistry A* 2017, 5(35): 18603-18609.
8. Tobolsky A V, MacKnight W, Beevers R B, Gupta V D. The glass transition temperature of polymeric sulphur. *Polymer* 1963, 4: 423-427.
9 Nieuwenhuizen P J, Ehlers A W, Haasnoot J G, Janse S R, Reedijk J, Baerends E J. The Mechanism of Zinc(II)-Dithiocarbamate-Accelerated Vulcanization Uncovered;

Theoretical and Experimental Evidence. *Journal of the American Chemical Society* 1999, 121(1): 163-168.

EXPERIMENTAL SECTION 2-Inverse Vulcanization at Lower Temperatures

Materials

Sulfur ($S_8$, sublimed powder, reagent grade, ≥99.5%, Brenntag UK & Ireland. Purchased in 25 kg bags), ethylene glycol dimethylacrylate (EGDMA, 98%, Alfa Aesar), sodium diethyldithiocarbamate trihydrate (Alfa Aesar), 1,3-diisopropenylbenzene (DIB, 97%, Sigma Aldrich), and methyl methacrylate (MMA, 99%, Sigma Aldrich) were commercially available and used as received.

Polymerisations

Figure 57:
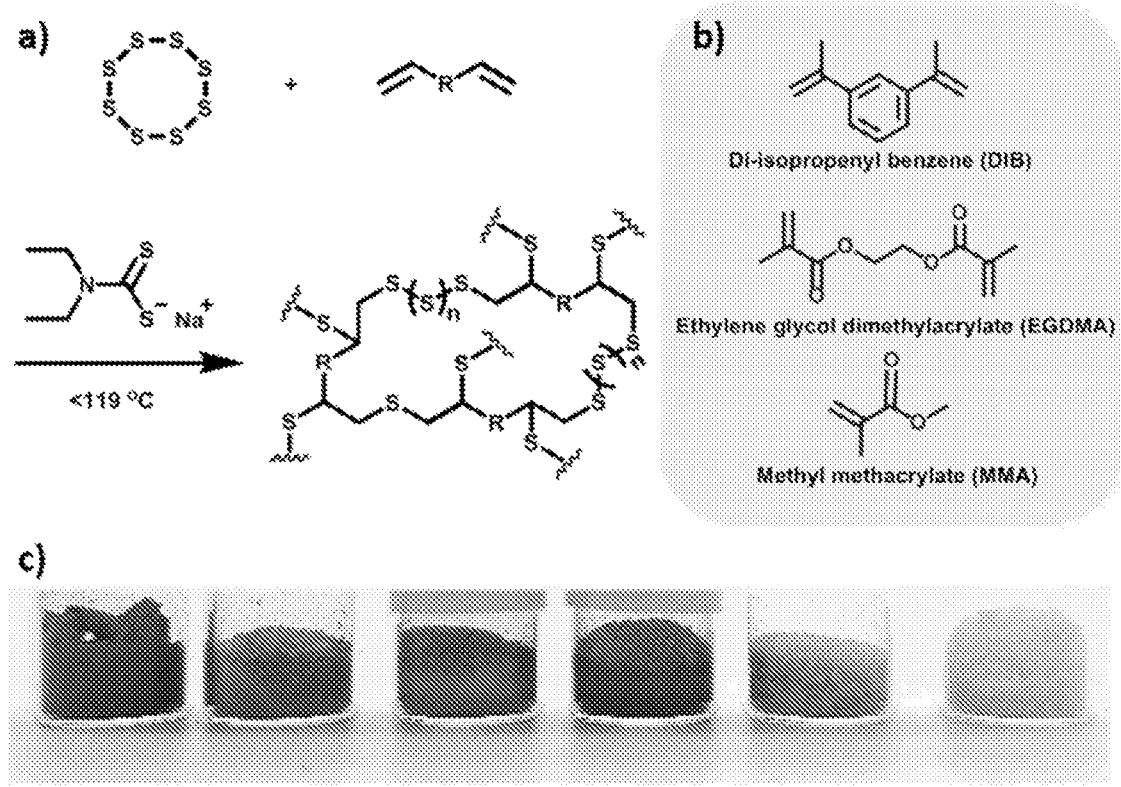
FIG. 57. (a) General reaction scheme for the inverse vulcanization below sulfur melting point with catalyst NaDTC. (b) Structure of crosslinkers for inverse vulcanization reported, di-isopropenyl benzebe (DIB), ethylene glycol dimethylacrylate (EGDMA), and methyl methacrylate (MMA). (c) Stable solid state products generated from inverse vulcanization below 119° C. From left to right, grounded thiopolymers of SDIBCOT180, SDIBC1T110, SDIBC5T110, SDIBC10T110, SEGDMAC1T110, and SEGDMAC1T100 (see footnote of table 8 for naming system)

Reactants were mixed in 40 mL volume glass samples vials by vertex mixture, and heated at corresponding temperatures in aluminium blocks and stirred by magnetic stirrer bars for polymerisations. For DIB, heating in the aluminium block was required for a minimum of 12 hours in order to generate fully solid products, which were then further cured in an oven at 110° C. for 12 hours. For EGDMA, the reaction finished in 20 minutes to generate fully solid products, and further curing was conducted in the oven at 110° C. for 12 hours. For MMA, the reaction was conducted at 95° C. for more than 12 hours, and moved into an oven for further curing for 96 hours. Specific conditions and components for different samples are listed in table 8.

in two phases, thus the ratio of sulfur to crosslinkers is important as too much sulfur (such as Sample SDIBC301T110, see Table 8 footnote for naming system) decreases mobility of the system, resulting in inhomogeneous products (as shown in ESI). Thiopolymers were prepared as stable solid at low temperature with different colours as shown in FIG. 57 (*b*). The difference in colours appear to depend on the degree of reactions and the length of sulfur chain, as the more catalyst applied the darker product is.

Poly(S-DIB)

Figure 58:
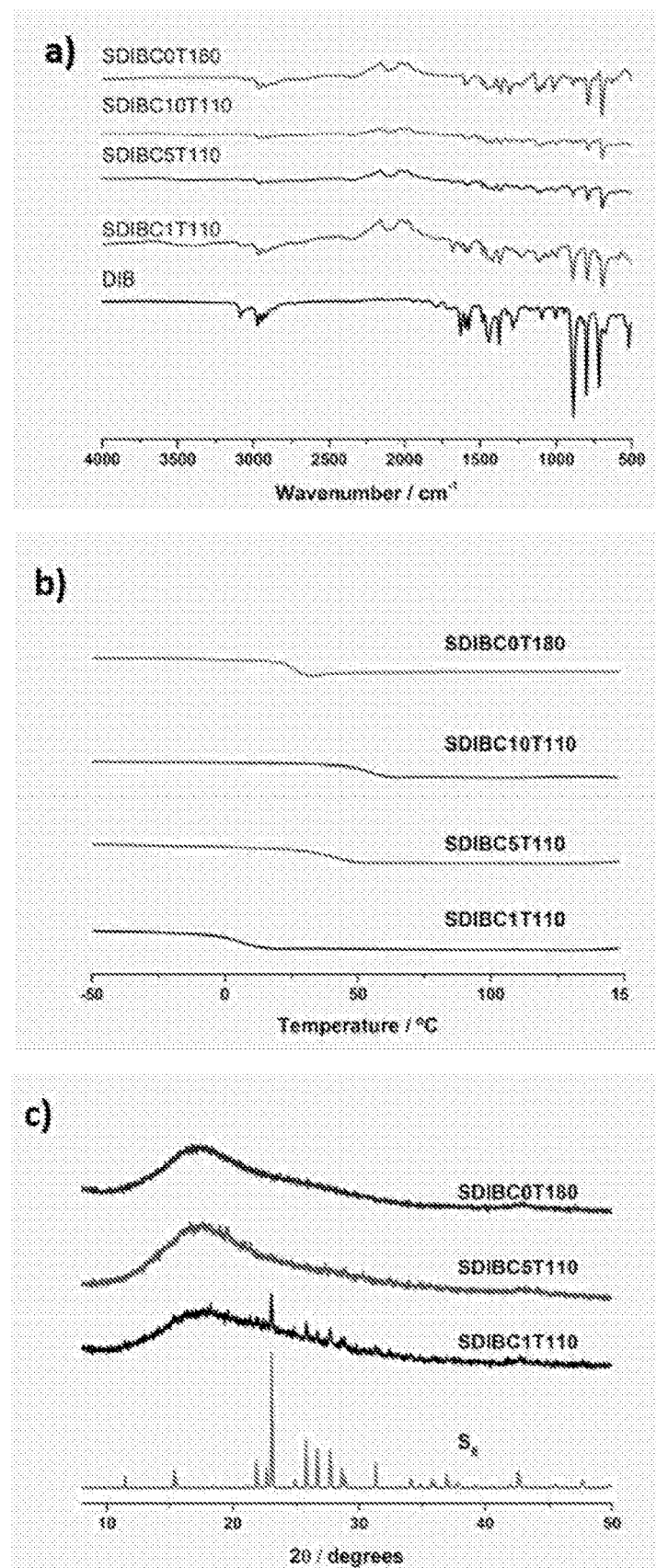
FIG. 58. (a) FT-IR spectroscopy of thiopolymers with different amount catalyst. (b) Offset DSC traces for different percentage NaDTC of poly(S-DIB). (c) Offset PXRD patterns for different percentage NaDTC of poly(S-DIB). (d) Offset PXRD patterns for SDIBC10T110 and corresponding residual solid after leaching, and NaDTC. (e) Offset DSC traces for different percentage NaDTC of poly(S-DIB). (f) Offset PXRD patterns for poly(S-DIB) synthesized at different temperatures with NaDTC.
Figure 58:
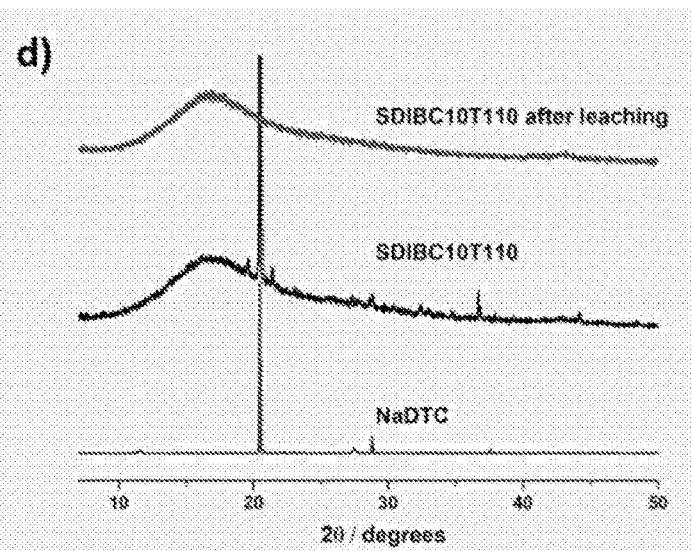
Figure 58:
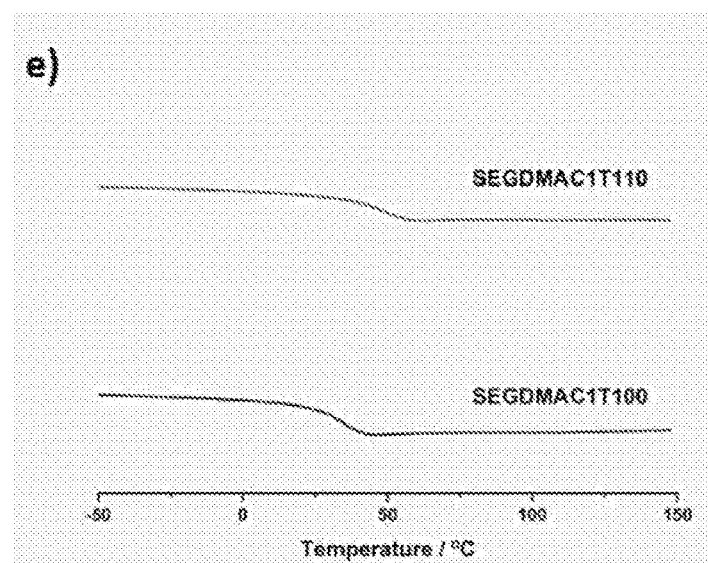
Figure 58:
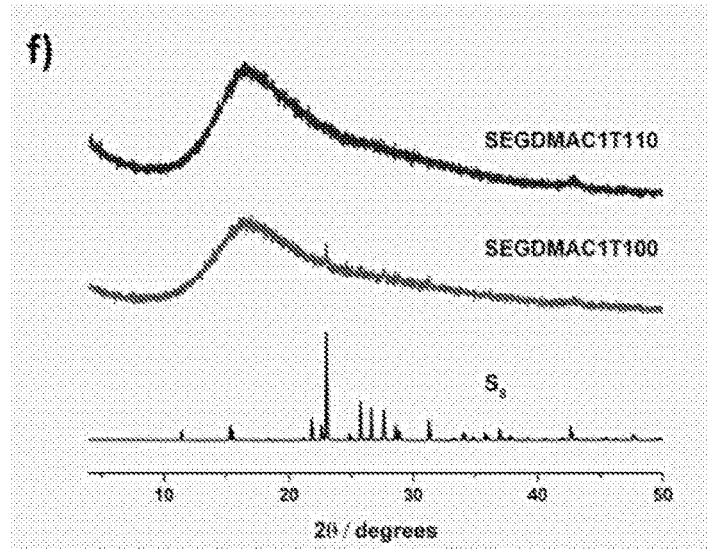

Thiopolymers made at low temperature (e.g. 110° C.) were from light yellow to dark brown, changing with the amount of catalyst. These colours are similar in appearance to these of conventionally produced thiopolymers. Increased catalyst content in the reaction is likely to lead to increased C═C double bond reaction, and shorter S—S chains between crosslinkers. The ATR-FTIR patterns, as shown in FIG. 58 (*a*), of Poly(S-DIB) further confirmed this assumption. As the amount of catalyst is increased, reductions of signals were shown at 3080, 3041, and 1681 $cm^{-1}$, corresponding to the stretching and symmetric stretching vibrations of C═C—H and stretching vibration of C═C respectively. Moreover, the clear decrease of signals at 887 $cm^{-1}$, of the $CH_2$ out-of-plane deformation, verified more C═C double bounds are consumed in the reaction with increased

TABLE 8

Samples trialed with different components and under different conditions.

| Sample name* | Crosslinker/% | NaDTC/% | Temperature/° C. | Reacting time and curing time |
| --- | --- | --- | --- | --- |
| SEGDMAC1T100 | EGDMA 50% | 1 | 100 | 20 min; overnight (>12 hours) |
| SEGDMAC1T110 | EGDMA 50% | 1 | 110 | 10 min; overnight (>12 hours) |
| SDIB30C1T110 | DIB 30% | 1 | 110 | / |
| SDIBC1T110 | DIB 50% | 1 | 110 | >12 hours, <24 hours; overnight (>12 hours) |
| SDIBC5T110 | DIB 50% | 5 | 110 | >12 hours, <24 hours; overnight (>12 hours) |
| SDIBC10T110 | DIB 50% | 10 | 110 | >12 hours, <24 hours; overnight (>12 hours) |
| SDIBC0T180 | DIB 50% | / | 180 | 10 min; no curing |
| SMMAC10T95 | MMA 50% | 10 | 95 | >12 hours, <24 hours; 96 hours (curing temperature raised from 95° C. to 110° C. gradually) |

*Naming system: thiopolymers are referred to as S-Crosslinker-P-C-n-T-n, where P is the percentage of crosslinkers used in the experiments, if the ratio of sulfur to crosslinker is 1:1, P will be omitted, C-n refers to weight percentage of catalyst, and T-n shows the temperature reactions were conducted.

Leaching and Remolding

Thiopolymer SDIBC10T110 was ground into fine powder and washed by water. Supernatant was evaporated after centrifugation to recrysalize catalyst. Residual solid powder was dried and transferred into silicone mold and reheated at 110° C. in the oven for 48 hours to remold.

Results and Discussion

Thiopolymers

Sodium diethyldithiocarbamate trihydrate (NaDTC) has been used as a rubber accelerator in industry for a long time. However, for some inverse vulcanisation reactions, it reacted too quickly and generated inhomogeneous products, or even resulted in auto-acceleration from the Trommsdorff-Norrish effect at the standard heating temperature (higher than 135° C.) of inverse vulcanizations. Therefore, this phenomenon encouraged us to trial this chemical to initiate and accelerate inverse vulcanization at low temperature. Conventionally, inverse vulcanization was performed at a temperature higher than 135° C. to induce cleavage of sulfur rings and generate disulfur radicals. But in the reaction at lower temperature, sulfur rings were possibly opened heterogeneously by nucleophilic activation. Considering that sulfur is solid at low temperature, the reaction is conducted catalyst content. According to the result of elemental analysis, the actual sulfur content of SDIBC1T110 was found to be higher than that calculated in theory, probably because of the evaporation of monomers during the reaction processing (as shown in ESI). From the DSC traces, as shown in FIG. 58 (*b*), $T_g$ increased with the amount of catalyst. In comparison with the thiopolymer produced from S and DIB without catalyst (but at the higher temperature of 180° C.), thiopolymers generated from the reaction with 1% catalyst had lower $T_g$, however the products of both reactions with 5% and 10% catalyst had higher $T_g$. There is no sulfur melting peak observed from all thiopolymers. Powder X-ray diffraction (PXRD) was another common method to detect residual sulfur crystal from amorphous copolymers. But, from the previous report sensitivity of DSC and PXRD to detect the trace presence of elemental sulfur crystal depended on the source intensity, detection time, and sensitivity of the detector. Thus, in order to further check if all the elemental sulfur had reacted, powder X-ray diffraction (PXRD) was performed.

Interestingly, from powder X-ray diffraction patterns of all poly(S-DIB), as shown in FIGS. 58 (*c*) and (*d*), different sharp peaks could be observed, some of which do not match the pattern of any sulfur polymorph. After further study, the patterns observed in SDIBC5T110 and SDIBC10T110 were identified as that of NaDTC, indicating the presence of residual catalyst in the polymers.

Poly(S-EGDMA) AND Poly(S-MMA)

Figure 59:
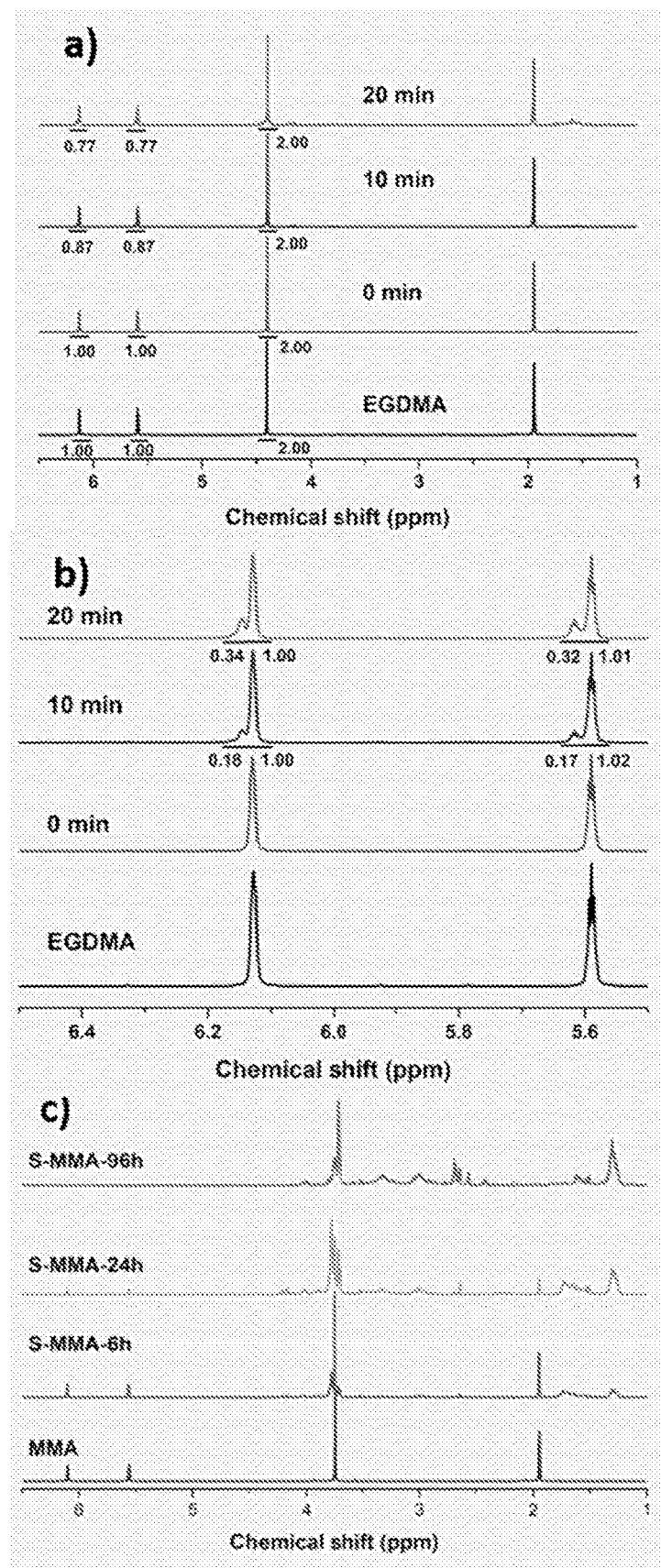
FIG. 59. (a) $^1$H NMR spectra for the reaction of sulfur-EGDMA from 0 min to 20 min, and the integral of vinyl protons reduced. (b) Peaks of vinyl protons shifted to downfield. (c) 1H NMR spectra for the reaction of sulfur and MMA at different time. Apparently, after further curing, vinyl groups were totally reacted.

From the DSC traces (see FIG. 58 (e)), thiopolymers prepared from EGDMA at different temperature have clear glass transition temperatures, indicating the generation of homogenous copolymers. There is no significant difference the $T_g$, suggesting that the reacting temperature did not affect reaction processing very much. In both situations, no S& crystals were detected. From the diffraction patterns of poly(S-EGDMA) (FIG. 58 (f)), a small signal of crystalline elemental sulfur could be detected from the sample made at 100° C., but there was no sharp peak observed from the sample made at 110° C. With the same amount of catalyst, the reaction time of S and EGDMA was much shorter than that of S and DIB, giving an opportunity to screen the reaction through $^1$H NMR in the early stage of polymerisation. As the reaction proceeds (FIG. 59(a)), the integral ratio of the peaks at 5.6 and 6.1 to the peak at 4.4 reduced, indicating the decreasing of C=C double bonds. Interestingly, new peaks appeared next to both peaks assigned as C=C bond protons, the also the ratio increased of the new shifted peaks to the original peaks, as shown in FIG. 59(b). The product prepared from S and MMA is more like oligomer or low molecular weight branched polysulfide than a thiopolymer, and unlike poly(S-DIB) and poly(S-EGDMA), all products of S-MMA could be dissolved in deuterated chloroform. After curing and removing from the oven, the product was a homogeneous wax-like material, however, cooling to room temperature, 30 min later, phase separation could be observed, and sulfur crystals were precipitated. This was probably because with only one C=C bond in MMA, it was difficult to stabilize too much sulfur. The reaction was followed by $^1$H NMR as well, as shown in FIG. 59(c). Two peaks indicating alkenyl hydrogens reduced and finally disappeared after long term curing. However, it is hard to say there is no homopolymerisation by MMA, but, from the peaks around 3, the reaction between sulfur and MMA could be confirmed.

Leaching and Remolding

Figure 60:
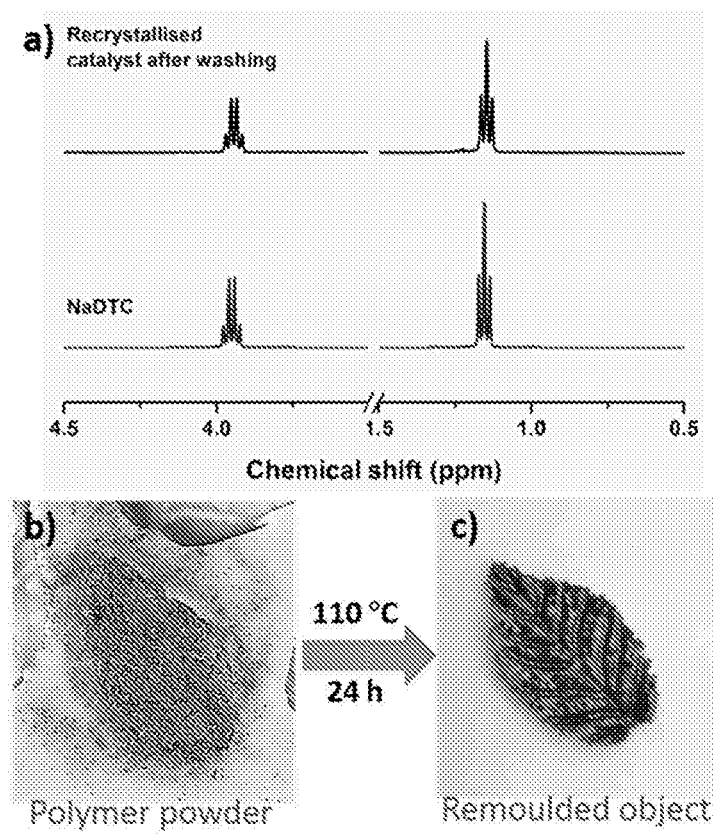
FIG. 60. (a) $^1$H NMR spectra for residual solid crystallised after leaching and standard NaDTC. (b) Washed powder was transferred in silicone mould. (c) Remoulded sample from reprocessing in the oven at 110° C.

As residual catalyst was detected by PXRD, the thiopolymer was ground into fine powder and washed by water, attempting to separate the polymer and catalyst. After washing and centrifugation, the supernatant was evaporated to crystalize residual catalyst. Yield of recrystallisation is only 7.9%, mainly because some catalyst is likely still trapped in the thiopolymers. From NMR results, as shown in FIG. 60(a), the crystalized products have the same pattern as pure NaDTC along with other impurity peaks. This indicates there is the potential for recycling of any excess catalyst used. After drying, the washed polymers were retested by PXRD. The pattern showed no crystallinity remained. After reheating in the oven, the fine powder could be remolded into different shapes (FIGS. 60(b) and (c)). In reformed processing, with undetected amount catalyst we assumed trapped in the thiopolymers, the S—S bounds were activated as dynamic covalent bonds, even at the low temperature of 110° C.

CONCLUSIONS

Different thiopolymers can alsp be successfully synthesized by inverse vulcanization below the sulfur melting temperature, with NaDTC as a catalyst. Chemically stable and shape-persistent high-sulfur-content copolymers could be generated. Through this method, no solvents or pre-reacted species were required, and residual catalyst could also be recovered, aligning the principles of green chemistry. Additionally, after washing, the thiopolymers could be reprocessed at mild temperature, allowing recycling. Thus, a new route to inverse vulcanize at low temperature is also provided.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

In this specification the term "alkyl" includes both straight and branched chain alkyl groups. References to individual alkyl groups such as "propyl" are specific for the straight chain version only and references to individual branched chain alkyl groups such as "isopropyl" are specific for the branched chain version only. For example, "(1-6C)alkyl" includes (1-4C)alkyl, (1-3C)alkyl, propyl, isopropyl and t-butyl. A similar convention applies to other radicals, for example "phenyl(1-6C)alkyl" includes phenyl(1-4C)alkyl, benzyl, 1-phenylethyl and 2-phenylethyl.

The term "(m-nC)" or "(m-nC) group" used alone or as a prefix, refers to any group having m to n carbon atoms.

"(3-8C)cycloalkyl" means a hydrocarbon ring containing from 3 to 8 carbon atoms, for example, cyclopropyl, cyclobutyl, cyclopentyl, cyclohexyl, cycloheptyl or bicyclo [2.2.1]heptyl.

The term "heterocyclyl", "heterocyclic" or "heterocycle" means a non-aromatic saturated or partially saturated monocyclic, fused, bridged, or spiro bicyclic heterocyclic ring system(s). Monocyclic heterocyclic rings contain from about 3 to 12 (suitably from 3 to 7) ring atoms, with from 1 to 5 (suitably 1, 2 or 3) heteroatoms selected from nitrogen, oxygen or sulfur in the ring. Bicyclic heterocycles contain from 7 to 17 member atoms, suitably 7 to 12 member atoms, in the ring. Bicyclic heterocyclic(s) rings may be fused, spiro, or bridged ring systems. Examples of heterocyclic groups include cyclic ethers such as oxiranyl, oxetanyl, tetrahydrofuranyl, dioxanyl, and substituted cyclic ethers. Heterocycles containing nitrogen include, for example, azetidinyl, pyrrolidinyl, piperidinyl, piperazinyl, tetrahydrotriazinyl, tetrahydropyrazolyl, and the like. Typical sulfur containing heterocycles include tetrahydrothienyl, dihydro-1,3-dithiol, tetrahydro-2H-thiopyran, and hexahydrothiepine. Other heterocycles include dihydro-oxathiolyl, tetrahydro-oxazolyl, tetrahydro-oxadiazolyl, tetrahydrodioxazolyl, tetrahydro-oxathiazolyl, hexahydrotriazinyl, tetrahydro-oxazinyl, morpholinyl, thiomorpholinyl, tetrahydro-pyrimidinyl, dioxolinyl, octahydrobenzofuranyl, octahydrobenzimidazolyl, and octahydrobenzothiazolyl. For heterocycles containing sulfur, the oxidized sulfur heterocycles containing SO or $SO_2$ groups are also included. Examples include the sulfoxide and sulfone forms of tetrahydrothienyl and thiomorpholinyl such as tetrahydrothiene 1,1-dioxide and thiomorpholinyl 1,1-dioxide. A suitable value for a heterocyclyl group which bears 1 or 2 oxo (=O) or thioxo (=S) substituents is, for example, 2-oxopyrrolidinyl, 2-thioxopyrrolidinyl, 2-oxoimidazolidinyl, 2-thioxoimidazolidinyl, 2-oxopiperidinyl, 2,5-dioxopyrrolidinyl, 2,5-dioxoimidazolidinyl or 2,6-dioxopiperidinyl. Particular heterocyclyl groups are saturated monocyclic 3 to 7 membered heterocyclyls containing 1, 2 or 3 heteroatoms selected from nitrogen, oxygen or sulfur, for example azetidinyl, tetrahydrofuranyl, tetrahydropyranyl, pyrrolidinyl, morpholinyl, tetrahydrothienyl, tetrahydrothienyl 1,1-dioxide, thiomorpholinyl, thiomorpholinyl 1,1-dioxide, piperidinyl, homopiperidinyl, piperazinyl or homopiperazinyl. As the skilled person would appreciate, any heterocycle may be linked to another group via any suitable atom, such as via a carbon or nitrogen atom. However, reference herein to piperidino or morpholino refers to a piperidin-1-yl or morpholin-4-yl ring that is linked via the ring nitrogen.

By "bridged ring systems" is meant ring systems in which two rings share more than two atoms, see for example *Advanced Organic Chemistry*, by Jerry March, 4th Edition, Wiley Interscience, pages 131-133, 1992. Examples of bridged heterocyclyl ring systems include, aza-bicyclo[2.2.1]heptane, 2-oxa-5-azabicyclo[2.2.1]heptane, aza-bicyclo[2.2.2]octane, aza-bicyclo[3.2.1]octane and quinuclidine.

By "spiro bi-cyclic ring systems" we mean that the two ring systems share one common spiro carbon atom, i.e. the heterocyclic ring is linked to a further carbocyclic or heterocyclic ring through a single common spiro carbon atom. Examples of spiro ring systems include 6-azaspiro[3.4]octane, 2-oxa-6-azaspiro[3.4]octane, 2-azaspiro[3.3]heptanes, 2-oxa-6-azaspiro[3.3]heptanes, 7-oxa-2-azaspiro[3.5]nonane, 6-oxa-2-azaspiro[3.4]octane, 2-oxa-7-azaspiro[3.5]nonane and 2-oxa-6-azaspiro[3.5]nonane.

"Heterocyclyl(1-6C)alkyl" means a heterocyclyl group covalently attached to a (1-6C)alkylene group, both of which are defined herein.

The term "heteroaryl" or "heteroaromatic" means an aromatic mono-, bi-, or polycyclic ring incorporating one or more (for example 1-4, particularly 1, 2 or 3) heteroatoms selected from nitrogen, oxygen or sulfur. The term heteroaryl includes both monovalent species and divalent species. Examples of heteroaryl groups are monocyclic and bicyclic groups containing from five to twelve ring members, and more usually from five to ten ring members. The heteroaryl group can be, for example, a 5- or 6-membered monocyclic ring or a 9- or 10-membered bicyclic ring, for example a bicyclic structure formed from fused five and six membered rings or two fused six membered rings. Each ring may contain up to about four heteroatoms typically selected from nitrogen, sulfur and oxygen. Typically, the heteroaryl ring will contain up to 3 heteroatoms, more usually up to 2, for example a single heteroatom. In one embodiment, the heteroaryl ring contains at least one ring nitrogen atom. The nitrogen atoms in the heteroaryl rings can be basic, as in the case of an imidazole or pyridine, or essentially non-basic as in the case of an indole or pyrrole nitrogen. In general, the number of basic nitrogen atoms present in the heteroaryl group, including any amino group substituents of the ring, will be less than five.

Examples of heteroaryl include furyl, pyrrolyl, thienyl, oxazolyl, isoxazolyl, imidazolyl, pyrazolyl, thiazolyl, isothiazolyl, oxadiazolyl, thiadiazolyl, triazolyl, tetrazolyl, pyridyl, pyridazinyl, pyrimidinyl, pyrazinyl, 1,3,5-triazenyl, benzofuranyl, indolyl, isoindolyl, benzothienyl, benzoxazolyl, benzimidazolyl, benzothiadazolyl, benzothiazolyl, indazolyl, purinyl, benzofurazanyl, quinolyl, isoquinolyl, quinazolinyl, quinoxalinyl, cinnolinyl, pteridinyl, naphthyridinyl, carbazolyl, phenazinyl, benzisoquinolinyl, pyridopyrazinyl, thieno[2,3-b]furanyl, 2H-furo[3,2-b]-pyranyl, 5H-pyrido[2,3-d]-o-oxazinyl, 1H-pyrazolo[4,3-d]-oxazolyl, 4H-imidazo[4,5-d]thiazolyl, pyrazino[2,3-d]pyridazinyl, imidazo[2,1-b]thiazolyl, imidazo[1,2-b][1,2,4]triazinyl. "Heteroaryl" also covers partially aromatic bi- or polycyclic ring systems wherein at least one ring is an aromatic ring and one or more of the other ring(s) is a non-aromatic, saturated or partially saturated ring, provided at least one ring contains one or more heteroatoms selected from nitrogen, oxygen or sulfur. Examples of partially aromatic heteroaryl groups include for example, tetrahydroisoquinolinyl, tetrahydroquinolinyl, 2-oxo-1,2,3,4-tetrahydroquinolinyl, dihydrobenzthienyl, dihydrobenzfuranyl, 2,3-dihydro-benzo[1,4]dioxinyl, benzo[1,3]dioxolyl, 2,2-dioxo-1,3-dihydro-2-benzothienyl, 4,5,6,7-tetrahydrobenzofuranyl, indolinyl, 1,2,3,4-tetrahydro-1,8-naphthyridinyl, 1,2,3,4-tetrahydropyrido[2,3-b]pyrazinyl and 3,4-dihydro-2H-pyrido[3,2-b][1,4]oxazinyl.

Examples of five membered heteroaryl groups include but are not limited to pyrrolyl, furanyl, thienyl, imidazolyl, furazanyl, oxazolyl, oxadiazolyl, oxatriazolyl, isoxazolyl, thiazolyl, isothiazolyl, pyrazolyl, triazolyl and tetrazolyl groups.

Examples of six membered heteroaryl groups include but are not limited to pyridyl, pyrazinyl, pyridazinyl, pyrimidinyl and triazinyl.

A bicyclic heteroaryl group may be, for example, a group selected from:
  a benzene ring fused to a 5- or 6-membered ring containing 1, 2 or 3 ring heteroatoms;
  a pyridine ring fused to a 5- or 6-membered ring containing 1, 2 or 3 ring heteroatoms;
  a pyrimidine ring fused to a 5- or 6-membered ring containing 1 or 2 ring heteroatoms;
  a pyrrole ring fused to a 5- or 6-membered ring containing 1, 2 or 3 ring heteroatoms;
  a pyrazole ring fused to a 5- or 6-membered ring containing 1 or 2 ring heteroatoms;
  a pyrazine ring fused to a 5- or 6-membered ring containing 1 or 2 ring heteroatoms;
  an imidazole ring fused to a 5- or 6-membered ring containing 1 or 2 ring heteroatoms;
  an oxazole ring fused to a 5- or 6-membered ring containing 1 or 2 ring heteroatoms;
  an isoxazole ring fused to a 5- or 6-membered ring containing 1 or 2 ring heteroatoms;
  a thiazole ring fused to a 5- or 6-membered ring containing 1 or 2 ring heteroatoms;
  an isothiazole ring fused to a 5- or 6-membered ring containing 1 or 2 ring heteroatoms;
  a thiophene ring fused to a 5- or 6-membered ring containing 1, 2 or 3 ring heteroatoms;
  a furan ring fused to a 5- or 6-membered ring containing 1, 2 or 3 ring heteroatoms;

a cyclohexyl ring fused to a 5- or 6-membered heteroaromatic ring containing 1, 2 or 3 ring heteroatoms; and a cyclopentyl ring fused to a 5- or 6-membered heteroaromatic ring containing 1, 2 or 3 ring heteroatoms.

Particular examples of bicyclic heteroaryl groups containing a six-membered ring fused to a five-membered ring include but are not limited to benzfuranyl, benzthiophenyl, benzimidazolyl, benzoxazolyl, benzisoxazolyl, benzthiazolyl, benzisothiazolyl, isobenzofuranyl, indolyl, isoindolyl, indolizinyl, indolinyl, isoindolinyl, purinyl (e.g., adeninyl, guaninyl), indazolyl, benzodioxolyl and pyrazolopyridinyl groups.

Particular examples of bicyclic heteroaryl groups containing two fused six membered rings include but are not limited to quinolinyl, isoquinolinyl, chromanyl, thiochromanyl, chromenyl, isochromenyl, chromanyl, isochromanyl, benzodioxanyl, quinolizinyl, benzoxazinyl, benzodiazinyl, pyridopyridinyl, quinoxalinyl, quinazolinyl, cinnolinyl, phthalazinyl, naphthyridinyl and pteridinyl groups.

The term "aryl" means a cyclic or polycyclic aromatic ring having from 5 to 12 carbon atoms. The term aryl includes both monovalent species and divalent species. Examples of aryl groups include, but are not limited to, phenyl, biphenyl, naphthyl, anthraceneyl and the like. In particular embodiment, an aryl is phenyl.

The term "halo" refers to any suitable halogen and may be selected from fluoro, chloro, bromo and iodo groups. Suitably, the term halo refers to fluoro, chloro or bromo groups, and most suitably, chloro groups.

The term "optionally substituted" refers to either groups, structures, or molecules that are substituted and those that are not substituted. The term "wherein a/any CH, $CH_2$, $CH_3$ group or heteroatom (i.e. NH) within a $R^1$ group is optionally substituted" suitably means that (any) one of the hydrogen radicals of the $R^1$ group is substituted by a relevant stipulated group.

Where optional substituents are chosen from "one or more" groups it is to be understood that this definition includes all substituents being chosen from one of the specified groups or the substituents being chosen from two or more of the specified groups.

Curing is a term in polymer chemistry and process engineering that refers to the cross-linking of polymer chains, brought about by electron beams, heat, or chemical additives.

The term 'aqueous mixture' refers to any mixture of substances which comprises at least 10% water by weight. It may comprise at least 50% water by weight and preferably comprises at least 80% water by weight, e.g. at least 90% water by weight. The mixture may be a solution, a suspension, an emulsion or a mixture thereof. Typically the aqueous mixture will be an aqueous solution in which one or more solutes are dissolved in water. This does not exclude the possibility that there might be particulate matter, droplets or micelles suspended in the solution.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A process of making a sulfur-based polymer, the process comprising:

reacting elemental sulfur with one or more organic crosslinking agents, in the presence of at least one catalyst, wherein the organic crosslinking agent(s) comprises two or more carbon-carbon double bonds and has a molecular weight of less than 1000 g/mol;

wherein the sulfur is present in an amount of from 30% to 95% by weight of the reaction mixture;

and the catalyst is selected from one or more of the following:

(i) a compound according to formula (I) below:

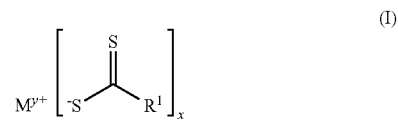

wherein

M is a metal ion, y is the valency of M, and x is an integer that equals y; and $R^1$ is selected from (1-20C)alkyl, $NR^2R^3$, $SR^4$, or $OR^5$, wherein $R^2$ and $R^3$ and are each independently H, (1-8C)alkyl, (3-6C)cycloalkyl, aryl, or heteroaryl, or $R^2$ and $R^3$ are linked such that, together with the nitrogen atom to which they are attached, they form a 3-6 membered heterocyclic ring;

$R^4$ is (1-8C)alkyl, (3-6C)cycloalkyl, (3-6C)heterocyclyl, aryl, or heteroaryl; and $R^5$ is (1-8C)alkyl, (3-6C)cycloalkyl, (3-6C)heterocyclyl, aryl, or heteroaryl;

(ii) a compound according to formula (II) below:

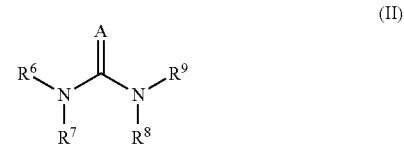

wherein

A is S, O, or NH; and $R^6$, $R^7$, $R^8$, $R^9$, are each independently H, (1-8C)alkyl, (3-6C)cycloalkyl, (3-6C)heterocyclyl, aryl, or heteroaryl;

(iii) a compound according to formula (III) below:

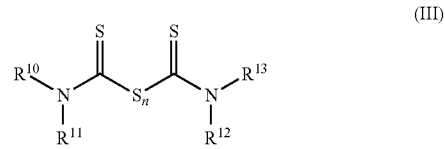

wherein $R^{10}$, $R^{11}$, $R^{12}$ and $R^{13}$ are each independently (1-8C)alkyl, (3-6C)cycloalkyl, aryl, or heteroaryl; and n is an integer between 1 and 8;

(iv) a compound according to formula (IV) below:

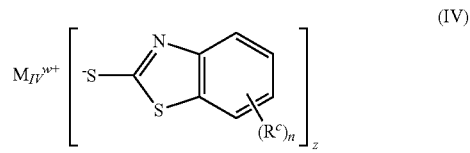

wherein $M_{IV}$ is a metal ion, w is the valency of $M_{IV}$, and z is an integer that equals w;

n is an integer between 0 and 4; and each occurrence of $R^b$ is independently (1-8C)alkyl, aryl, halo, heteroaryl, or (3-6C)cycloalkyl;

(v) a compound according to formula (V) below:

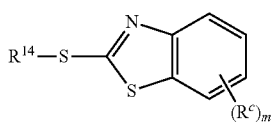

wherein $R^{14}$ is H, (1-8C)alkyl, (3-6C)cycloalkyl, (3-6C)heterocyclyl, aryl, heteroaryl, $NR^{15}R^{16}$, or $SR^{17}$;

wherein $R^{15}$ and $R^{16}$ are independently H, (1-8C)alkyl, (3-6C)cycloalkyl, (3-6C)heterocyclyl, aryl, or heteroaryl, or are linked such that they form a 3-6 membered heterocyclic ring;

$R^{17}$ is H, (1-8C)alkyl, (3-6C)cycloalkyl, (3-6C)heterocyclyl, aryl, or heteroaryl;

m is an integer between 0 and 4; and each occurrence of $R^c$ is independently (1-8C)alkyl, aryl, halo, heteroaryl, or (3-6C)cycloalkyl;

(vi) a compound according to formula (VI) below:

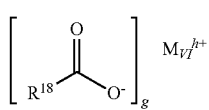

wherein $R^{18}$ is (1-20C)alkyl, $M_{VI}$ is a metal ion, h is the valency of $M_{VI}$, and g is an integer that equals h and each of $R^1, R^2, R^3, R^4, R^5, R^6, R^7, R^8, R^9, R^{10}, R^{11}, R^{12}, R^{13}, R^{14}, R^{15}, R^{16}, R^{17}, R^{18}, R^b$ and $R^c$ are optionally further substituted with one or more substituent groups independently se (1-8C)alkyl, aryl, halo, heteroaryl, or (3-6C)cycloalkyl.

2. The process according to claim 1, wherein the catalyst is selected from one or more compounds according to Formula (I), (III) or (VI).

3. The process according to claim 1, wherein M, $M_{IV}$ and $M_{VI}$ are selected from the group consisting of zinc, iron, cobalt, copper, nickel, aluminium, magnesium, calcium, and sodium ions.

4. The process according to claim 1, wherein the catalyst is a compound according to Formula (I).

5. The process according to claim 1, wherein the catalyst is a compound according to Formula (Ia), below:

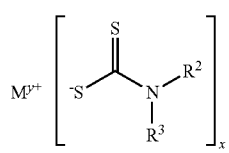

wherein M is a sodium or zinc ion.

6. A process according to claim 5, wherein $R^2$ and $R^3$ are each independently selected from the group consisting of hydrogen, (1-4C)alkyl, (3-6C)cycloalkyl, and aryl, wherein $R^2$ and $R^3$ are optionally further substituted with one or more substituent groups independently (1-4C)alkyl, aryl, heteroaryl, or (3-6C)cycloalkyl.

7. The process according to claim 1, wherein the step of reacting comprises heating a reaction mixture comprising the elemental sulfur, organic crosslinker and catalyst.

8. The process according to claim 7, wherein the reaction mixture is heated such that the sulfur is in molten form.

9. The process according to claim 7, wherein the sulfur is present in an amount of from 30% to 95% by weight of the reaction mixture.

10. The process according to claim 7, wherein the catalyst is present in an amount of from 0.1% to 10% by weight of the reaction mixture.

11. The process according to claim 7, wherein the reaction mixture is heated to a temperature of from 120° C. to 200° C.

12. The process according to claim 7, wherein the reaction mixture is heated for a period of 10 minutes to 24 hours.

13. The process according to claim 1, wherein the organic crosslinker is a compound selected from one or more vinyl compounds, including vinyl compounds comprising one or more heteroatoms.

14. A sulfur-based polymer comprising sulfur in an amount of at least 30% by weight of the polymer, the sulfur based polymer also comprising a catalyst as defined in claim 1.

15. A sulfur-based polymer according to claim 14, which is soluble in organic solvents and substantially insoluble in water at 25° C.

16. A sorbent comprising a sulfur-based polymer according to claim 14.

17. The sorbent according to claim 14, wherein the sulfur-based polymer is supported on a porous material.

18. A method of making a sorbent, the method comprising:
  a) dissolving a sulfur-based polymer according to claim 14 in an organic solvent;
  b) bringing a porous material into contact with the organic solvent;
  c) drying to remove the organic solvent to leave the sulfur-based polymer supported on the porous material.

19. A method of removing heavy metals from a fluid, the method comprising;
  (a) contacting the fluid with a sorbent according to claim 16;
  b) separating the sulfur-based polymer or the sorbent from the fluid.

20. A method of removing precious metals from a fluid, the method comprising;
  (a) contacting the fluid with a sorbent according to claim 16;
  b) separating the sulfur-based polymer or the sorbent from the fluid.

* * * * *